United States Patent
You

(10) Patent No.: US 9,046,672 B2
(45) Date of Patent: Jun. 2, 2015

(54) IMAGING LENS

(71) Applicant: SAMSUNG ELECTRO-MECHANICS CO., LTD., Suwon (KR)

(72) Inventor: Ho Sik You, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 14/027,090

(22) Filed: Sep. 13, 2013

(65) Prior Publication Data
US 2014/0078603 A1 Mar. 20, 2014

(30) Foreign Application Priority Data

Sep. 14, 2012 (KR) .................. 10-2012-0102380
Aug. 6, 2013 (KR) .................. 10-2013-0093090
Sep. 9, 2013 (KR) .................. 10-2013-0107710

(51) Int. Cl.
G02B 13/00 (2006.01)
G02B 9/62 (2006.01)

(52) U.S. Cl.
CPC .............. *G02B 13/0015* (2013.01); *G02B 9/62* (2013.01); *G02B 13/0045* (2013.01)

(58) Field of Classification Search
CPC ... G02B 13/0015; G02B 13/0045; G02B 9/62
USPC .................................... 359/713, 759
See application file for complete search history.

(56) References Cited

U.S. PATENT DOCUMENTS

| 5,508,846 | A | 4/1996 | Hall | |
|---|---|---|---|---|
| 6,061,185 | A | 5/2000 | Yamada | |
| 8,477,431 | B2 * | 7/2013 | Huang | 359/713 |
| 8,717,685 | B2 * | 5/2014 | Tsai et al. | 359/739 |
| 8,724,237 | B2 * | 5/2014 | Hsu et al. | 359/759 |
| 2012/0026609 | A1 | 2/2012 | Kubota | |
| 2012/0162787 | A1 | 6/2012 | Adachi et al. | |
| 2012/0194726 | A1 | 8/2012 | Huang et al. | |
| 2013/0016278 | A1 | 1/2013 | Matsusaka et al. | |
| 2013/0279021 | A1 * | 10/2013 | Chen et al. | 359/713 |
| 2014/0063323 | A1 * | 3/2014 | Yamazaki et al. | 348/335 |
| 2014/0211327 | A1 * | 7/2014 | Chen et al. | 359/713 |
| 2014/0293458 | A1 * | 10/2014 | Nabeta | 359/759 |

FOREIGN PATENT DOCUMENTS

| CN | 202256850 U | 5/2012 |
|---|---|---|
| CN | 202275209 | 6/2012 |
| EP | 2 708 929 A2 * | 3/2014 |

(Continued)

OTHER PUBLICATIONS

English-language Translation of KIPO Application No. KR 10-2013-0107710, filed Sep. 9, 2013.*

(Continued)

*Primary Examiner* — David N Spector
(74) *Attorney, Agent, or Firm* — Ladas & Parry, LLP

(57) ABSTRACT

Disclosed herein is an imaging lens including: a first lens having positive (+) power; a second lens having positive (+) power; a third lens having positive (+) or negative (−) power; a fourth lens having positive (+) or negative (−) power; a fifth lens having positive (+) or negative (−) power; and a sixth lens having negative (−) power.

35 Claims, 43 Drawing Sheets
(24 of 43 Drawing Sheet(s) Filed in Color)

(56) References Cited

FOREIGN PATENT DOCUMENTS

| | | |
|---|---|---|
| JP | 61-067814 | 4/1986 |
| JP | 6-258575 | 9/1994 |
| JP | 09-90219 | 4/1997 |
| JP | 2006-308611 | 11/2006 |
| JP | 2007-133096 | 5/2007 |
| JP | 2008-250136 | 10/2008 |
| JP | 2011-085733 | 4/2011 |
| JP | 2012-187995 | 3/2014 |
| TW | 201234038 | 8/2012 |
| WO | 2011/118554 | 9/2011 |

OTHER PUBLICATIONS

English-language Translation of KIPO Search Report for KR-10-2013-0107710, mailed Jul. 10, 2014.*

English-language Translation of Notification of Reason for Refusal for KR-10-2013-0107710, mailed Jul. 30, 2014.*

English-language Translation of amendments proposed for KR-10-2013-0107710, mailed Sep. 30, 2014.*

Office action dated Jul. 30, 2014 from corresponding Korean Patent Application No. 10-2013-0107710 and its English summary provided by the applicant.

Search Report dated Apr. 4, 2014 from corresponding European Patent Application No. 13184323.7.

Office action dated Jul. 29, 2014 from corresponding Japanese Patent Application No. 2013-189951 and its English summary provided by the applicant.

Extended European Search Report dated Sep. 3, 2014 for European Patent Application No. 13184323.7.

* cited by examiner

IMAGING LENS

CROSS REFERENCE TO RELATED APPLICATION

This application claims the benefit of Korean Patent Application No. 10-2012-0102380, filed on Sep. 14, 2012, entitled "Imaging Lens", Korean Patent Application No. 10-2013-0093090, filed Aug. 6, 2013, entitled "Imaging Lens" and Korean Patent Application No. 2013-0107710, filed Sep. 9, 2013, entitled "Imaging Lens", all of which are incorporated by reference herein in their entireties.

BACKGROUND OF THE INVENTION

1. Technical Field

The present invention relates to an imaging lens.

2. Description of the Related Art

In accordance with the recent development of a technology of a portable terminal such as a cellular phone, a personal digital assistant (PDA), and the like, the portable terminal has been used as a multi-convergence such as a music, a movie, a television, a game, and the like, as well as a simple phone function. The most typical product among products leading the development to the multi-convergence may be a camera module.

Generally, a compact camera module (CCM) has a small size and has been used in portable mobile communication devices including a camera phone, a personal digital assistant (PDA), and a smart phone, and various information technology (IT) devices such as a toy camera, and the like.

In the case of a lens mounted in a camera module according to the prior art, four or five lenses have been used in order to implement high pixels. However, as a pixel size becomes small, it is difficult to implement performance.

SUMMARY OF THE INVENTION

The present invention has been made in an effort to provide an imaging lens having excellent optical characteristics.

According to a preferred embodiment of the present invention, there is provided an imaging lens including: a first lens having positive (+) power; a second lens having positive (+) power; a third lens having positive (+) or negative (−) power; a fourth lens having positive (+) or negative (−) power; a fifth lens having positive (+) or negative (−) power; and a sixth lens having negative (−) power, wherein the first lens, the second lens, the third lens, the fourth lens, the fifth lens, and the sixth lens are sequentially disposed from an object side.

The first lens may be formed to be convex toward the object side.

At least one of the third and fourth lenses may be formed to have the Abbe number of 30 or less.

The fifth lens may be formed to be convex toward an image surface side.

The fifth lens may be formed to have the positive (+) power and be convex toward the object side.

The fifth lens may be formed to have the positive (+) power and be concave toward the object side.

The fifth lens may be formed to have the negative (−) power and be concave toward the object side.

The sixth lens may be formed to have a point of inflection on a surface thereof toward an image surface side.

The sixth lens may be formed to be concave toward an image surface side.

When it is assumed that a length from an incident surface of the first lens toward the object side to an image surface is TTL and the entire focal length of the imaging lens is F, a conditional equation of $0.95 < TTL/F < 1.45$ may be satisfied.

When it is assumed that a length from an incident surface of the first lens toward the object side to an image surface is TTL and the entire focal length of the imaging lens is F, a conditional equation of $1.15 < TTL/F < 1.45$ may be satisfied.

When it is assumed that a synthetic focal length of the first and second lenses is F12 and the entire focal length of the imaging lens is F, a conditional equation of $0.5 < F/F12 < 2.5$ may be satisfied.

When it is assumed that synthetic focal length of the third and fourth lenses is F34 and the entire focal length of the imaging lens is F, a conditional equation of $-2.5 < F/F34 < -0.4$ may be satisfied.

The third lens may be formed to have the negative (−) power, and the fourth lens may be formed to have the positive (+) power.

The third lens may be formed to have the negative (−) power, and the fourth lens may be formed to have the negative (−) power.

The third lens may be formed to have the positive (+) power, and the fourth lens may be formed to have the negative (−) power.

The third lens may be formed to have the positive (+) power, and the fourth lens may be formed to have the positive (+) power.

The imaging lens may further include an aperture stop positioned to be closer to the object side or an image surface side as compared with any one of the first to fifth lenses.

The aperture stop may be positioned between a surface of the first lens toward the object side and a surface of the third lens toward the object side.

When it is assumed that a focal length of the first lens is F1 and the entire focal length of the imaging lens is F, a conditional equation of $0 < F/F1 < 1.5$ may be satisfied.

When it is assumed that a focal length of the third lens is F3 and the entire focal length of the imaging lens is F, a conditional equation of $0.2 < F/F3 < 2.5$ may be satisfied.

When it is assumed that a focal length of the fifth lens is F5, a focal length of the six lens is F6, and the entire focal length of the imaging lens is F, a conditional equation of $0.3 < F/F5 + F/F6 < 6.0$ may be satisfied.

When it is assumed that a length from an incident surface of the first lens toward the object side to an image surface is TTL and an image height is ImgH, a conditional equation of $0.35 < TTL/2ImgH < 0.95$ may be satisfied.

When it is assumed that a field of view of the imaging lens is FOV, a condition equation of $65 < FOV < 88$ may be satisfied.

When it is assumed that an average of the Abbe numbers of the first and second lenses is v12 and an average of the Abbe numbers of the third and fourth lenses is v34, a Conditional Equation of $10 < v12 - v34 < 45$ may be satisfied.

When it is assumed that a focal length of the third lens is F3, a focal length of the fourth lens is F4, and the entire focal length of the imaging lens is F, a conditional equation of $0 < |F/F3| + |F/F4| < 3$ may be satisfied.

When it is assumed that a length from an incident surface of the first lens toward the object side to an image surface is TTL and the entire focal length of the imaging lens is F, a conditional equation of $0.95 < TTL/F < 1.35$ may be satisfied.

When it is assumed that a radius of curvature of a surface of the first lens toward an image surface side is r12 and the entire focal length of the imaging lens is F, a conditional equation of $0.15 < r12/F < 0.9$ may be satisfied.

When it is assumed that a focal length of the first lens is F1 and a focal length of the third lens is F3, a conditional equation of $0 < |F1/F3| < 25$ may be satisfied.

When it is assumed that a radius of curvature of a surface of the fifth lens toward the object side is r9 and a radius of curvature of a surface of the fifth lens toward an image surface side is r10, a conditional equation of $0<|(r9-r10)/(r9+r10)|<6$ may be satisfied.

When it is assumed that the entire focal length of the imaging lens is F, a focal length of the first lens is F1, and a focal length of the second lens is F2, a conditional equation of $0.2<|F/F1|+|F/F2|<4$ may be satisfied.

When it is assumed that a focal length of the first lens is F1, a focal length of the second lens is F2, a focal length of the third lens is F3, and a focal length of the fourth lens is F4, a conditional equation of $0<(|F1|-|F2|)/(|F3|+|F4|)<30$ may be satisfied.

When it is assumed that the entire focal length of the imaging lens is F, a focal length of the fourth lens is F4, a focal length of the fifth lens is F5, and a focal length of the sixth lens is F6, a conditional equation of $0.20<|F/F4|+|F/F5|+|F/F6|<7.5$ may be satisfied.

When it is assumed that the entire focal length of the imaging lens is F and a distance between a surface of the first lens toward the object side and a surface of the sixth surface toward an image surface side on an optical axis is DL, a conditional equation of $0.7<DL/F<1.2$ may be satisfied.

When it is assumed that the Abbe number of the fourth lens is v4 and the Abbe number of the fifth lens is v5, a conditional equation of $42<v4+v5<115$ may be satisfied.

The fifth lens may be formed to have a point of inflection on at least one of a surface thereof toward the object side and a surface thereof toward an image surface side.

The fifth lens may have the negative (−) power.

The fifth lens may be formed to be concave toward the object side.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present invention will be more clearly understood from the following detailed description taken in conjunction with the accompanying drawings, in which.

DESCRIPTION OF THE PREFERRED EMBODIMENTS

Figure 1:
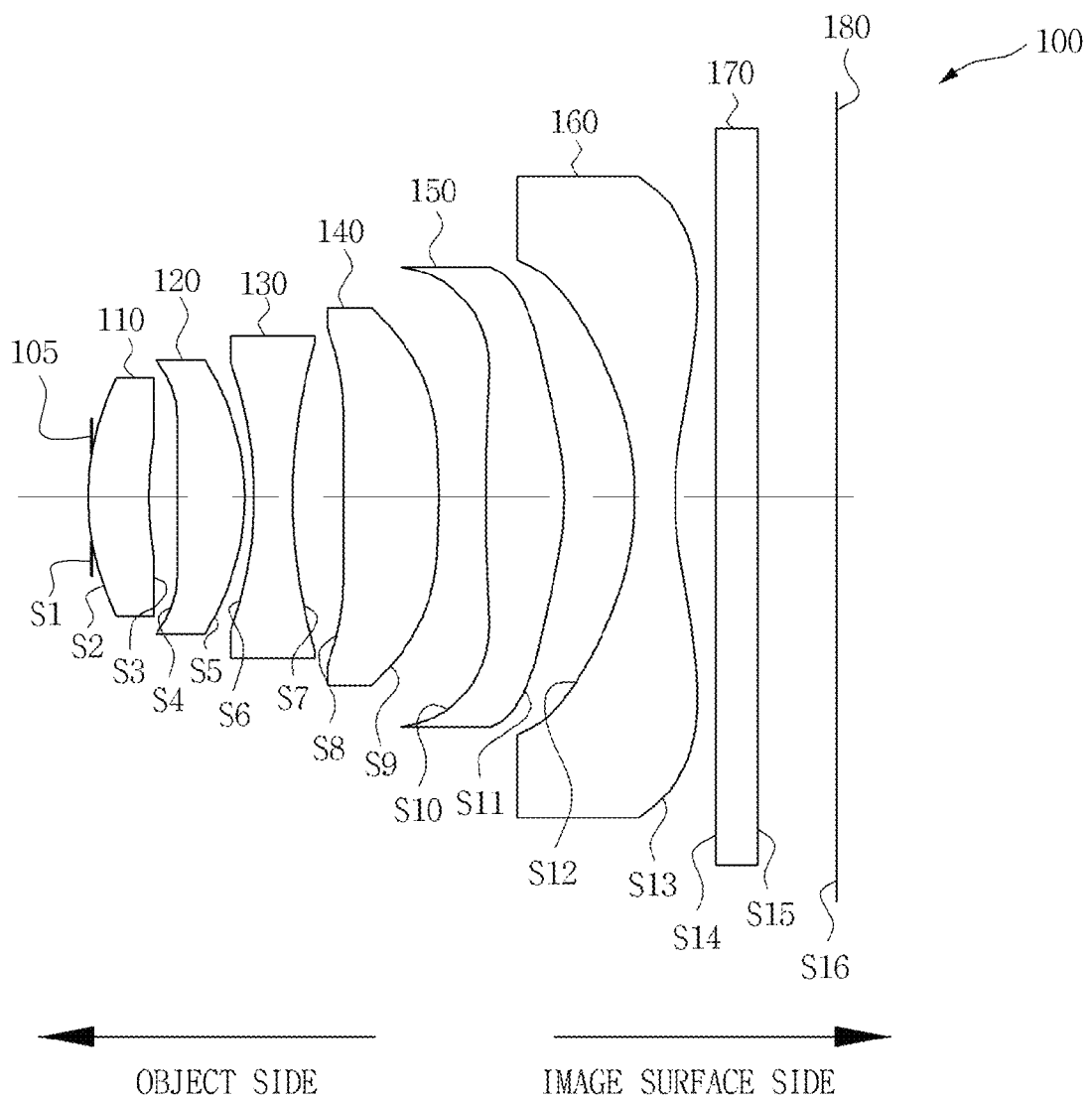
FIG. 1 is a lateral cross-sectional view schematically showing an internal structure of an imaging lens according to a first preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

<First Preferred Embodiment>

FIG. 1 is a lateral cross-sectional view schematically showing an internal structure of an imaging lens according to a first preferred embodiment of the present invention.

Referring to FIG. 1, the imaging lens 100 according to the first preferred embodiment of the present invention is configured to include a first lens 110, a second lens 120, a third lens 130, a fourth lens 140, a fifth lens 150, and a sixth lens 160 sequentially disposed from an object side. In addition, the imaging lens 100 according to the first preferred embodiment of the present invention may further include an aperture stop 105 positioned to be closer to the object side or an image surface side as compared with any one of the first to sixth lenses 110 and 160.

First, in order to obtain an image of the object (subject), light corresponding to image information of the object sequentially passes through the first lens 110, the aperture stop 105, the second lens 120, the third lens 130, the fourth lens 140, the fifth lens 150, the sixth lens 160, and a filter 170, and is then incident to a light receiving element 180.

Here, the first lens 110 is formed to have positive (+) power and have a shape in which it is convex toward the object side.

In addition, the second lens 120 is formed to have positive (+) power.

Further, the third lens 130 is formed to have negative (−) power.

In addition, the fourth lens 140 is formed to have positive (+) power.

Here, at least one of the third and fourth lenses 130 and 140 is formed to have the Abbe number (V) smaller than 30, thereby making it possible to significantly decrease chromatic aberration. However, the present invention is not necessary limited thereto. For example, at least one of the third and fourth lenses 130 and 140 is formed to have the Abbe number (V) that is in the range of 20 to 30, thereby making it possible to more significantly decrease chromatic aberration.

In addition, the fifth lens 150 may be formed to have positive (+) power and have a shape in which it is convex toward the object side and the image surface side. In this case, the fifth lens 150 is formed to have a point of inflection on at least one of a surface thereof toward the object side and a surface thereof toward the image surface side.

Further, the sixth lens 160 is formed to have negative (−) power and have a point of inflection on a surface thereof toward the image surface side.

Here, the first lens 110, the second lens 120, the third lens 130, the fourth lens 140, the fifth lens 150, and the sixth lens 160 may be formed as an aspheric surface. However, the present invention is not limited thereto.

In addition, the aperture stop 105 is disposed to be closer to the object side or the image surface side as compared with any one of the first to fifth lenses 110 and 150 and selectively collects incident light to adjust a focal length. Here, as an example, the aperture stop 105 may be disposed to be closer to the object side or the image surface side as compared with the first lens 110. In addition, as another example, the aperture stop 105 may be disposed between a surface of the first lens 110 toward the object side and a surface of the third lens 130 toward the object side. However, a position of the aperture stop 105 according to the first preferred embodiment of the present invention is not limited to the positions according to an example and another example.

In addition, the filter 170 may be an infrared (IR) cut filter. However, a kind of filter 170 according to the first preferred embodiment of the present invention is not limited thereto.

Here, the IR cut filter serves to cut radiant heat discharged from external light so as not to be transferred to the light receiving element 180.

That is, the IR cut filter has a structure in which it transmits a visible ray therethrough and reflects an infrared ray to discharge the infrared ray to the outside.

In addition, the light receiving element 180 having a surface on which an image is formed may be configured of an image sensor converting an optical signal corresponding to a subject image into an electrical signal. Here, the image sensor may be a charge coupled device (CCD) or a complementary metal oxide semiconductor (CMOS) sensor. However, the light receiving element according to the preferred embodiment of the present invention is not limited thereto.

The imaging lens 100 according to the first preferred embodiment of the present invention has optical characteristics as shown in the following Table 1.

TABLE 1

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 2.169 | 0.437 | 1.544 | 56.1 | Asphere | L1 |
| S3 | 5.712 | 0.201 | | | Asphere | |
| S4 | 11.693 | 0.499 | 1.553 | 48.6 | Asphere | L2 |
| S5 | −2.849 | 0.050 | | | Asphere | |
| S6 | −7.308 | 0.300 | 1.615 | 25.3 | Asphere | L3 |
| S7 | 2.926 | 0.381 | | | Asphere | |
| S8 | −28.676 | 0.704 | 1.564 | 41.9 | Asphere | L4 |
| S9 | −8.715 | 0.329 | | | Asphere | |
| S10 | 4.465 | 0.586 | 1.544 | 56.2 | Asphere | L5 |
| S11 | −2.080 | 0.513 | | | Asphere | |
| S12 | −1.874 | 0.380 | 1.526 | 53.1 | Asphere | L6 |
| S13 | 2.780 | 0.300 | | | Asphere | |
| S14 | infinite | 0.300 | 1.516 | 64.2 | Flat | Filter |
| S15 | infinite | 0.600 | | | Flat | |
| S16 | infinite | — | — | — | Flat | Image sensor |

As shown in the above Table 1, all surfaces of the first lens 110 (L1), the second lens 120 (L2), the third lens 130 (L3), the fourth lens 140 (L4), the fifth lens 150 (L5), and the sixth lens 160 (L6) of the imaging lens 100 according to the first preferred embodiment of the present invention are aspheric surfaces.

In addition, a "−" value stated in the above Table 1 means a value that is not defined.

Further, S1 means a surface determining a light amount of the imaging lens 100 according to the preferred embodiment of the present invention, and Stop stated in the Remark column of S1 means the aperture stop 105 (S1) used to adjust a light amount.

Here, although the aperture stop 105 is disposed on the surface of the first lens 110 toward the object side, a position of the aperture stop 105 according to the first preferred embodiment of the present invention is not limited thereto. In addition, the imaging lens 100 according to the preferred embodiment of the present invention is not necessarily limited to including the aperture stop 105.

The following Table 2 shows aspheric constant values of aspheric lenses according to the first preferred embodiment of the present invention.

TABLE 2

| Lens surface No. | K | A | B | C | D |
|---|---|---|---|---|---|
| S2 | 0 | −8.01E−03 | 5.10E−03 | −4.99E−03 | −8.64E−03 |
| S3 | 0 | −7.52E−02 | 1.37E−02 | −1.84E−02 | −2.42E−02 |
| S4 | 0 | −1.48E−01 | −1.69E−02 | 8.24E−03 | −4.94E−02 |
| S5 | 0 | −7.87E−02 | 5.20E−03 | −2.85E−02 | 4.59E−03 |
| S6 | 0 | −5.75E−02 | 2.89E−03 | −3.86E−02 | 1.93E−02 |
| S7 | 0 | −4.51E−02 | −7.10E−04 | −5.09E−04 | 1.49E−03 |
| S8 | 0 | −5.02E−02 | 1.16E−02 | 2.83E−03 | −2.63E−03 |
| S9 | 0 | −1.55E−01 | 3.70E−02 | −4.89E−03 | −2.37E−04 |
| S10 | 0 | −1.00E−01 | 2.13E−02 | −4.42E−03 | −1.30E−03 |
| S11 | 0 | 1.04E−01 | −1.42E−02 | −1.63E−03 | −2.29E−04 |
| S12 | 0 | 1.02E−01 | −5.59E−02 | 2.25E−02 | −3.50E−03 |
| S13 | 0 | −7.11E−02 | 9.56E−03 | −9.64E−04 | −7.46E−06 |

As stated in the above Table 1 and Table 2, S1, which is the aperture stop 105 (S1) used to adjust the light amount, is flat, such that it does not have an aspheric constant value.

In addition, S14 and S15, which are the filter 170, and S16, which is the image sensor corresponding to the light receiving element 180, are flat, such that they do not have aspheric constant values.

Further, the aspheric constant values according to the first preferred embodiment of the present invention may be calculated by the following Equation 1.

$$Z = \frac{cY^2}{1+\sqrt{1-(1+K)c^2Y^2}} + AY^4 + BY^6 + CY^8 + DY^{10} + EY^{12}$$ [Equation 1]

Z: Length from apex of lens in optical axis direction
c: Basic curvature of lens
Y: Length in direction perpendicular to optical axis
K: Conic Constant
A, B, C, D, E: Aspheric constant In addition, when it is assumed that the entire focal length of the imaging lens 100 according to the first preferred embodiment of the present invention is F and focal lengths of the first lens 110, the second lens 120, the third lens 130, the fourth lens 140, the fifth lens 150, and the sixth lens 160 are F1, F2, F3, F4, F5, and F6, respectively, the respective values are represented by the following Table 3.

TABLE 3

| Item | |
|---|---|
| Entire focal length (F) of imaging lens | 4.282 |
| Focal length (F1) of first lens | 6.158 |
| Focal length (F2) of second lens | 4.193 |
| Focal length (F3) of third lens | −3.355 |
| Focal length (F4) of fourth lens | 21.906 |
| Focal length (F5) of fifth lens | 2.693 |
| Focal length (F6) of second lens | −2.079 |
| TTL | 5.500 |

In the imaging lens 100 according to the first preferred embodiment of the present invention, when it is assumed that a length from an incident surface of the first lens 110 toward the object side to the image surface is TTL and the entire focal length of the imaging lens 100 is F, the following Conditional Equation may be satisfied.

$$0.95 < TTL/F < 1.35 \quad (1)$$

The above Conditional Equation (1) is a relationship equation of TTL and power of the imaging lens 100 according to the first preferred embodiment of the present invention. The above Conditional Equation (1) is satisfied, thereby making it possible to form the imaging lens 100 in which a telephoto form is possible.

In addition, according to the first preferred embodiment of the present invention, when it is assumed that a length from an incident surface of the first lens 110 toward the object side to the image surface is TTL and the entire focal length of the imaging lens 100 is F, the following Conditional Equation may be satisfied.

$$1.15 < TTL/F < 1.45 \quad (2)$$

The above Condition Equation (2) is satisfied, thereby making it possible to form the imaging lens 100 that has good marketability, is capable of more easily securing optical performance, and is slim.

In addition, according to the first preferred embodiment of the present invention, when it is assumed that a synthetic focal length of the first and second lenses 110 and 120 is F12 and the entire focal length of the imaging lens 100 is F, the following Conditional Equation may be satisfied.

$$0.5 < F/F12 < 2.5 \quad (3)$$

The above Conditional Equation (3) is a relationship equation of power of the first and second lenses 110 and 120 according to the first preferred embodiment of the present invention. When the imaging lens 100 is designed to have a value smaller or larger than the above Conditional Equation (3), axial performance is deteriorated, such that marketability is deteriorated and it is difficult to secure optical performance.

Therefore, the above Conditional Equation (3) is satisfied, such that the axial performance is improved, thereby making it possible to form the imaging lens 100 having good marketability and capable of easily securing optical performance.

In addition, in the imaging lens 100 according to the first preferred embodiment of the present invention, when it is assumed that a synthetic focal length of the third and fourth lenses 130 and 140 is F34 and the entire focal length of the imaging lens 100 is F, the following Conditional Equation may be satisfied.

$$-2.5 < F/F34 < -0.4 \quad (4)$$

The above Conditional Equation (4) is a relationship equation of power of the third and fourth lenses 130 and 140 according to the first preferred embodiment of the present invention. When the imaging lens 100 is designed to have a value smaller or larger than the above Conditional Equation (4), chromatic aberration and off-axis aberration are generated.

Therefore, the above Conditional Equation (4) is satisfied, such that the chromatic aberration and the off-axis aberration may be collected, thereby making it possible to form the imaging lens 100 having good marketability and capable of easily securing optical performance.

In addition, in the imaging lens 100 according to the first preferred embodiment of the present invention, when it is assumed that a focal length of the first lens 110 is F1 and the entire focal length of the imaging lens 100 is F, the following Conditional Equation may be satisfied.

$$0 < F/F1 < 1.5 \quad (5)$$

The above Conditional Equation (5) is a relationship equation of power of the first lens 110 according to the first preferred embodiment of the present invention. When the imaging lens 100 is designed to have a value smaller or larger than the above Conditional Equation (5), a optical power is decreased, such that sensitivity is decreased.

Therefore, the above Conditional Equation (5) is satisfied to prevent a decrease in the optical power, thereby making it possible to form the imaging lens 100 having good sensitivity.

In addition, in the imaging lens 100 according to the first preferred embodiment of the present invention, when it is assumed that a focal length of the third lens 130 is F3 and the entire focal length of the imaging lens 100 is F, the following Conditional Equation may be satisfied.

$$0.2 < |F/F3| < 2.5 \quad (6)$$

The above Conditional Equation (6) is a relationship equation of power of the third lens 130 according to the first preferred embodiment of the present invention. When the imaging lens 100 is designed to have a value smaller or larger than the above Conditional Equation (6), a optical power is dispersed, such that sensitivity is decreased.

Therefore, the above Conditional Equation (6) is satisfied to prevent dispersion in the optical power, thereby making it possible to form the imaging lens 100 having good sensitivity.

In addition, in the imaging lens 100 according to the first preferred embodiment of the present invention, when it is assumed that a focal length of the fifth lens 150 is F5, a focal length of the sixth lens 160 is F6, and the entire focal length of the imaging lens 100 is F, the following Conditional Equation may be satisfied.

$$0.3 < F/F5 + F/F6 < 6.0 \quad (7)$$

The above Conditional Equation (7) is a relationship equation of power of the fifth and sixth lenses 150 and 160 according to the first preferred embodiment of the present invention. The above Conditional Equation (7) is satisfied, thereby making it possible to form the imaging lens 100 in which a telephoto form is possible.

In addition, in the imaging lens 100 according to the first preferred embodiment of the present invention, when it is assumed that a length from an incident surface of the first lens 110 toward the object side to the image surface is TTL and an image height is ImgH, the following Conditional Equation may be satisfied.

$$0.35 < TTL/2ImgH < 0.95 \quad (8)$$

The above Conditional Equation (8) is a relationship equation of TTL and power of the imaging lens 100 according to the first preferred embodiment of the present invention. The above Conditional Equation (8) is satisfied, thereby making it possible to form the imaging lens 100 in a slim form.

In addition, according to the first preferred embodiment of the present invention, when it is assumed that a field of view of the imaging lens 100 is FOV, the following Conditional Equation may be satisfied.

$$65 < FOV < 88 \quad (9)$$

The above Conditional Equation (9) is a relationship equation for the field of view of the imaging lens 100 according to the first preferred embodiment of the present invention. The above Conditional Equation (9) is satisfied, thereby making it possible to form the imaging lens 100 in a slim form and a pseudo-wide angle form.

In addition, in the imaging lens 100 according to the first preferred embodiment of the present invention, when it is assumed that an average of the Abbe numbers of the first and second lenses 110 and 120 is v12 and an average of the Abbe numbers of the third and fourth lenses 130 and 140 is v34, the following Conditional Equation may be satisfied.

$$10 < v12 - v34 < 45 \quad (10)$$

The above Conditional Equation (10) is a relationship equation for dispersion of the first and second lenses 110 and 120 and the third and fourth lenses 130 and 140 according to the first preferred embodiment of the present invention. The above Conditional Equation (10) is satisfied, thereby making it possible to effectively decrease chromatic aberration.

In addition, in the imaging lens 100 according to the first preferred embodiment of the present invention, when it is assumed that a focal length of the third lens 130 is F3, a focal length of the fourth lens 140 is F4, and the entire focal length of the imaging lens 100 is F, the following Conditional Equation may be satisfied.

$$0 < |F/F3| + |F/F4| < 3 \quad (11)$$

The above Conditional Equation (11) is a relationship equation for optical powers of the third and fourth lenses 130 and 140 according to the first preferred embodiment of the present invention. The above Conditional Equation (11) is satisfied, thereby making it possible to decrease aberration.

In addition, in the imaging lens 100 according to the first preferred embodiment of the present invention, when it is assumed that a radius of curvature of a surface of the first lens 110 toward the image surface side is r12 and the entire focal length of the imaging lens 100 is F, the following Conditional Equation may be satisfied.

$$0.15 < r12/F < 0.9 \quad (12)$$

The above Conditional Equation (12) is a relationship equation of power for the radius of curvature of the surface of the first lens 110 according to the first preferred embodiment of the present invention toward the image surface side. The above Conditional Equation (12) is satisfied, thereby making it possible to form the imaging lens 100 having excellent optical characteristics.

In addition, in the imaging lens 100 according to the first preferred embodiment of the present invention, when it is assumed that a focal length of the first lens 110 is F1 and a focal length of the third lens 130 is F3, the following Conditional Equation may be satisfied.

$$0 < |F1/F3| < 25 \quad (13)$$

The above Conditional Equation (13) is a relationship equation of power of the first and third lenses 110 and 130 according to the first preferred embodiment of the present invention. The above Conditional Equation (13) is satisfied, thereby making it possible to form the imaging lens 100 having excellent optical characteristics.

In addition, in the imaging lens 100 according to the first preferred embodiment of the present invention, when it is assumed that a radius of curvature of a surface of the fifth lens 150 toward the object side is r9 and a radius of curvature of a surface of the fifth lens 150 toward the image surface side is r10, the following Conditional Equation may be satisfied.

$$0 < |(r9-r10)/(r9+r10)| < 6 \quad (14)$$

The above Conditional Equation (14) is a relationship equation of power of the fifth lens 150 according to the first preferred embodiment of the present invention. The above Conditional Equation (14) is satisfied, thereby making it possible to form the fifth lens 150 having the positive (+) power.

In addition, in the imaging lens 100 according to the first preferred embodiment of the present invention, when it is assumed that the entire focal length of the imaging lens 100 is F, a focal length of the first lens 110 is F1, and a focal length of the second lens 120 is F2, the following Conditional Equation may be satisfied.

$$0.2 < |F/F1| + |F/F2| < 4 \quad (15)$$

The above Conditional Equation (15) is a relationship equation for determining the entire power of the imaging lens 100 according to the first preferred embodiment of the present invention. The above Conditional Equation (15) is satisfied, thereby making it possible to form the imaging lens 100 having excellent optical characteristics.

In addition, in the imaging lens 100 according to the first preferred embodiment of the present invention, when it is assumed that a focal length of the first lens 110 is F1, a focal length of the second lens 120 is F2, a focal length of the third lens 130 is F3, and a focal length of the fourth lens 140 is F4, the following Conditional Equation may be satisfied.

$$0 < (|F1| + |F2|)/(|F3| + |F4|) < 30 \quad (16)$$

The above Conditional Equation (16) is a relationship equation of power of the first lens 110, the second lens 120, the third lens 130, and the fourth lens 140 according to the first preferred embodiment of the present invention. The above Conditional Equation (16) is satisfied, thereby making it possible to form the imaging lens 100 having excellent optical characteristics.

In addition, in the imaging lens 100 according to the first preferred embodiment of the present invention, when it is assumed that the entire focal length of the imaging lens 100 is F, a focal length of the fourth lens 140 is F4, a focal length of the fifth lens 150 is F5, and a focal length of the sixth lens 160 is F6, the following Conditional Equation may be satisfied.

$$0.20 < |F/F4| + |F/F5| + |F/F6| < 7.5 \quad (17)$$

The above Conditional Equation (17) is a relationship equation of power of the fourth lens 140, the fifth lens 150, and the sixth lens 160 according to the first preferred embodiment of the present invention. The above Conditional Equation (17) is satisfied, thereby making it possible to form the imaging lens 100 having excellent optical characteristics.

In addition, in the imaging lens 100 according to the first preferred embodiment of the present invention, when it is assumed that the entire focal length of the imaging lens 100 is F and a length between a surface of the first lens 110 toward the object side and a surface of the sixth surface 160 toward the image surface side on an optical axis is DL, the following Conditional Equation may be satisfied.

$$0.7 < DL/F < 1.2 \quad (18)$$

The above Conditional Equation (18) is satisfied, thereby making it possible to form the imaging lens 100 that is compact.

In addition, in the imaging lens 100 according to the first preferred embodiment of the present invention, when it is assumed that the Abbe number of the fourth lens 140 is v4 and the Abbe number of the fifth lens 150 is v5, the following Conditional Equation may be satisfied.

$$42 < v4 + v5 < 115 \quad (19)$$

The above Conditional Equation (19) is a relationship equation for dispersion of the fourth and fifth lenses 140 and 150 according to the first preferred embodiment of the present invention. The above Conditional Equation (19) is satisfied, thereby making it possible to form the imaging lens 100 having excellent optical characteristics.

Figure 2:
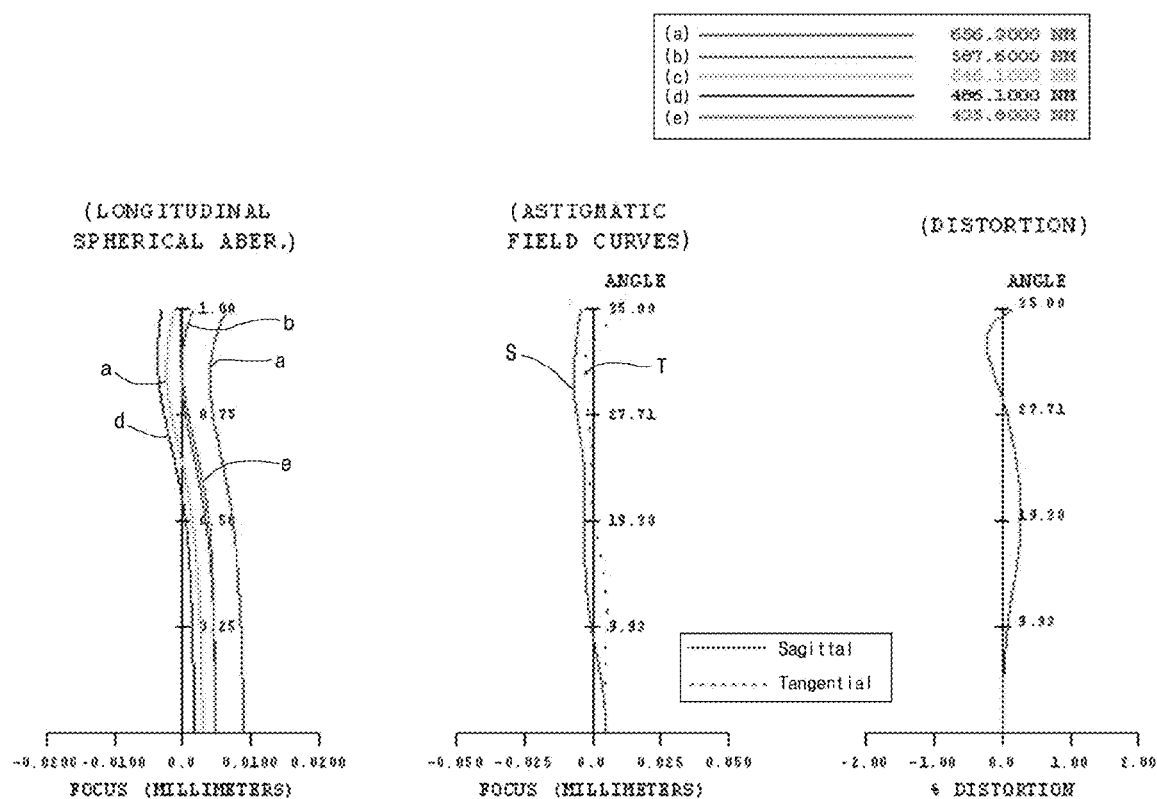
FIGS. 2 and 3 are graphs showing aberration characteristics according to the first preferred embodiment of the present invention.
Figure 3:
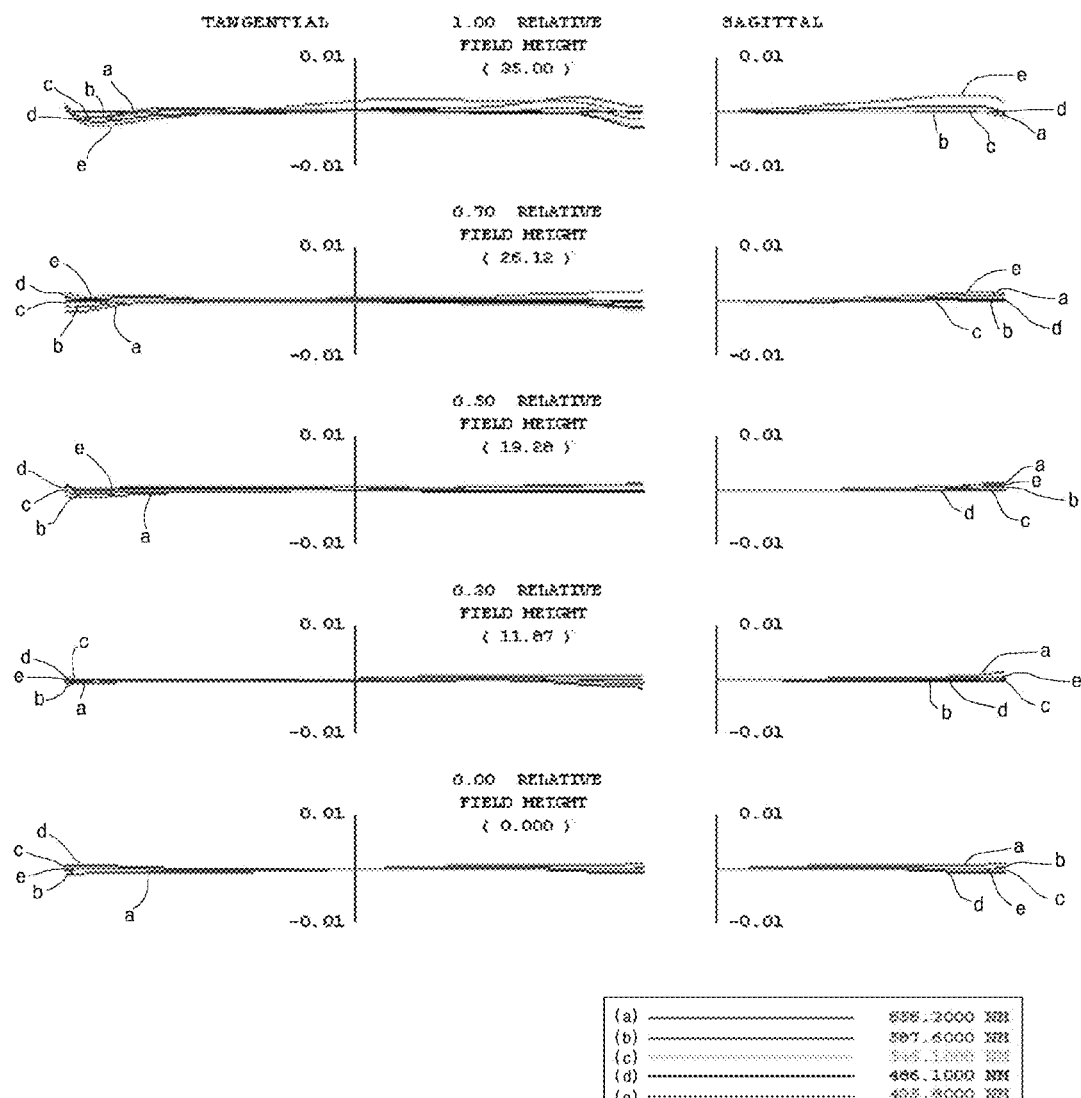

FIGS. 2 and 3 are graphs showing aberration characteristics according to the first preferred embodiment of the present invention. In FIGS. 2 and 3, the aberration characteristics are shown by representing a plurality of wavelengths by a plurality of colors.

Here, FIG. 2 is a graph obtained by measuring longitudinal spherical aberration, astigmatic field curve, and distortion according to the first preferred embodiment of the present invention. Further, FIG. 3 is a graph obtained by measuring coma aberration according to the first preferred embodiment of the present invention.

As shown in FIG. 2, the graph obtained by measuring the longitudinal spherical aberration shows longitudinal spherical aberration depending on each wavelength. Here, it may be appreciated that since it is shown that each wavelength is adjacent to a vertical axis, characteristics of the longitudinal spherical aberration are excellent.

In addition, the graph obtained by measuring the astigmatic field curve shows aberration characteristics of a direction component (X) of x axis light and a direction component (Y) of y axis light according to an image surface height (ANGLE) viewed from the object side, which is a vertical axis, and a focus (FOCUS) position, which is a horizontal axis. Here, it may be appreciated that since it is shown that X and Y are adjacent to each other, an image is not blurred and a phenomenon that a resolution is deteriorated does not appear.

In addition, the graph obtained by measuring the distortion shows distortion characteristics, which are a horizontal axis, according to an image surface height (ANGLE) viewed from the object side. Here, it may be appreciated that since a distortion degree is mainly positioned between −1 to +1 of the distortion, which is the horizontal axis, there is no substantially distortion.

As shown in FIG. 3, the graph obtained by measuring the coma aberration shows tangential and sagittal aberration characteristics depending on each wavelength according to an image surface height. Here, it may be appreciated that since it is shown that each wavelength is adjacent to a horizontal axis, small transversal chromatic aberration appears.

<Second Preferred Embodiment>

Figure 4:
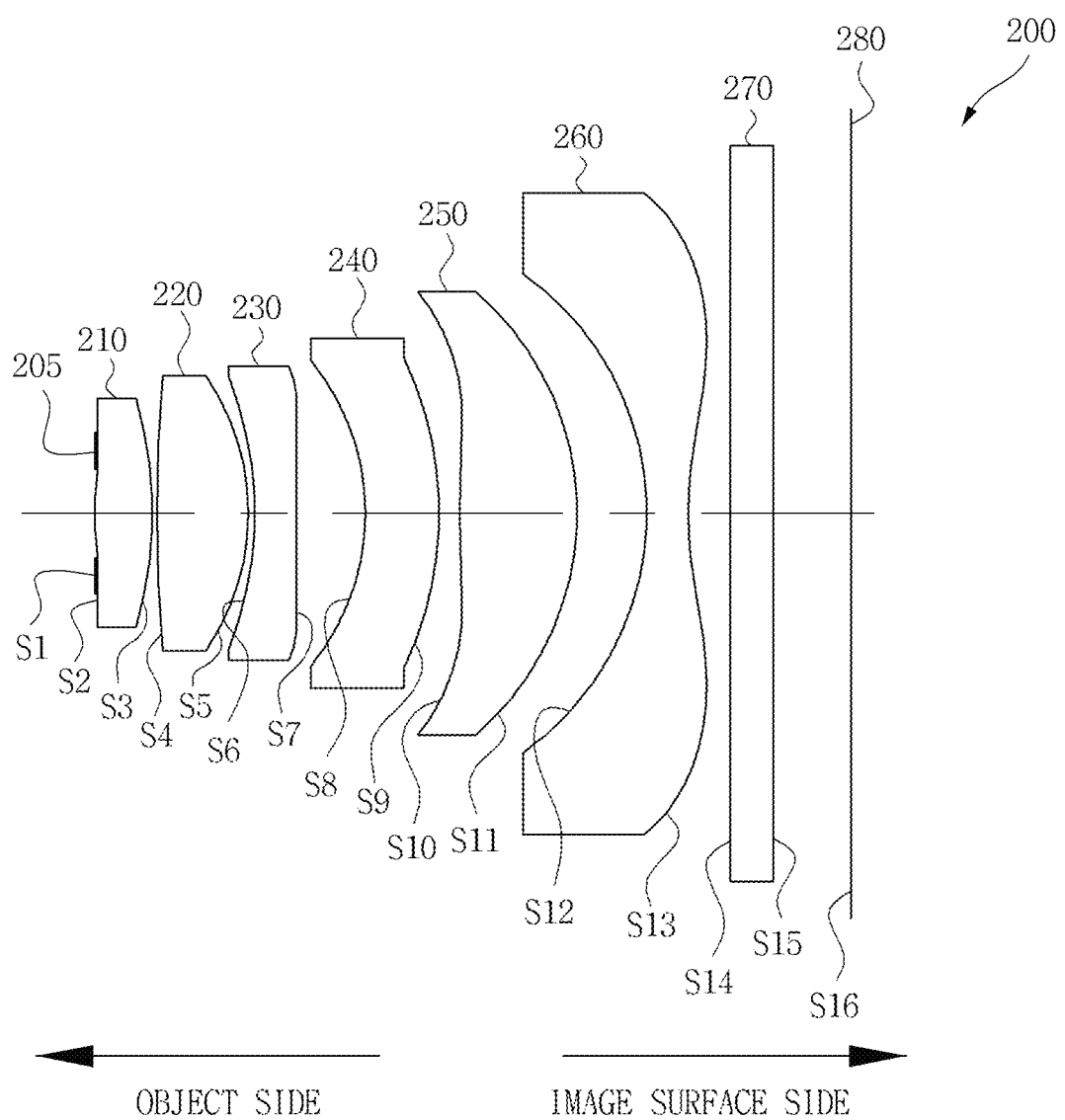
FIG. 4 is a lateral cross-sectional view schematically showing an internal structure of an imaging lens according to a second preferred embodiment of the present invention.

FIG. 4 is a lateral cross-sectional view schematically showing an internal structure of an imaging lens according to a second preferred embodiment of the present invention.

Referring to FIG. 4, the imaging lens 200 according to the second preferred embodiment of the present invention is configured to include a first lens 210, a second lens 220, a third lens 230, a fourth lens 240, a fifth lens 250, and a sixth lens 260 sequentially disposed from an object side. In addition, the imaging lens 200 according to the second preferred embodiment of the present invention may further include an aperture stop 205 positioned to be closer to the object side or an image surface side as compared with any one of the first to sixth lenses 210 and 260.

First, in order to obtain an image of the object (subject), light corresponding to image information of the object sequentially passes through the first lens 210, the aperture stop 205, the second lens 220, the third lens 230, the fourth lens 240, the fifth lens 250, the sixth lens 260, and a filter 270, and is then incident to a light receiving element 280.

Here, the first lens 210 is formed to have positive (+) power and have a shape in which it is convex toward the object side.

In addition, the second lens 220 is formed to have positive (+) power.

In addition, each of the third and fourth lenses 230 and 240 may be formed to have negative (−) power, but the present invention is not necessarily limited thereto. For example, each of the third and fourth lenses 230 and 240 may be formed to have positive (+) power.

Here, at least one of the third and fourth lenses 230 and 240 is formed to have the Abbe number (V) smaller than 30, thereby making it possible to significantly decrease chromatic aberration. However, the present invention is not necessary limited thereto. For example, at least one of the third and fourth lenses 230 and 240 is formed to have the Abbe number (V) that is in the range of 20 to 30, thereby making it possible to more significantly decrease chromatic aberration.

In addition, the fifth lens 250 may be formed to have positive (+) power and have a shape in which it is convex toward the object side and the image surface side. In this case, the fifth lens 250 is formed to have a point of inflection on at least one of a surface thereof toward the object side and a surface thereof toward the image surface side.

Further, the sixth lens 260 is formed to have negative (−) power, be concave toward the image surface side, and have a point of inflection on a surface thereof toward the image surface side.

Here, the first lens 210, the second lens 220, the third lens 230, the fourth lens 240, the fifth lens 250, and the sixth lens 260 may be formed as an aspheric surface. However, the present invention is not limited thereto.

In addition, the aperture stop 205 is disposed to be closer to the object side or the image surface side as compared with any one of the first to fifth lenses 210 and 250 and selectively collects incident light to adjust a focal length. Here, as an example, the aperture stop 205 may be disposed to be closer to the object side or the image surface side as compared with the first lens 210. In addition, as another example, the aperture stop 205 may be disposed between a surface of the first lens 210 toward the object side and a surface of the third lens 230 toward the object side. However, a position of the aperture stop 205 according to the second preferred embodiment of the present invention is not limited to the positions according to an example and another example.

In addition, the filter 270 may be an infrared (IR) cut filter. However, a kind of filter 270 according to the second preferred embodiment of the present invention is not limited thereto.

Here, the IR cut filter serves to cut radiant heat discharged from external light so as not to be transferred to the light receiving element 280.

That is, the IR cut filter has a structure in which it transmits a visible ray therethrough and reflects an infrared ray to discharge the infrared ray to the outside.

In addition, the light receiving element 280 having a surface on which an image is formed may be configured of an image sensor converting an optical signal corresponding to a subject image into an electrical signal. Here, the image sensor may be a charge coupled device (CCD) or a complementary metal oxide semiconductor (CMOS) sensor. However, the light receiving element according to the preferred embodiment of the present invention is not limited thereto.

The imaging lens 200 according to the second preferred embodiment of the present invention has optical characteristics as shown in the following Table 4.

TABLE 4

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 4.993 | 0.421 | 1.553 | 48.7 | Asphere | L1 |
| S3 | −4.538 | 0.050 | | | Asphere | |
| S4 | −362.542 | 0.634 | 1.544 | 56.1 | Asphere | L2 |
| S5 | −2.196 | 0.050 | | | Asphere | |
| S6 | −4.304 | 0.300 | 1.615 | 25.9 | Asphere | L3 |
| S7 | 8.241 | 0.503 | | | Asphere | |
| S8 | −1.803 | 0.523 | 1.606 | 26.7 | Asphere | L4 |
| S9 | −3.616 | 0.166 | | | Asphere | |
| S10 | 5.827 | 0.837 | 1.544 | 55.9 | Asphere | L5 |
| S11 | −1.782 | 0.516 | | | Asphere | |
| S12 | −2.055 | 0.300 | 1.519 | 55.6 | Asphere | L6 |
| S13 | 2.814 | 0.300 | | | Asphere | |
| S14 | infinite | 0.300 | 1.516 | 64.2 | Flat | Filter |
| S15 | infinite | 0.600 | | | Flat | |
| S16 | infinite | — | — | — | Flat | Image sensor |

As shown in the above Table 4, all surfaces of the first lens 210 (L1), the second lens 220 (L2), the third lens 230 (L3), the fourth lens 240 (L4), the fifth lens 250 (L5), and the sixth lens 260 (L6) of the imaging lens 200 according to the second preferred embodiment of the present invention are aspheric surfaces.

In addition, a "−" value stated in the above Table 4 means a value that is not defined.

Further, S1 means a surface determining a light amount of the imaging lens 200 according to the preferred embodiment of the present invention, and Stop stated in the Remark column of S1 means the aperture stop 205 (S1) used to adjust a light amount.

Here, although the aperture stop 205 is disposed on the surface of the first lens 210 toward the object side, a position of the aperture stop 205 according to the second preferred embodiment of the present invention is not limited thereto. In addition, the imaging lens 200 according to the second preferred embodiment of the present invention is not necessarily limited to including the aperture stop 205.

The following Table 5 shows aspheric constant values of aspheric lenses according to the second preferred embodiment of the present invention.

TABLE 5

| Lens surface No. | K | A | B | C | D |
|---|---|---|---|---|---|
| S2 | 0 | −8.50E−02 | −3.61E−02 | 5.33E−03 | 6.32E−03 |
| S3 | 0 | −3.57E−02 | 8.73E−03 | −2.41E−02 | 2.35E−02 |
| S4 | 0 | 4.42E−02 | 1.27E−02 | −3.10E−02 | −1.44E−02 |
| S5 | 0 | −4.24E−02 | −2.00E−02 | 1.05E−02 | −1.16E−02 |
| S6 | 0 | −1.14E−01 | 2.37E−02 | 1.97E−02 | 4.28E−03 |
| S7 | 0 | −8.93E−02 | 1.04E−02 | −4.13E−03 | −1.42E−03 |
| S8 | 0 | −2.28E−02 | −3.35E−03 | 2.52E−02 | −7.85E−03 |
| S9 | 0 | −1.34E−01 | 8.55E−02 | −7.49E−03 | 2.26E−03 |
| S10 | 0 | −1.38E−01 | 5.11E−02 | −2.06E−02 | 3.73E−03 |
| S11 | 0 | 1.21E−01 | −7.42E−02 | 2.16E−02 | −1.60E−03 |
| S12 | 0 | 9.73E−02 | −1.05E−01 | 4.25E−02 | −5.73E−03 |
| S13 | 0 | −8.13E−02 | 8.91E−03 | −1.78E−04 | −8.58E−05 |

As stated in the above Table 4 and Table 5, S1, which is the aperture stop 205 (S1) used to adjust the light amount, is flat, such that it does not have an aspheric constant value.

In addition, S14 and S15, which are the filter 270, and S16, which is the image sensor corresponding to the light receiving element 280, are flat, such that they do not have aspheric constant values.

In addition, when it is assumed that the entire focal length of the imaging lens 200 according to the second preferred embodiment of the present invention is F and the focal lengths of the first lens 210, the second lens 220, the third lens 230, the fourth lens 240, the fifth lens 250, and the sixth lens 260 are F1, F2, F3, F4, F5, and F6, respectively, the respective values are represented by the following Table 6.

TABLE 6

| Item | |
|---|---|
| Entire focal length (F) of imaging lens | 4.280 |
| Focal length (F1) of first lens | 4.367 |
| Focal length (F2) of second lens | 4.058 |
| Focal length (F3) of third lens | −4.555 |
| Focal length (F4) of fourth lens | −6.651 |
| Focal length (F5) of fifth lens | 2.609 |
| Focal length (F6) of second lens | −2.241 |
| TTL | 5.499 |

In the imaging lens 200 according to the second preferred embodiment of the present invention, when it is assumed that a length from an incident surface of the first lens 210 toward the object side to the image surface is TTL and the entire focal length of the imaging lens 200 is F, the following Conditional Equation may be satisfied.

$$0.95 < TTL/F < 1.35 \quad (1)$$

The above Conditional Equation (1) is a relationship equation of TTL and power of the imaging lens 200 according to the second preferred embodiment of the present invention. The above Conditional Equation (1) is satisfied, thereby making it possible to form the imaging lens 200 in which a telephoto form is possible.

In addition, according to the second preferred embodiment of the present invention, when it is assumed that a length from an incident surface of the first lens 210 toward the object side to the image surface is TTL and the entire focal length of the imaging lens 200 is F, the following Conditional Equation may be satisfied.

$$1.15 < TTL/F < 1.45 \quad (2)$$

Therefore, the above Condition Equation (2) is satisfied, thereby making it possible to form the imaging lens 200 that has good marketability, is capable of more easily securing optical performance, and is slim.

In addition, according to the second preferred embodiment of the present invention, when it is assumed that a synthetic focal length of the first and second lenses 210 and 220 is F12 and the entire focal length of the imaging lens 200 is F, the following Conditional Equation may be satisfied.

$$0.5 < F/F12 < 2.5 \quad (3)$$

The above Conditional Equation (3) is a relationship equation of power of the first and second lenses 210 and 220 according to the second preferred embodiment of the present invention. When the imaging lens 200 is designed to have a value smaller or larger than the above Conditional Equation (3), axial performance is deteriorated, such that marketability is deteriorated and it is difficult to secure optical performance.

Therefore, the above Conditional Equation (3) is satisfied, such that the axial performance is improved, thereby making it possible to form the imaging lens 200 having good marketability and capable of easily securing optical performance.

In addition, in the imaging lens 200 according to the second preferred embodiment of the present invention, when it is assumed that a synthetic focal length of the third and fourth lenses 230 and 240 is F34 and the entire focal length of the imaging lens 200 is F, the following Conditional Equation may be satisfied.

$$-2.5 < F/F34 < -0.4 \quad (4)$$

The above Conditional Equation (4) is a relationship equation of power of the third and fourth lenses 230 and 240 according to the second preferred embodiment of the present invention. When the imaging lens 200 is designed to have a value smaller or larger than the above Conditional Equation (4), chromatic aberration and off-axis aberration are not appropriately corrected, such that marketability is deteriorated and it is difficult to secure optical performance.

Therefore, the above Conditional Equation (4) is satisfied, thereby making it possible to form the imaging lens 200 having good marketability and capable of easily securing optical performance.

In addition, in the imaging lens 200 according to the second preferred embodiment of the present invention, when it is assumed that a focal length of the first lens 210 is F1 and the entire focal length of the imaging lens 200 is F, the following Conditional Equation may be satisfied.

$$0 < F/F1 < 1.5 \quad (5)$$

The above Conditional Equation (5) is a relationship equation of power of the first lens 210 according to the second preferred embodiment of the present invention. When the imaging lens 200 is designed to have a value smaller or larger than the above Conditional Equation (5), a optical power is decreased, such that sensitivity is decreased.

Therefore, the above Conditional Equation (5) is satisfied to prevent a decrease in the optical power, thereby making it possible to form the imaging lens 200 having good sensitivity.

In addition, in the imaging lens 200 according to the second preferred embodiment of the present invention, when it is assumed that a focal length of the third lens 230 is F3 and the entire focal length of the imaging lens 200 is F, the following Conditional Equation may be satisfied.

$$0.2 < |F/F3| < 2.5 \qquad (6)$$

The above Conditional Equation (6) is a relationship equation of power of the third lens 230 according to the second preferred embodiment of the present invention. When the imaging lens 200 is designed to have a value smaller or larger than the above Conditional Equation (6), a optical power is dispersed, such that sensitivity is decreased.

Therefore, the above Conditional Equation (6) is satisfied to prevent dispersion in the optical power, thereby making it possible to form the imaging lens 200 having good sensitivity.

In addition, in the imaging lens 200 according to the second preferred embodiment of the present invention, when it is assumed that a focal length of the fifth lens 250 is F5, a focal length of the sixth lens 260 is F6, and the entire focal length of the imaging lens 200 is F, the following Conditional Equation may be satisfied.

$$0.3 < F/F5 + F/F6 < 6.0 \qquad (7)$$

The above Conditional Equation (7) is a relationship equation of power of the fifth and sixth lenses 250 and 260 according to the second preferred embodiment of the present invention. The above Conditional Equation (7) is satisfied, thereby making it possible to form the imaging lens 200 in which a telephoto form is possible.

In addition, in the imaging lens 200 according to the second preferred embodiment of the present invention, when it is assumed that a length from an incident surface of the first lens 210 toward the object side to the image surface is TTL and an image height is ImgH, the following Conditional Equation may be satisfied.

$$0.35 < TTL/2ImgH < 0.95 \qquad (8)$$

The above Conditional Equation (8) is a relationship equation of TTL and power of the imaging lens 200 according to the second preferred embodiment of the present invention. The above Conditional Equation (8) is satisfied, thereby making it possible to form the imaging lens 200 in a slim form.

In addition, according to the second preferred embodiment of the present invention, when it is assumed that a field of view of the imaging lens 200 is FOV, the following Conditional Equation may be satisfied.

$$65 < FOV < 88 \qquad (9)$$

The above Conditional Equation (9) is a relationship equation for the field of view of the imaging lens 200 according to the second preferred embodiment of the present invention. The above Conditional Equation (9) is satisfied, thereby making it possible to form the imaging lens 200 in a slim form and a pseudo-wide angle form.

In addition, in the imaging lens 200 according to the second preferred embodiment of the present invention, when it is assumed that an average of the Abbe numbers of the first and second lenses 210 and 220 is v12 and an average of the Abbe numbers of the third and fourth lenses 230 and 240 is v34, the following Conditional Equation may be satisfied.

$$10 < v12 - v34 < 45 \qquad (10)$$

The above Conditional Equation (10) is a relationship equation for dispersion of the first and second lenses 210 and 220 and the third and fourth lenses 230 and 240 according to the second preferred embodiment of the present invention. The above Conditional Equation (10) is satisfied, thereby making it possible to effectively decrease chromatic aberration.

In addition, in the imaging lens 200 according to the second preferred embodiment of the present invention, when it is assumed that a focal length of the third lens 230 is F3, a focal length of the fourth lens 240 is F4, and the entire focal length of the imaging lens 200 is F, the following Conditional Equation may be satisfied.

$$0 < |F/F3| + |F/F4| < 3 \qquad (11)$$

The above Conditional Equation (11) is a relationship equation for optical powers of the third and fourth lenses 230 and 240 according to the second preferred embodiment of the present invention. The above Conditional Equation (11) is satisfied, thereby making it possible to decrease aberration.

In addition, in the imaging lens 200 according to the second preferred embodiment of the present invention, when it is assumed that a radius of curvature of a surface of the first lens 210 toward the image surface side is r12 and the entire focal length of the imaging lens 200 is F, the following Conditional Equation may be satisfied.

$$0.15 < r12/F < 0.9 \qquad (12)$$

The above Conditional Equation (12) is a relationship equation of power for the radius of curvature of the surface of the first lens 210 according to the second preferred embodiment of the present invention toward the image surface side. The above Conditional Equation (12) is satisfied, thereby making it possible to form the imaging lens 200 having excellent optical characteristics.

In addition, in the imaging lens 200 according to the second preferred embodiment of the present invention, when it is assumed that a focal length of the first lens 210 is F1 and a focal length of the third lens 230 is F3, the following Conditional Equation may be satisfied.

$$0 < |F1/F3| < 25 \qquad (13)$$

The above Conditional Equation (13) is a relationship equation of power of the first and third lenses 210 and 230 according to the second preferred embodiment of the present invention. The above Conditional Equation (13) is satisfied, thereby making it possible to form the imaging lens 200 having excellent optical characteristics.

In addition, in the imaging lens 200 according to the second preferred embodiment of the present invention, when it is assumed that a radius of curvature of a surface of the fifth lens 250 toward the object side is r9 and a radius of curvature of a surface of the fifth lens 250 toward the image surface side is r10, the following Conditional Equation may be satisfied.

$$0 < |(r9 - r10)/(r9 + r10)| < 6 \qquad (14)$$

The above Conditional Equation (14) is a relationship equation of power of the fifth lens 250 according to the second preferred embodiment of the present invention. The above Conditional Equation (14) is satisfied, thereby making it possible to form the fifth lens 250 having the positive (+) power.

In addition, in the imaging lens 200 according to the second preferred embodiment of the present invention, when it is assumed that the entire focal length of the imaging lens 200 is F, a focal length of the first lens 210 is F1, and a focal length of the second lens 220 is F2, the following Conditional Equation may be satisfied.

$$0.2 < |F/F1| + |F/F2| < 4 \qquad (15)$$

The above Conditional Equation (15) is a relationship equation for determining the entire power of the imaging lens 200 according to the second preferred embodiment of the present invention. The above Conditional Equation (15) is satisfied, thereby making it possible to form the imaging lens 200 having excellent optical characteristics.

In addition, in the imaging lens 200 according to the second preferred embodiment of the present invention, when it is assumed that a focal length of the first lens 210 is F1, a focal length of the second lens 220 is F2, a focal length of the third lens 230 is F3, and a focal length of the fourth lens 240 is F4, the following Conditional Equation may be satisfied.

$$0<(|F1|+|F2|)/(|F3|+|F4|)<30 \quad (16)$$

The above Conditional Equation (16) is a relationship equation of power of the first lens 210, the second lens 220, the third lens 230, and the fourth lens 240 according to the second preferred embodiment of the present invention. The above Conditional Equation (16) is satisfied, thereby making it possible to form the imaging lens 200 having excellent optical characteristics.

In addition, in the imaging lens 200 according to the second preferred embodiment of the present invention, when it is assumed that the entire focal length of the imaging lens 200 is F, a focal length of the fourth lens 240 is F4, a focal length of the fifth lens 250 is F5, and a focal length of the sixth lens 260 is F6, the following Conditional Equation may be satisfied.

$$0.20<|F/F4|+|F/F5|+|F/F6|<7.5 \quad (17)$$

The above Conditional Equation (17) is a relationship equation of power of the fourth lens 240, the fifth lens 250, and the sixth lens 260 according to the second preferred embodiment of the present invention. The above Conditional Equation (17) is satisfied, thereby making it possible to form the imaging lens 200 having excellent optical characteristics.

In addition, in the imaging lens 200 according to the second preferred embodiment of the present invention, when it is assumed that the entire focal length of the imaging lens 200 is F and a length between a surface of the first lens 210 toward the object side and a surface of the sixth surface 260 toward the image surface side on an optical axis is DL, the following Conditional Equation may be satisfied.

$$0.7<DL/F<1.2 \quad (18)$$

The above Conditional Equation (18) is satisfied, thereby making it possible to form the imaging lens 200 that is compact.

In addition, in the imaging lens 200 according to the second preferred embodiment of the present invention, when it is assumed that the Abbe number of the fourth lens 240 is v4 and the Abbe number of the fifth lens 250 is v5, the following Conditional Equation may be satisfied.

$$42<v4+v5<115 \quad (19)$$

The above Conditional Equation (19) is a relationship equation for dispersion of the fourth and fifth lenses 240 and 250 according to the second preferred embodiment of the present invention. The above Conditional Equation (19) is satisfied, thereby making it possible to form the imaging lens 200 having excellent optical characteristics.

Figure 5:
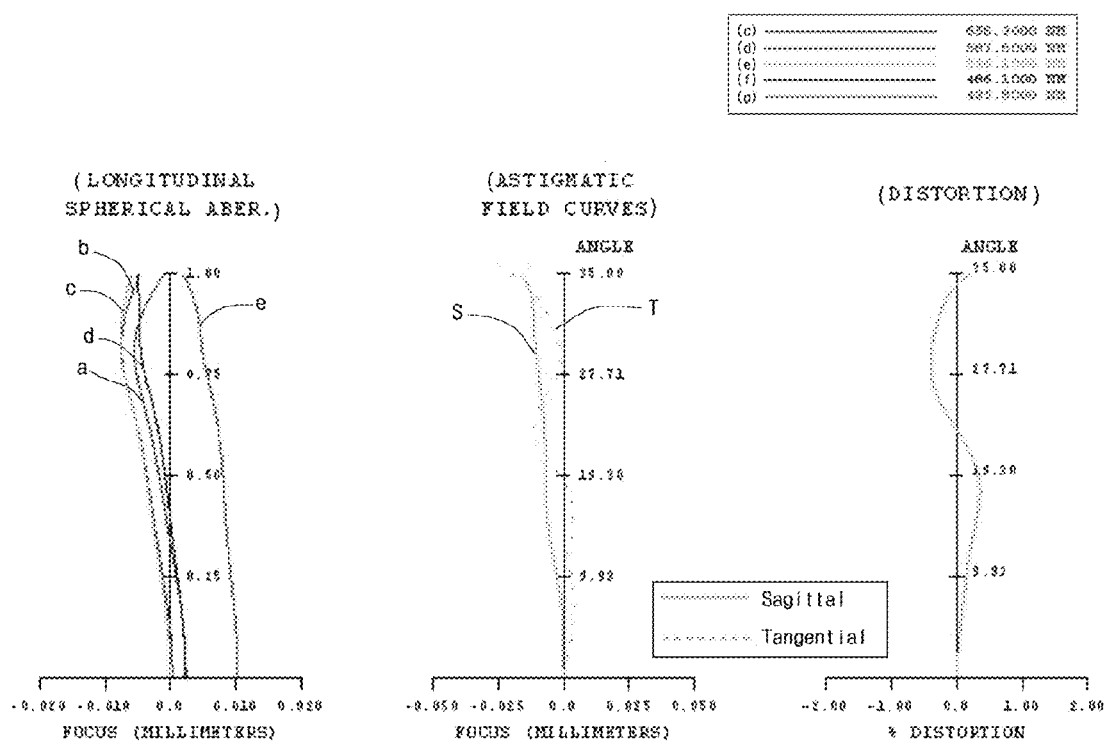
FIGS. 5 and 6 are graphs showing aberration characteristics according to the second preferred embodiment of the present invention.
Figure 6:
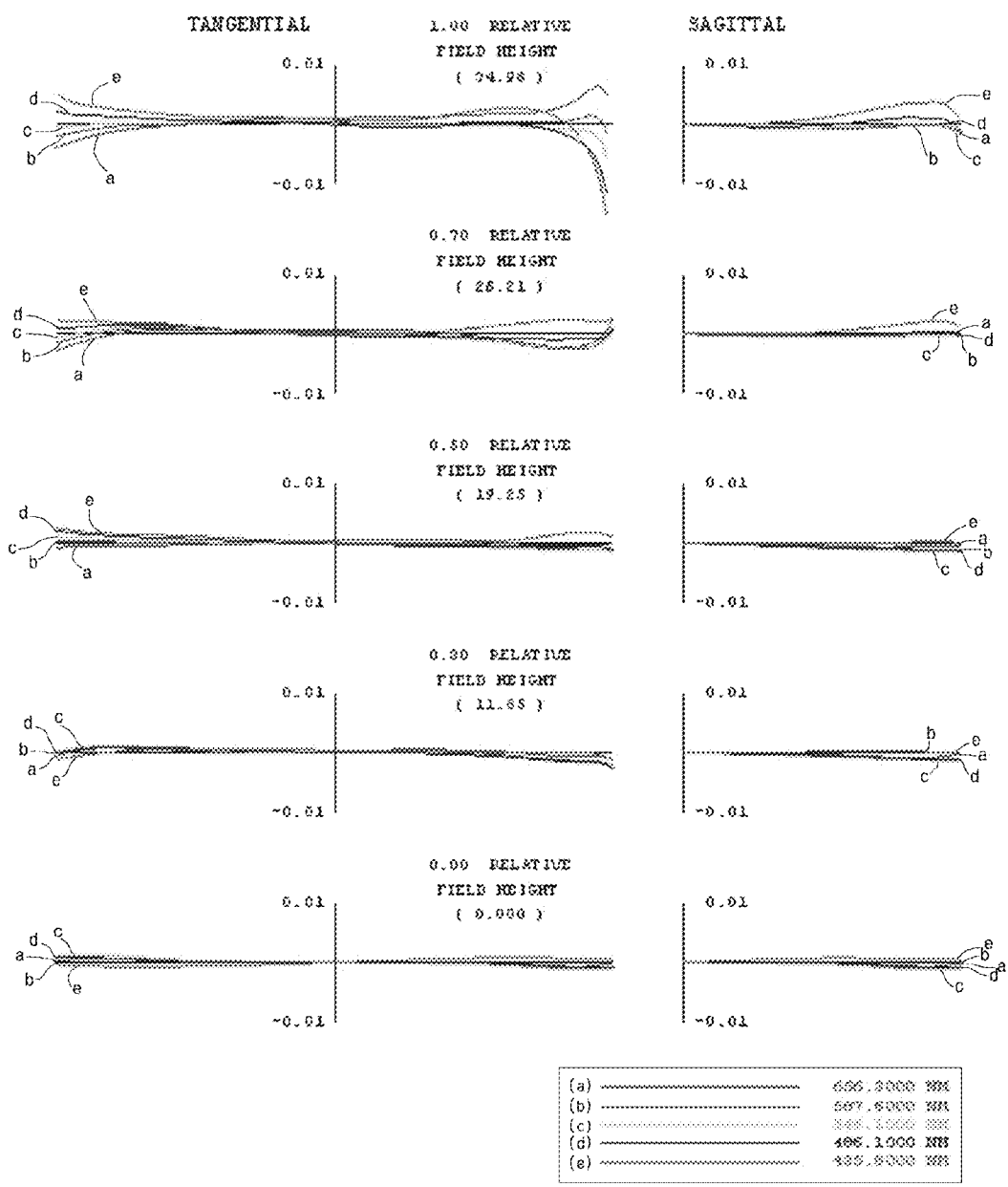

FIGS. 5 and 6 are graphs showing aberration characteristics according to the second preferred embodiment of the present invention. In FIGS. 5 and 6, the aberration characteristics are shown by representing a plurality of wavelengths by a plurality of colors.

Here, FIG. 5 is a graph obtained by measuring longitudinal spherical aberration, astigmatic field curve, and distortion according to the second preferred embodiment of the present invention. Further, FIG. 6 is a graph obtained by measuring coma aberration according to the second preferred embodiment of the present invention.

As shown in FIG. 5, the graph obtained by measuring the longitudinal spherical aberration shows longitudinal spherical aberration depending on each wavelength. Here, it may be appreciated that since it is shown that each wavelength is adjacent to a vertical axis, characteristics of the longitudinal spherical aberration are excellent.

In addition, the graph obtained by measuring the astigmatic field curve shows aberration characteristics of a direction component (X) of x axis light and a direction component (Y) of y axis light according to an image surface height (ANGLE) viewed from the object side, which is a vertical axis, and a focus (FOCUS) position, which is a horizontal axis. Here, it may be appreciated that since it is shown that X and Y are adjacent to each other, an image is not blurred and a phenomenon that a resolution is deteriorated does not appear.

In addition, the graph obtained by measuring the distortion shows distortion characteristics, which are a horizontal axis, according to an image surface height (ANGLE) viewed from the object side. Here, it may be appreciated that since a distortion degree is mainly positioned between −1 to +1 of the distortion, which is the horizontal axis, there is no substantially distortion.

As shown in FIG. 6, the graph obtained by measuring the coma aberration shows tangential and sagittal aberration characteristics depending on each wavelength according to an image surface height. Here, it may be appreciated that since it is shown that each wavelength is adjacent to a horizontal axis, small transversal chromatic aberration appears.

<Third Referred Embodiment>

Figure 7:
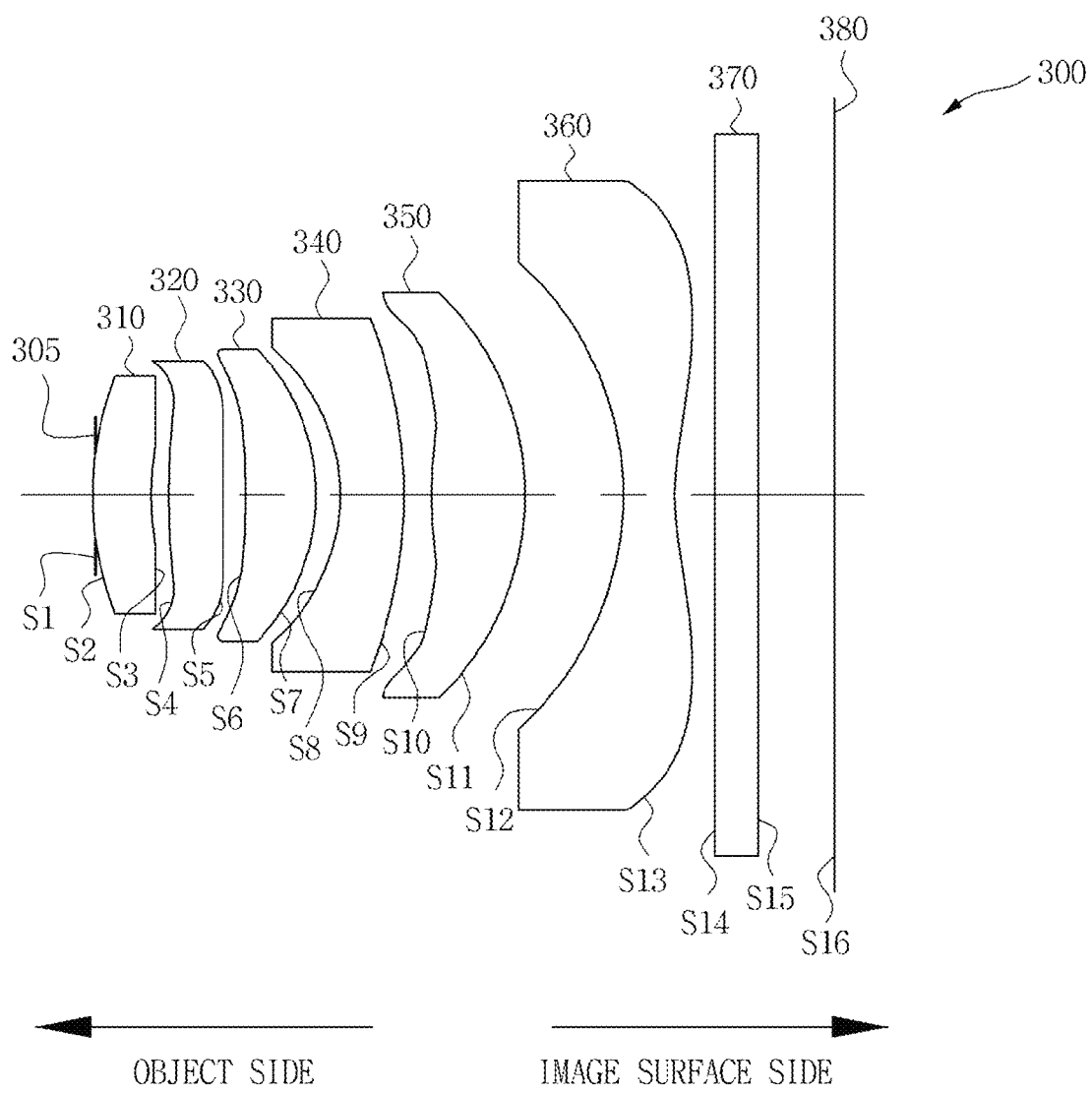
FIG. 7 is a lateral cross-sectional view schematically showing an internal structure of an imaging lens according to a third preferred embodiment of the present invention.

FIG. 7 is a lateral cross-sectional view schematically showing an internal structure of an imaging lens according to a third preferred embodiment of the present invention.

Referring to FIG. 7, the imaging lens 300 according to the third preferred embodiment of the present invention is configured to include a first lens 310, a second lens 320, a third lens 330, a fourth lens 340, a fifth lens 350, and a sixth lens 360 sequentially disposed from an object side. In addition, the imaging lens 300 according to the third preferred embodiment of the present invention may further include an aperture stop 305 positioned to be closer to the object side or an image surface side as compared with any one of the first to sixth lenses 310 and 360.

First, in order to obtain an image of the object (subject), light corresponding to image information of the object sequentially passes through the first lens 310, the aperture stop 305, the second lens 320, the third lens 330, the fourth lens 340, the fifth lens 350, the sixth lens 360, and a filter 370, and is then incident to a light receiving element 380.

Here, the first lens 310 is formed to have positive (+) power and have a shape in which it is convex toward the object side.

In addition, the second lens 320 is formed to have positive (+) power.

In addition, the third lens 330 is formed to have positive (+) power.

Further, the fourth lens 340 is formed to have negative (−) power.

Here, at least one of the third and fourth lenses 330 and 340 is formed to have the Abbe number (V) smaller than 30, thereby making it possible to significantly decrease chromatic aberration. However, the present invention is not necessary limited thereto. For example, at least one of the third and fourth lenses 330 and 340 is formed to have the Abbe number (V) that is in the range of 20 to 30, thereby making it possible to more significantly decrease chromatic aberration.

In addition, the fifth lens 350 may be formed to have positive (+) power and have a shape in which it is convex toward the object side and the image surface side. In this case, the fifth lens 350 is formed to have a point of inflection on at least one of a surface thereof toward the object side and a surface thereof toward the image surface side.

Further, the sixth lens 360 is formed to have negative (−) power, be concave toward the image surface side, and have a point of inflection on a surface thereof toward the image surface side.

Here, the first lens 310, the second lens 320, the third lens 330, the fourth lens 340, the fifth lens 350, and the sixth lens 360 may be formed as an aspheric surface. However, the present invention is not limited thereto.

In addition, the aperture stop 305 is disposed to be closer to the object side or the image surface side as compared with any one of the first to fifth lenses 310 and 350 and selectively collects incident light to adjust a focal length. Here, as an example, the aperture stop 305 may be disposed to be closer to the object side or the image surface side as compared with the first lens 310. In addition, as another example, the aperture stop 305 may be disposed between a surface of the first lens 310 toward the object side and a surface of the third lens 330 toward the object side. However, a position of the aperture stop 305 according to the third preferred embodiment of the present invention is not limited to the positions according to an example and another example.

In addition, the filter 370 may be an infrared (IR) cut filter. However, a kind of filter 370 according to the third preferred embodiment of the present invention is not limited thereto.

Here, the IR cut filter serves to cut radiant heat discharged from external light so as not to be transferred to the light receiving element 380.

That is, the IR cut filter has a structure in which it transmits a visible ray therethrough and reflects an infrared ray to discharge the infrared ray to the outside.

In addition, the light receiving element 380 having a surface on which an image is formed may be configured of an image sensor converting an optical signal corresponding to a subject image into an electrical signal. Here, the image sensor may be a charge coupled device (CCD) or a complementary metal oxide semiconductor (CMOS) sensor. However, the light receiving element according to the preferred embodiment of the present invention is not limited thereto.

The imaging lens 300 according to the third preferred embodiment of the present invention has optical characteristics as shown in the following Table 7.

TABLE 7

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 2.191 | 0.430 | 1.544 | 56.1 | Asphere | L1 |
| S3 | 2.819 | 0.111 | | | Asphere | |
| S4 | 2.199 | 0.420 | 1.544 | 56.1 | Asphere | L2 |
| S5 | 5.717 | 0.156 | | | Asphere | |
| S6 | −12.830 | 0.520 | 1.544 | 56.1 | Asphere | L3 |
| S7 | −2.070 | 0.192 | | | Asphere | |
| S8 | −1.216 | 0.467 | 1.639 | 23.3 | Asphere | L4 |
| S9 | −5.562 | 0.212 | | | Asphere | |
| S10 | 6.132 | 0.677 | 1.569 | 39.5 | Asphere | L5 |
| S11 | −1.858 | 0.736 | | | Asphere | |
| S12 | −2.869 | 0.380 | 1.507 | 60.1 | Asphere | L6 |
| S13 | 2.820 | 0.300 | | | Asphere | |
| S14 | infinite | 0.300 | 1.516 | 64.2 | Flat | Filter |
| S15 | infinite | 0.600 | | | Flat | |
| S16 | infinite | — | — | — | Flat | Image sensor |

As shown in the above Table 7, all surfaces of the first lens 310 (L1), the second lens 320 (L2), the third lens 330 (L3), the fourth lens 340 (L4), the fifth lens 350 (L5), and the sixth lens 360 (L6) of the imaging lens 300 according to the third preferred embodiment of the present invention are aspheric surfaces.

In addition, a "−" value stated in the above Table 7 means a value that is not defined.

Further, S1 means a surface determining a light amount of the imaging lens 300 according to the preferred embodiment of the present invention, and Stop stated in the Remark column of S1 means the aperture stop 305 (S1) used to adjust a light amount.

Here, although the aperture stop 305 is disposed on the surface of the first lens 310 toward the object side, a position of the aperture stop 305 according to the third preferred embodiment of the present invention is not limited thereto. In addition, the imaging lens 300 according to the third preferred embodiment of the present invention is not necessarily limited to including the aperture stop 305.

The following Table 8 shows aspheric constant values of aspheric lenses according to the third preferred embodiment of the present invention.

TABLE 8

| Lens surface No. | K | A | B | C | D |
|---|---|---|---|---|---|
| S2 | 0 | −2.54E−02 | 4.60E−03 | 1.25E−03 | −3.08E−02 |
| S3 | 0 | −2.43E−01 | 1.14E−01 | −1.09E−01 | −3.37E−03 |
| S4 | 0 | −2.83E−01 | −1.43E−02 | 6.02E−03 | −6.49E−02 |
| S5 | 0 | −1.51E−01 | −2.01E−01 | 1.72E−01 | −4.90E−02 |
| S6 | 0 | −9.45E−02 | −1.82E−01 | 1.25E−01 | 1.03E−02 |
| S7 | 0 | −6.47E−02 | −9.26E−02 | 9.60E−02 | −1.96E−02 |
| S8 | 0 | 8.71E−03 | 6.02E−02 | 2.96E−02 | −3.56E−03 |
| S9 | 0 | −1.21E−01 | 7.85E−02 | −1.44E−02 | −1.28E−03 |
| S10 | 0 | −1.03E−01 | −1.49E−02 | −2.08E−02 | 1.15E−02 |
| S11 | 0 | 1.12E−01 | −8.26E−02 | 1.17E−02 | 3.70E−03 |
| S12 | 0 | 4.79E−02 | −9.02E−02 | 4.16E−02 | −6.45E−03 |
| S13 | 0 | −8.36E−02 | 1.05E−02 | −4.27E−04 | −8.43E−05 |

As stated in the above Table 7 and Table 8, S1, which is the aperture stop 305 (S1) used to adjust the light amount, is flat, such that it does not have an aspheric constant value.

In addition, S14 and S15, which are the filter 370, and S16, which is the image sensor corresponding to the light receiving element 380, are flat, such that they do not have aspheric constant values.

In addition, when it is assumed that the entire focal length of the imaging lens 300 according to the third preferred embodiment of the present invention is F and focal lengths of the first lens 310, the second lens 320, the third lens 330, the fourth lens 340, the fifth lens 350, and the sixth lens 360 are F1, F2, F3, F4, F5, and F6, respectively, the respective values are represented by the following Table 9.

TABLE 9

| Item | |
|---|---|
| Entire focal length (F) of imaging lens | 4.283 |
| Focal length (F1) of first lens | 14.575 |
| Focal length (F2) of second lens | 6.302 |
| Focal length (F3) of third lens | 4.461 |
| Focal length (F4) of fourth lens | −2.541 |
| Focal length (F5) of fifth lens | 2.583 |
| Focal length (F6) of second lens | −2.741 |
| TTL | 5.499 |

In the imaging lens 300 according to the third preferred embodiment of the present invention, when it is assumed that a length from an incident surface of the first lens 310 toward the object side to the image surface is TTL and the entire focal length of the imaging lens 300 is F, the following Conditional Equation may be satisfied.

$$0.95 < TTL/F < 1.35 \quad (1)$$

The above Conditional Equation (1) is a relationship equation of TTL and power of the imaging lens 300 according to the third preferred embodiment of the present invention. The above Conditional Equation (1) is satisfied, thereby making it possible to form the imaging lens 300 in which a telephoto form is possible.

In addition, according to the third preferred embodiment of the present invention, when it is assumed that a length from an incident surface of the first lens 310 toward the object side to the image surface is TTL and the entire focal length of the imaging lens 300 is F, the following Conditional Equation may be satisfied.

$$1.15 < TTL/F < 1.45 \quad (2)$$

The above Condition Equation (2) is satisfied, thereby making it possible to form the imaging lens 300 that has good marketability, is capable of more easily securing optical performance, and is slim.

In addition, according to the third preferred embodiment of the present invention, when it is assumed that a synthetic focal length of the first and second lenses 310 and 320 is F12 and the entire focal length of the imaging lens 300 is F, the following Conditional Equation may be satisfied.

$$0.5 < F/F12 < 2.5 \quad (3)$$

The above Conditional Equation (3) is a relationship equation of power of the first and second lenses 310 and 320 according to the third preferred embodiment of the present invention. When the imaging lens 300 is designed to have a value smaller or larger than the above Conditional Equation (3), axial performance is deteriorated, such that marketability is deteriorated and it is difficult to secure optical performance.

Therefore, the above Conditional Equation (3) is satisfied, such that the axial performance is improved, thereby making it possible to form the imaging lens 300 having good marketability and capable of easily securing optical performance.

In addition, in the imaging lens 300 according to the third preferred embodiment of the present invention, when it is assumed that a synthetic focal length of the third and fourth lenses 330 and 340 is F34 and the entire focal length of the imaging lens 300 is F, the following Conditional Equation may be satisfied.

$$-2.5 < F/F34 < -0.4 \quad (4)$$

The above Conditional Equation (4) is a relationship equation of power of the third and fourth lenses 330 and 340 according to the third preferred embodiment of the present invention. When the imaging lens 300 is designed to have a value smaller or larger than the above Conditional Equation (4), chromatic aberration and off-axis are generated, such that marketability is deteriorated and it is difficult to secure optical performance.

Therefore, the above Conditional Equation (4) is satisfied, such that the chromatic aberration and the off-axis aberration may be collected, thereby making it possible to form the imaging lens 300 having good marketability and capable of easily securing optical performance.

In addition, in the imaging lens 300 according to the third preferred embodiment of the present invention, when it is assumed that a focal length of the first lens 310 is F1 and the entire focal length of the imaging lens 300 is F, the following Conditional Equation may be satisfied.

$$0 < F/F1 < 1.5 \quad (5)$$

The above Conditional Equation (5) is a relationship equation of power of the first lens 310 according to the third preferred embodiment of the present invention. When the imaging lens 300 is designed to have a value smaller or larger than the above Conditional Equation (5), a optical power is decreased, such that sensitivity is decreased.

Therefore, the above Conditional Equation (5) is satisfied to prevent a decrease in the optical power, thereby making it possible to form the imaging lens 300 having good sensitivity.

In addition, in the imaging lens 300 according to the third preferred embodiment of the present invention, when it is assumed that a focal length of the third lens 330 is F3 and the entire focal length of the imaging lens 300 is F, the following Conditional Equation may be satisfied.

$$0.2 < |F/F3| < 2.5 \quad (6)$$

The above Conditional Equation (6) is a relationship equation of power of the third lens 330 according to the third preferred embodiment of the present invention. When the imaging lens 300 is designed to have a value smaller or larger than the above Conditional Equation (6), a optical power is dispersed, such that sensitivity is decreased.

Therefore, the above Conditional Equation (6) is satisfied to prevent dispersion in the optical power, thereby making it possible to form the imaging lens 300 having good sensitivity.

In addition, in the imaging lens 300 according to the third preferred embodiment of the present invention, when it is assumed that a focal length of the fifth lens 350 is F5, a focal length of the sixth lens 360 is F6, and the entire focal length of the imaging lens 300 is F, the following Conditional Equation may be satisfied.

$$0.3 < F/F5 + F/F6 < 6.0 \quad (7)$$

The above Conditional Equation (7) is a relationship equation of power of the fifth and sixth lenses 350 and 360 according to the third preferred embodiment of the present invention. The above Conditional Equation (7) is satisfied, thereby making it possible to form the imaging lens 300 in which a telephoto form is possible.

In addition, in the imaging lens 300 according to the third preferred embodiment of the present invention, when it is assumed that a length from an incident surface of the first lens 310 toward the object side to the image surface is TTL and an image height is ImgH, the following Conditional Equation may be satisfied.

$$0.35 < TTL/2ImgH < 0.95 \quad (8)$$

The above Conditional Equation (8) is a relationship equation of TTL and power of the imaging lens 300 according to the third preferred embodiment of the present invention. The above Conditional Equation (8) is satisfied, thereby making it possible to form the imaging lens 300 in a slim form.

In addition, according to the third preferred embodiment of the present invention, when it is assumed that a field of view of the imaging lens 300 is FOV, the following Conditional Equation may be satisfied.

$$65 < FOV < 88 \quad (9)$$

The above Conditional Equation (9) is a relationship equation for the field of view of the imaging lens 300 according to the third preferred embodiment of the present invention. The above Conditional Equation (9) is satisfied, thereby making it possible to form the imaging lens 300 in a slim form and a pseudo-wide angle form.

In addition, in the imaging lens 300 according to the third preferred embodiment of the present invention, when it is assumed that an average of the Abbe numbers of the first and second lenses 310 and 320 is v12 and an average of the Abbe numbers of the third and fourth lenses 330 and 340 is v34, the following Conditional Equation may be satisfied.

$$10 < v12 - v34 < 45 \quad (10)$$

The above Conditional Equation (10) is a relationship equation for dispersion of the first and second lenses 310 and 320 and the third and fourth lenses 330 and 340 according to the third preferred embodiment of the present invention. The above Conditional Equation (10) is satisfied, thereby making it possible to effectively decrease chromatic aberration.

In addition, in the imaging lens 300 according to the third preferred embodiment of the present invention, when it is assumed that a focal length of the third lens 330 is F3, a focal length of the fourth lens 340 is F4, and the entire focal length of the imaging lens 300 is F, the following Conditional Equation may be satisfied.

$$0 < |F/F3| + |F/F4| < 3 \quad (11)$$

The above Conditional Equation (11) is a relationship equation for optical powers of the third and fourth lenses 330 and 340 according to the third preferred embodiment of the present invention. The above Conditional Equation (11) is satisfied, thereby making it possible to decrease aberration.

In addition, in the imaging lens 300 according to the third preferred embodiment of the present invention, when it is assumed that a radius of curvature of a surface of the first lens 310 toward the image surface side is r12 and the entire focal length of the imaging lens 300 is F, the following Conditional Equation may be satisfied.

$$0.15 < r12/F < 0.9 \quad (12)$$

The above Conditional Equation (12) is a relationship equation of power for the radius of curvature of the surface of the first lens 310 according to the third preferred embodiment of the present invention toward the image surface side. The above Conditional Equation (12) is satisfied, thereby making it possible to form the imaging lens 300 having excellent optical characteristics.

In addition, in the imaging lens 300 according to the third preferred embodiment of the present invention, when it is assumed that a focal length of the first lens 310 is F1 and a focal length of the third lens 330 is F3, the following Conditional Equation may be satisfied.

$$0 < |F1/F3| < 25 \quad (13)$$

The above Conditional Equation (13) is a relationship equation of power of the first and third lenses 310 and 330 according to the third preferred embodiment of the present invention. The above Conditional Equation (13) is satisfied, thereby making it possible to form the imaging lens 300 having excellent optical characteristics.

In addition, in the imaging lens 300 according to the third preferred embodiment of the present invention, when it is assumed that a radius of curvature of a surface of the fifth lens 350 toward the object side is r9 and a radius of curvature of a surface of the fifth lens 350 toward the image surface side is r10, the following Conditional Equation may be satisfied.

$$0 < |(r9 - r10)/(r9 + r10)| < 6 \quad (14)$$

The above Conditional Equation (14) is a relationship equation of power of the fifth lens 350 according to the third preferred embodiment of the present invention. The above Conditional Equation (14) is satisfied, thereby making it possible to form the fifth lens 350 having the positive (+) power.

In addition, in the imaging lens 300 according to the third preferred embodiment of the present invention, when it is assumed that the entire focal length of the imaging lens 300 is F, a focal length of the first lens 310 is F1, and a focal length of the second lens 320 is F2, the following Conditional Equation may be satisfied.

$$0.2 < |F/F1| + |F/F2| < 4 \quad (15)$$

The above Conditional Equation (15) is a relationship equation for determining the entire power of the imaging lens 300 according to the third preferred embodiment of the present invention. The above Conditional Equation (15) is satisfied, thereby making it possible to form the imaging lens 300 having excellent optical characteristics.

In addition, in the imaging lens 300 according to the third preferred embodiment of the present invention, when it is assumed that a focal length of the first lens 310 is F1, a focal length of the second lens 320 is F2, a focal length of the third lens 330 is F3, and a focal length of the fourth lens 340 is F4, the following Conditional Equation may be satisfied.

$$0 < (|F1| + |F2|)/(|F3| + |F4|) < 30 \quad (16)$$

The above Conditional Equation (16) is a relationship equation of power of the first lens 310, the second lens 320, the third lens 330, and the fourth lens 340 according to the third preferred embodiment of the present invention. The above Conditional Equation (16) is satisfied, thereby making it possible to form the imaging lens 300 having excellent optical characteristics.

In addition, in the imaging lens 300 according to the third preferred embodiment of the present invention, when it is assumed that the entire focal length of the imaging lens 300 is F, a focal length of the fourth lens 340 is F4, a focal length of the fifth lens 350 is F5, and a focal length of the sixth lens 360 is F6, the following Conditional Equation may be satisfied.

$$0.20 < |F/F4| + |F/F5| + |F/F6| < 7.5 \quad (17)$$

The above Conditional Equation (17) is a relationship equation of power of the fourth lens 340, the fifth lens 350, and the sixth lens 360 according to the third preferred embodiment of the present invention. The above Conditional Equation (17) is satisfied, thereby making it possible to form the imaging lens 300 having excellent optical characteristics.

In addition, in the imaging lens 300 according to the third preferred embodiment of the present invention, when it is assumed that the entire focal length of the imaging lens 300 is F and a length between a surface of the first lens 310 toward the object side and a surface of the sixth surface 360 toward the image surface side on an optical axis is DL, the following Conditional Equation may be satisfied.

$$0.7 < DL/F < 1.2 \quad (18)$$

The above Conditional Equation (18) is satisfied, thereby making it possible to form the imaging lens 300 that is compact.

In addition, in the imaging lens 300 according to the third preferred embodiment of the present invention, when it is assumed that the Abbe number of the fourth lens 340 is v4 and the Abbe number of the fifth lens 350 is v5, the following Conditional Equation may be satisfied.

$$42 < v4 + v5 < 115 \quad (19)$$

The above Conditional Equation (19) is a relationship equation for dispersion of the fourth and fifth lenses 340 and 350 according to the third preferred embodiment of the present invention. The above Conditional Equation (19) is satisfied, thereby making it possible to form the imaging lens 300 having excellent optical characteristics.

Figure 8:
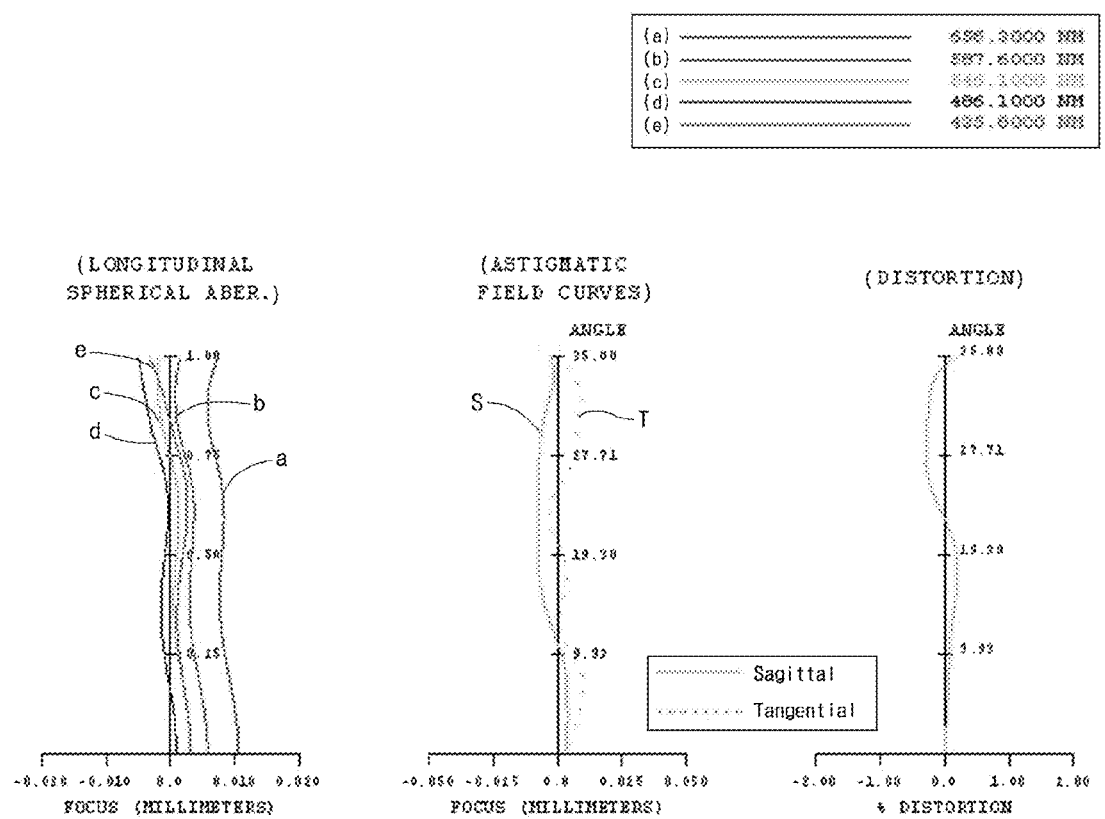
FIGS. 8 and 9 are graphs showing aberration characteristics according to the third preferred embodiment of the present invention.
Figure 9:
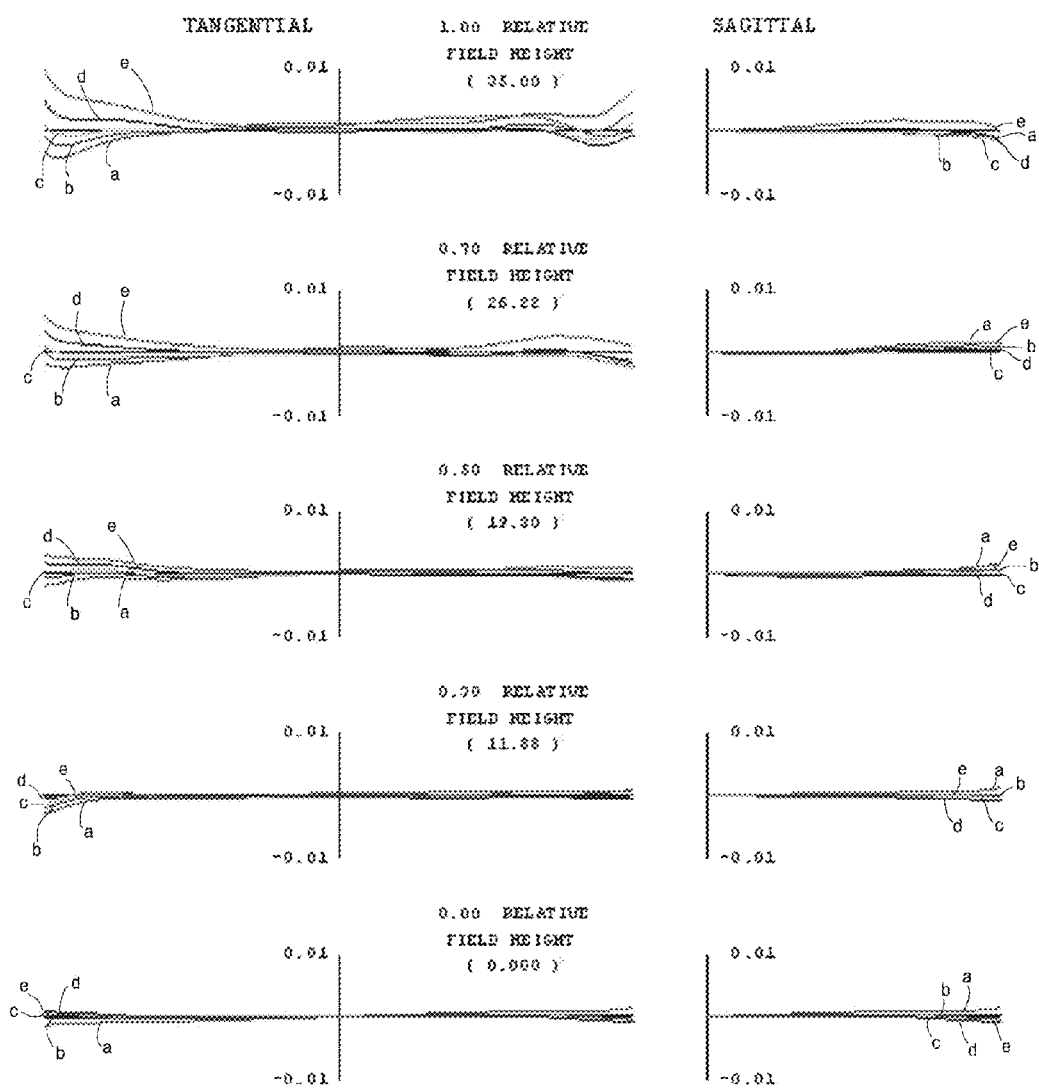

FIGS. 8 and 9 are graphs showing aberration characteristics according to the third preferred embodiment of the present invention. In FIGS. 8 and 9, the aberration characteristics are shown by representing a plurality of wavelengths by a plurality of colors.

Here, FIG. 8 is a graph obtained by measuring longitudinal spherical aberration, astigmatic field curve, and distortion according to the third preferred embodiment of the present invention. Further, FIG. 9 is a graph obtained by measuring coma aberration according to the third preferred embodiment of the present invention.

As shown in FIG. 8, the graph obtained by measuring the longitudinal spherical aberration shows longitudinal spherical aberration depending on each wavelength. Here, it may be appreciated that since it is shown that each wavelength is adjacent to a vertical axis, characteristics of the longitudinal spherical aberration are excellent.

In addition, the graph obtained by measuring the astigmatic field curve shows aberration characteristics of a direction component (X) of x axis light and a direction component (Y) of y axis light according to an image surface height (ANGLE) viewed from the object side, which is a vertical axis, and a focus (FOCUS) position, which is a horizontal axis. Here, it may be appreciated that since it is shown that X and Y are adjacent to each other, an image is not blurred and a phenomenon that a resolution is deteriorated does not appear.

In addition, the graph obtained by measuring the distortion shows distortion characteristics, which are a horizontal axis, according to an image surface height (ANGLE) viewed from the object side. Here, it may be appreciated that since a distortion degree is mainly positioned between −1 to +1 of the distortion, which is the horizontal axis, there is no substantially distortion.

As shown in FIG. 9, the graph obtained by measuring the coma aberration shows tangential and sagittal aberration characteristics depending on each wavelength according to an image surface height. Here, it may be appreciated that since it is shown that each wavelength is adjacent to a horizontal axis, small transversal chromatic aberration appears.

<Fourth Referred Embodiment>

Figure 10:
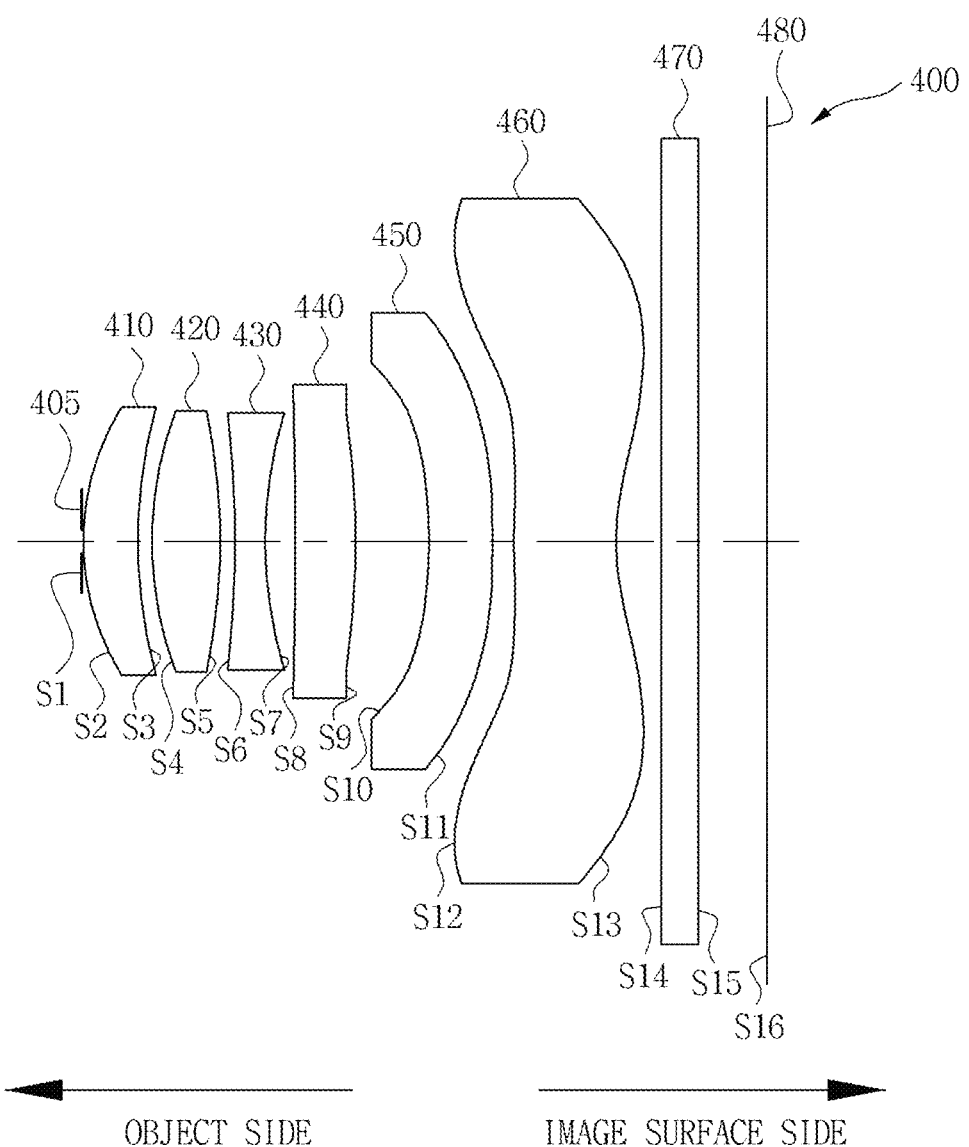
FIG. 10 is a lateral cross-sectional view schematically showing an internal structure of an imaging lens according to a fourth preferred embodiment of the present invention.

FIG. 10 is a lateral cross-sectional view schematically showing an internal structure of an imaging lens according to a fourth preferred embodiment of the present invention.

Figure 12:
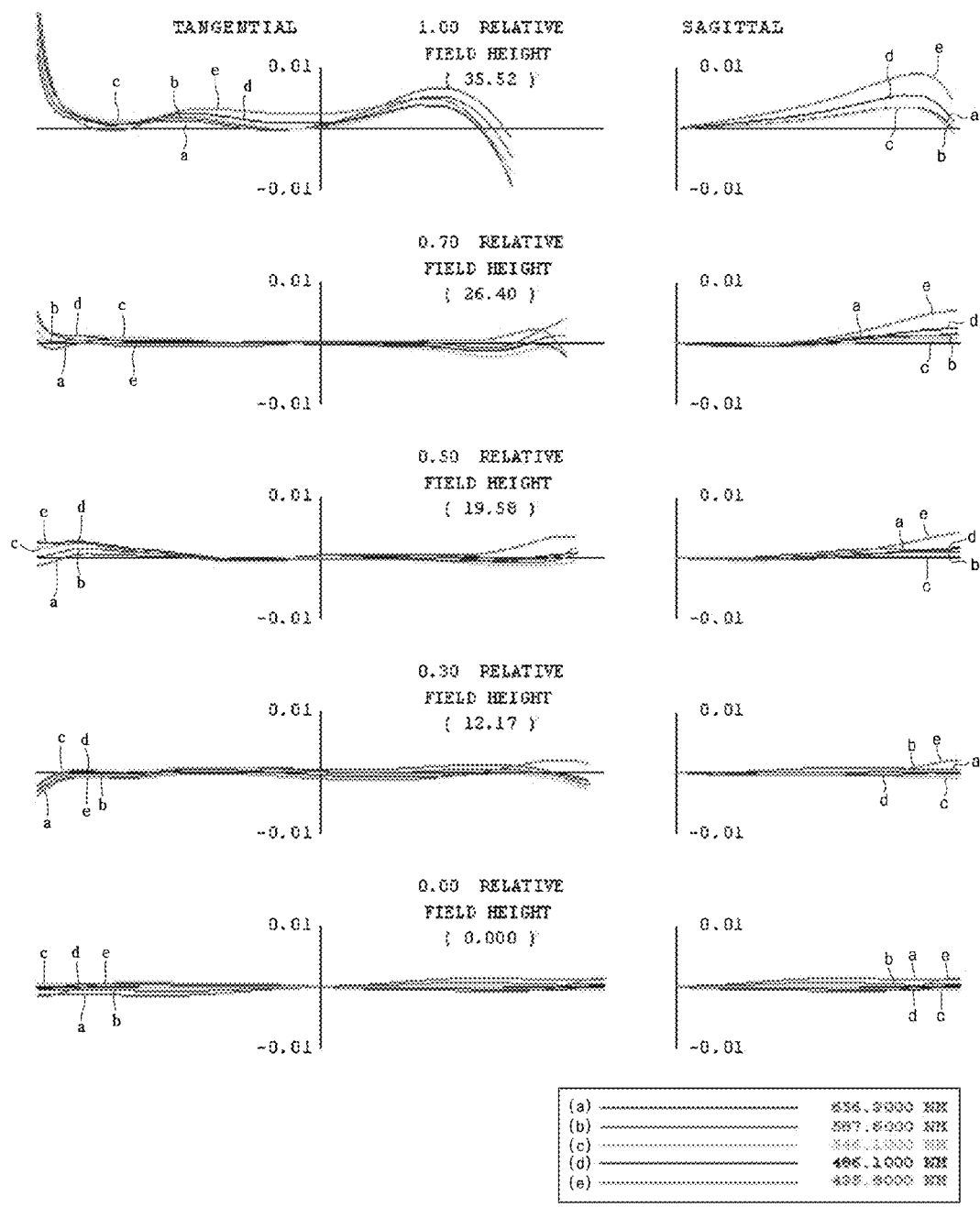

Referring to FIG. 12, the imaging lens 400 according to the fourth preferred embodiment of the present invention is configured to include a first lens 410, a second lens 420, a third lens 430, a fourth lens 440, a fifth lens 450, and a sixth lens 460 sequentially disposed from an object side. In addition, the imaging lens 400 according to the fourth preferred embodiment of the present invention may further include an aperture stop 405 positioned to be closer to the object side or an image surface side as compared with any one of the first to sixth lenses 410 and 460.

First, in order to obtain an image of the object (subject), light corresponding to image information of the object sequentially passes through the first lens 410, the aperture stop 405, the second lens 420, the third lens 430, the fourth lens 440, the fifth lens 450, the sixth lens 460, and a filter 470, and is then incident to a light receiving element 480.

Here, the first lens 410 is formed to have positive (+) power and have a shape in which it is convex toward the object side.

In addition, the second lens 420 is formed to have positive (+) power.

In addition, the third and fourth lenses 430 and 440 may be formed to positive (+) or negative (−) power.

Here, at least one of the third and fourth lenses 430 and 440 is formed to have the Abbe number (V) smaller than 30, thereby making it possible to significantly decrease chromatic aberration. However, the present invention is not necessary limited thereto. For example, at least one of the third and fourth lenses 430 and 440 is formed to have the Abbe number (V) that is in the range of 20 to 30, thereby making it possible to more significantly decrease chromatic aberration.

In addition, the fifth lens 450 may be formed to have positive (+) power and have a shape in which it is concave toward the object side and is convex the image surface side. In this case, the fifth lens 450 is formed to have a point of inflection on at least one of a surface thereof toward the object side and a surface thereof toward the image surface side.

Further, the sixth lens 460 is formed to have negative (−) power, be concave toward the image surface side, and have a point of inflection on a surface thereof toward the image surface side.

Here, the first lens 410, the second lens 420, the third lens 430, the fourth lens 440, the fifth lens 450, and the sixth lens 460 may be formed as an aspheric surface. However, the present invention is not limited thereto.

In addition, the aperture stop 405 is disposed to be closer to the object side or the image surface side as compared with any one of the first to fifth lenses 410 and 450 and selectively collects incident light to adjust a focal length. Here, as an example, the aperture stop 405 may be disposed to be closer to the object side or the image surface side as compared with the first lens 410. In addition, as another example, the aperture stop 405 may be disposed between a surface of the first lens 410 toward the object side and a surface of the third lens 430 toward the object side. However, a position of the aperture stop 405 according to the fourth preferred embodiment of the present invention is not limited to the positions according to an example and another example.

In addition, the filter 470 may be an infrared (IR) cut filter. However, a kind of filter 470 according to the fourth preferred embodiment of the present invention is not limited thereto.

Here, the IR cut filter serves to cut radiant heat discharged from external light so as not to be transferred to the light receiving element 480.

That is, the IR cut filter has a structure in which it transmits a visible ray therethrough and reflects an infrared ray to discharge the infrared ray to the outside.

In addition, the light receiving element 480 having a surface on which an image is formed may be configured of an image sensor converting an optical signal corresponding to a subject image into an electrical signal. Here, the image sensor may be a charge coupled device (CCD) or a complementary metal oxide semiconductor (CMOS) sensor. However, the light receiving element according to the preferred embodiment of the present invention is not limited thereto.

The imaging lens 400 according to the fourth preferred embodiment of the present invention has optical characteristics as shown in the following Table 10.

TABLE 10

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 1.647 | 0.356 | 1.544 | 56.1 | Asphere | L1 |
| S3 | 3.020 | 0.104 | | | Asphere | |
| S4 | 2.721 | 0.477 | 1.544 | 56.1 | Asphere | L2 |
| S5 | −5.437 | 0.089 | | | Asphere | |
| S6 | −5.549 | 0.205 | 1.640 | 23.3 | Asphere | L3 |
| S7 | 3.552 | 0.225 | | | Asphere | |
| S8 | 15.136 | 0.428 | 1.640 | 23.3 | Asphere | L4 |

TABLE 10-continued

| Lens surface No. | Radius of curvature (mm) | Thickness (mm) | Refractive index | Abbe number | Lens shape | Remark |
|---|---|---|---|---|---|---|
| S9 | −5.886 | 0.491 | | | Asphere | |
| S10 | −2.328 | 0.442 | 1.640 | 23.3 | Asphere | L5 |
| S11 | −2.275 | 0.149 | | | Asphere | |
| S12 | 8.035 | 0.712 | 1.534 | 55.7 | Asphere | L6 |
| S13 | 1.572 | 0.174 | | | Asphere | |
| S14 | infinite | 0.270 | 1.517 | 64.2 | Flat | Filter |
| S15 | infinite | 0.580 | | | Flat | |
| S16 | infinite | — | — | — | Flat | Image sensor |

As shown in the above Table 10, all surfaces of the first lens 410 (L1), the second lens 420 (L2), the third lens 430 (L3), the fourth lens 440 (L4), the fifth lens 450 (L5), and the sixth lens 460 (L6) of the imaging lens 400 according to the fourth preferred embodiment of the present invention are aspheric surfaces.

In addition, a "−" value stated in the above Table 10 means a value that is not defined.

Further, S1 means a surface determining a light amount of the imaging lens 400 according to the preferred embodiment of the present invention, and Stop stated in the Remark column of S1 means the aperture stop 405 (S1) used to adjust a light amount.

Here, although the aperture stop 405 is disposed on the surface of the first lens 410 toward the object side, a position of the aperture stop 405 according to the fourth preferred embodiment of the present invention is not limited thereto. In addition, the imaging lens 400 according to the fourth preferred embodiment of the present invention is not necessarily limited to including the aperture stop 405.

The following Table 11 shows aspheric constant values of aspheric lenses according to the fourth preferred embodiment of the present invention.

TABLE 11

| Lens surface No. | K | A | B | C | D | E |
|---|---|---|---|---|---|---|
| S2 | −5.46E−01 | −2.54E−02 | 1.33E−02 | −7.10E−02 | 8.54E−02 | −3.80E−02 |
| S3 | 0 | −8.30E−02 | 9.92E−02 | −1.13E−01 | 1.98E−01 | −1.01E−01 |
| S4 | 0 | −5.45E−02 | 8.93E−02 | −4.35E−02 | 9.85E−02 | −7.15E−02 |
| S5 | −1.48E+01 | 2.60E−02 | −1.20E−01 | 2.44E−02 | 7.79E−02 | −4.72E−02 |
| S6 | −3.77E+01 | 6.86E−02 | −1.50E−01 | 1.29E−01 | 1.60E−03 | 1.90E−03 |
| S7 | 1.26E+01 | −1.72E−02 | −5.99E−02 | 1.43E−01 | −1.03E−01 | 3.23E−02 |
| S8 | 0 | −1.06E−01 | 3.66E−02 | −8.80E−02 | 2.84E−01 | −2.02E−01 |
| S9 | 0 | −4.49E−02 | 1.14E−02 | −6.06E−02 | 1.88E−01 | −9.38E−02 |
| S10 | 0 | 1.84E−01 | −3.30E−01 | 2.14E−01 | −6.47E−02 | 5.44E−03 |
| S11 | −4.44E+00 | 2.06E−01 | −2.88E−01 | 1.67E−01 | −4.92E−02 | 5.83E−03 |
| S12 | −2.63E+02 | −7.38E−02 | −3.81E−02 | 2.99E−02 | −6.06E−03 | 4.04E−04 |
| S13 | −9.73E+00 | −5.82E−02 | 1.20E−02 | −2.22E−03 | 2.10E−04 | −6.28E−06 |

As stated in the above Table 10 and Table 11, S1, which is the aperture stop 405 (S1) used to adjust the light amount, is flat, such that it does not have an aspheric constant value.

In addition, S14 and S15, which are the filter 470, and S16, which is the image sensor corresponding to the light receiving element 480, are flat, such that they do not have aspheric constant values.

In addition, when it is assumed that the entire focal length of the imaging lens 400 according to the fourth preferred embodiment of the present invention is F and focal lengths of the first lens 410, the second lens 420, the third lens 430, the fourth lens 440, the fifth lens 450, and the sixth lens 460 are F1, F2, F3, F4, F5, and F6, respectively, the respective values are represented by the following Table 12.

TABLE 12

| Item | |
|---|---|
| Entire focal length (F) of imaging lens | 4.141 |
| Focal length (F1) of first lens | 6.071 |
| Focal length (F2) of second lens | 3.388 |
| Focal length (F3) of third lens | −3.323 |
| Focal length (F4) of fourth lens | 6.612 |
| Focal length (F5) of fifth lens | 36.112 |
| Focal length (F6) of second lens | −3.788 |
| TTL | 4.703 |

In the imaging lens 400 according to the fourth preferred embodiment of the present invention, when it is assumed that a length from an incident surface of the first lens 410 toward the object side to the image surface is TTL and the entire focal length of the imaging lens 400 is F, the following Conditional Equation may be satisfied.

$$0.95 < TTL/F < 1.35 \quad (1)$$

The above Conditional Equation (1) is a relationship equation of TTL and power of the imaging lens 400 according to the fourth preferred embodiment of the present invention. The above Conditional Equation (1) is satisfied, thereby making it possible to form the imaging lens 400 in which a telephoto form is possible.

In addition, according to the fourth preferred embodiment of the present invention, when it is assumed that a length from an incident surface of the first lens 410 toward the object side to the image surface is TTL and the entire focal length of the imaging lens 400 is F, the following Conditional Equation may be satisfied.

$$1.15 < TTL/F < 1.45 \quad (2)$$

The above Condition Equation (2) is satisfied, thereby making it possible to form the imaging lens 400 that has good marketability, is capable of more easily securing optical performance, and is slim.

In addition, according to the fourth preferred embodiment of the present invention, when it is assumed that a synthetic focal length of the first and second lenses 410 and 420 is F12 and the entire focal length of the imaging lens 400 is F, the following Conditional Equation may be satisfied.

$$0.5 < F/F12 < 2.5 \quad (3)$$

The above Conditional Equation (3) is a relationship equation of power of the first and second lenses 410 and 420 according to the fourth preferred embodiment of the present invention. When the imaging lens 400 is designed to have a value smaller or larger than the above Conditional Equation (3), axial performance is deteriorated, such that marketability is deteriorated and it is difficult to secure optical performance.

Therefore, the above Conditional Equation (3) is satisfied, such that the axial performance is improved, thereby making it possible to form the imaging lens 400 having good marketability and capable of easily securing optical performance.

In addition, in the imaging lens 400 according to the fourth preferred embodiment of the present invention, when it is assumed that a synthetic focal length of the third and fourth lenses 430 and 440 is F34 and the entire focal length of the imaging lens 400 is F, the following Conditional Equation may be satisfied.

$$-2.5 < F/F34 < -0.4 \tag{4}$$

The above Conditional Equation (4) is a relationship equation of power of the third and fourth lenses 430 and 440 according to the fourth preferred embodiment of the present invention. When the imaging lens 400 is designed to have a value smaller or larger than the above Conditional Equation (4), chromatic aberration and off-axis aberration are not appropriately corrected, such that marketability is deteriorated and it is difficult to secure optical performance.

Therefore, the above Conditional Equation (4) is satisfied, thereby making it possible to form the imaging lens 400 having good marketability and capable of easily securing optical performance.

In addition, in the imaging lens 400 according to the fourth preferred embodiment of the present invention, when it is assumed that a focal length of the first lens 410 is F1 and the entire focal length of the imaging lens 400 is F, the following Conditional Equation may be satisfied.

$$0 < F/F1 < 1.5 \tag{5}$$

The above Conditional Equation (5) is a relationship equation of power of the first lens 410 according to the fourth preferred embodiment of the present invention. When the imaging lens 400 is designed to have a value smaller or larger than the above Conditional Equation (5), a optical power is decreased, such that sensitivity is decreased.

Therefore, the above Conditional Equation (5) is satisfied to prevent a decrease in the optical power, thereby making it possible to form the imaging lens 400 having good sensitivity.

In addition, in the imaging lens 400 according to the fourth preferred embodiment of the present invention, when it is assumed that a focal length of the third lens 430 is F3 and the entire focal length of the imaging lens 400 is F, the following Conditional Equation may be satisfied.

$$0.2 < |F/F3| < 2.5 \tag{6}$$

The above Conditional Equation (6) is a relationship equation of power of the third lens 430 according to the fourth preferred embodiment of the present invention. When the imaging lens 400 is designed to have a value smaller or larger than the above Conditional Equation (6), a optical power is dispersed, such that sensitivity is decreased.

Therefore, the above Conditional Equation (6) is satisfied to prevent dispersion in the optical power, thereby making it possible to form the imaging lens 400 having good sensitivity.

In addition, in the imaging lens 400 according to the fourth preferred embodiment of the present invention, when it is assumed that a focal length of the fifth lens 450 is F5, a focal length of the sixth lens 460 is F6, and the entire focal length of the imaging lens 400 is F, the following Conditional Equation may be satisfied.

$$0.3 < F/F5 + F/F6 < 6.0 \tag{7}$$

The above Conditional Equation (7) is a relationship equation of power of the fifth and sixth lenses 450 and 460 according to the fourth preferred embodiment of the present invention. The above Conditional Equation (7) is satisfied, thereby making it possible to form the imaging lens 400 in which a telephoto form is possible.

In addition, in the imaging lens 400 according to the fourth preferred embodiment of the present invention, when it is assumed that a length from an incident surface of the first lens 410 toward the object side to the image surface is TTL and an image height is ImgH, the following Conditional Equation may be satisfied.

$$0.35 < TTL/2\text{ImgH} < 0.95 \tag{8}$$

The above Conditional Equation (8) is a relationship equation of TTL and power of the imaging lens 400 according to the fourth preferred embodiment of the present invention. The above Conditional Equation (8) is satisfied, thereby making it possible to form the imaging lens 400 in a slim form.

In addition, according to the fourth preferred embodiment of the present invention, when it is assumed that a field of view of the imaging lens 400 is FOV, the following Conditional Equation may be satisfied.

$$65 < \text{FOV} < 88 \tag{9}$$

The above Conditional Equation (9) is a relationship equation for the field of view of the imaging lens 400 according to the fourth preferred embodiment of the present invention. The above Conditional Equation (9) is satisfied, thereby making it possible to form the imaging lens 400 in a slim form and a pseudo-wide angle form.

In addition, in the imaging lens 400 according to the fourth preferred embodiment of the present invention, when it is assumed that an average of the Abbe numbers of the first and second lenses 410 and 420 is v12 and an average of the Abbe numbers of the third and fourth lenses 430 and 440 is v34, the following Conditional Equation may be satisfied.

$$10 < v12 - v34 < 45 \tag{10}$$

The above Conditional Equation (10) is a relationship equation for dispersion of the first and second lenses 410 and 420 and the third and fourth lenses 430 and 440 according to the fourth preferred embodiment of the present invention. The above Conditional Equation (10) is satisfied, thereby making it possible to effectively decrease chromatic aberration.

In addition, in the imaging lens 400 according to the fourth preferred embodiment of the present invention, when it is assumed that a focal length of the third lens 430 is F3, a focal length of the fourth lens 440 is F4, and the entire focal length of the imaging lens 400 is F, the following Conditional Equation may be satisfied.

$$0 < |F/F3| + |F/F4| < 3 \tag{11}$$

The above Conditional Equation (11) is a relationship equation for optical powers of the third and fourth lenses 430 and 440 according to the fourth preferred embodiment of the present invention. The above Conditional Equation (11) is satisfied, thereby making it possible to decrease aberration.

In addition, in the imaging lens 400 according to the fourth preferred embodiment of the present invention, when it is assumed that a radius of curvature of a surface of the first lens 410 toward the image surface side is r12 and the entire focal length of the imaging lens 400 is F, the following Conditional Equation may be satisfied.

$$0.15 < r12/F < 0.9 \tag{12}$$

The above Conditional Equation (12) is a relationship equation of power for the radius of curvature of the surface of the first lens 410 according to the fourth preferred embodiment of the present invention toward the image surface side.

The above Conditional Equation (12) is satisfied, thereby making it possible to form the imaging lens 400 having excellent optical characteristics.

In addition, in the imaging lens 400 according to the fourth preferred embodiment of the present invention, when it is assumed that a focal length of the first lens 410 is F1 and a focal length of the third lens 430 is F3, the following Conditional Equation may be satisfied.

$$0<|F1/F3|<25 \tag{13}$$

The above Conditional Equation (13) is a relationship equation of power of the first and third lenses 410 and 430 according to the fourth preferred embodiment of the present invention. The above Conditional Equation (13) is satisfied, thereby making it possible to form the imaging lens 400 having excellent optical characteristics.

In addition, in the imaging lens 400 according to the fourth preferred embodiment of the present invention, when it is assumed that a radius of curvature of a surface of the fifth lens 450 toward the object side is r9 and a radius of curvature of a surface of the fifth lens 450 toward the image surface side is r10, the following Conditional Equation may be satisfied.

$$0<|(r9-r10)/(r9+r10)|<6 \tag{14}$$

The above Conditional Equation (14) is a relationship equation of power of the fifth lens 450 according to the fourth preferred embodiment of the present invention. The above Conditional Equation (14) is satisfied, thereby making it possible to form the fifth lens 450 having the positive (+) power.

In addition, in the imaging lens 400 according to the fourth preferred embodiment of the present invention, when it is assumed that the entire focal length of the imaging lens 400 is F, a focal length of the first lens 410 is F1, and a focal length of the second lens 420 is F2, the following Conditional Equation may be satisfied.

$$0.2<|F/F1|+|F/F2|<4 \tag{15}$$

The above Conditional Equation (15) is a relationship equation for determining the entire power of the imaging lens 400 according to the fourth preferred embodiment of the present invention. The above Conditional Equation (15) is satisfied, thereby making it possible to form the imaging lens 400 having excellent optical characteristics.

In addition, in the imaging lens 400 according to the fourth preferred embodiment of the present invention, when it is assumed that a focal length of the first lens 410 is F1, a focal length of the second lens 420 is F2, a focal length of the third lens 430 is F3, and a focal length of the fourth lens 440 is F4, the following Conditional Equation may be satisfied.

$$0<(|F1|+|F2|)/(|F3|+|F4|)<30 \tag{16}$$

The above Conditional Equation (16) is a relationship equation of power of the first lens 410, the second lens 420, the third lens 430, and the fourth lens 440 according to the fourth preferred embodiment of the present invention. The above Conditional Equation (16) is satisfied, thereby making it possible to form the imaging lens 400 having excellent optical characteristics.

In addition, in the imaging lens 400 according to the fourth preferred embodiment of the present invention, when it is assumed that the entire focal length of the imaging lens 400 is F, a focal length of the fourth lens 440 is F4, a focal length of the fifth lens 450 is F5, and a focal length of the sixth lens 460 is F6, the following Conditional Equation may be satisfied.

$$0.20<|F/F4|+|F/F5|+|F/F6|<7.5 \tag{17}$$

The above Conditional Equation (17) is a relationship equation of power of the fourth lens 440, the fifth lens 450, and the sixth lens 460 according to the fourth preferred embodiment of the present invention. The above Conditional Equation (17) is satisfied, thereby making it possible to form the imaging lens 400 having excellent optical characteristics.

In addition, in the imaging lens 400 according to the fourth preferred embodiment of the present invention, when it is assumed that the entire focal length of the imaging lens 400 is F and a length between a surface of the first lens 410 toward the object side and a surface of the sixth surface 460 toward the image surface side on an optical axis is DL, the following Conditional Equation may be satisfied.

$$0.7<DL/F<1.2 \tag{18}$$

The above Conditional Equation (18) is satisfied, thereby making it possible to form the imaging lens 400 that is compact.

In addition, in the imaging lens 400 according to the fourth preferred embodiment of the present invention, when it is assumed that the Abbe number of the fourth lens 440 is v4 and the Abbe number of the fifth lens 450 is v5, the following Conditional Equation may be satisfied.

$$42<v4+v5<115 \tag{19}$$

The above Conditional Equation (19) is a relationship equation for dispersion of the fourth and fifth lenses 440 and 450 according to the fourth preferred embodiment of the present invention. The above Conditional Equation (19) is satisfied, thereby making it possible to form the imaging lens 400 having excellent optical characteristics.

Figure 11:
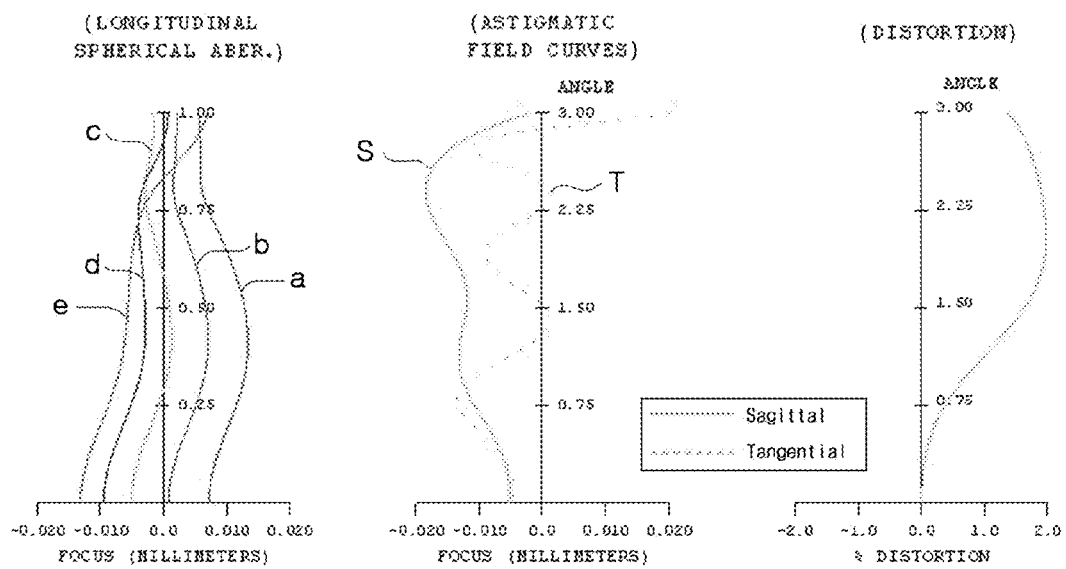
FIGS. 11 and 12 are graphs showing aberration characteristics according to the fourth preferred embodiment of the present invention.

FIGS. 11 and 12 are graphs showing aberration characteristics according to the fourth preferred embodiment of the present invention. In FIGS. 11 and 12, the aberration characteristics are shown by representing a plurality of wavelengths by a plurality of colors.

Here, FIG. 11 is a graph obtained by measuring longitudinal spherical aberration, astigmatic field curve, and distortion according to the fourth preferred embodiment of the present invention. Further, FIG. 12 is a graph obtained by measuring coma aberration according to the fourth preferred embodiment of the present invention.

As shown in FIG. 11, the graph obtained by measuring the longitudinal spherical aberration shows longitudinal spherical aberration depending on each wavelength. Here, it may be appreciated that since it is shown that each wavelength is adjacent to a vertical axis, characteristics of the longitudinal spherical aberration are excellent.

In addition, the graph obtained by measuring the astigmatic field curve shows aberration characteristics of a direction component (X) of x axis light and a direction component (Y) of y axis light according to an image surface height (ANGLE) viewed from the object side, which is a vertical axis, and a focus (FOCUS) position, which is a horizontal axis. Here, it may be appreciated that since it is shown that X and Y are adjacent to each other, an image is not blurred and a phenomenon that a resolution is deteriorated does not appear.

In addition, the graph obtained by measuring the distortion shows distortion characteristics, which are a horizontal axis, according to an image surface height (ANGLE) viewed from the object side. Here, it may be appreciated that since a distortion degree is mainly positioned between −1 to +1 of the distortion, which is the horizontal axis, there is no substantially distortion.

As shown in FIG. 12, the graph obtained by measuring the coma aberration shows tangential and sagittal aberration characteristics depending on each wavelength according to an image surface height. Here, it may be appreciated that since it is shown that each wavelength is adjacent to a horizontal axis, small transversal chromatic aberration appears.

<Fifth Referred Embodiment>

Figure 13:
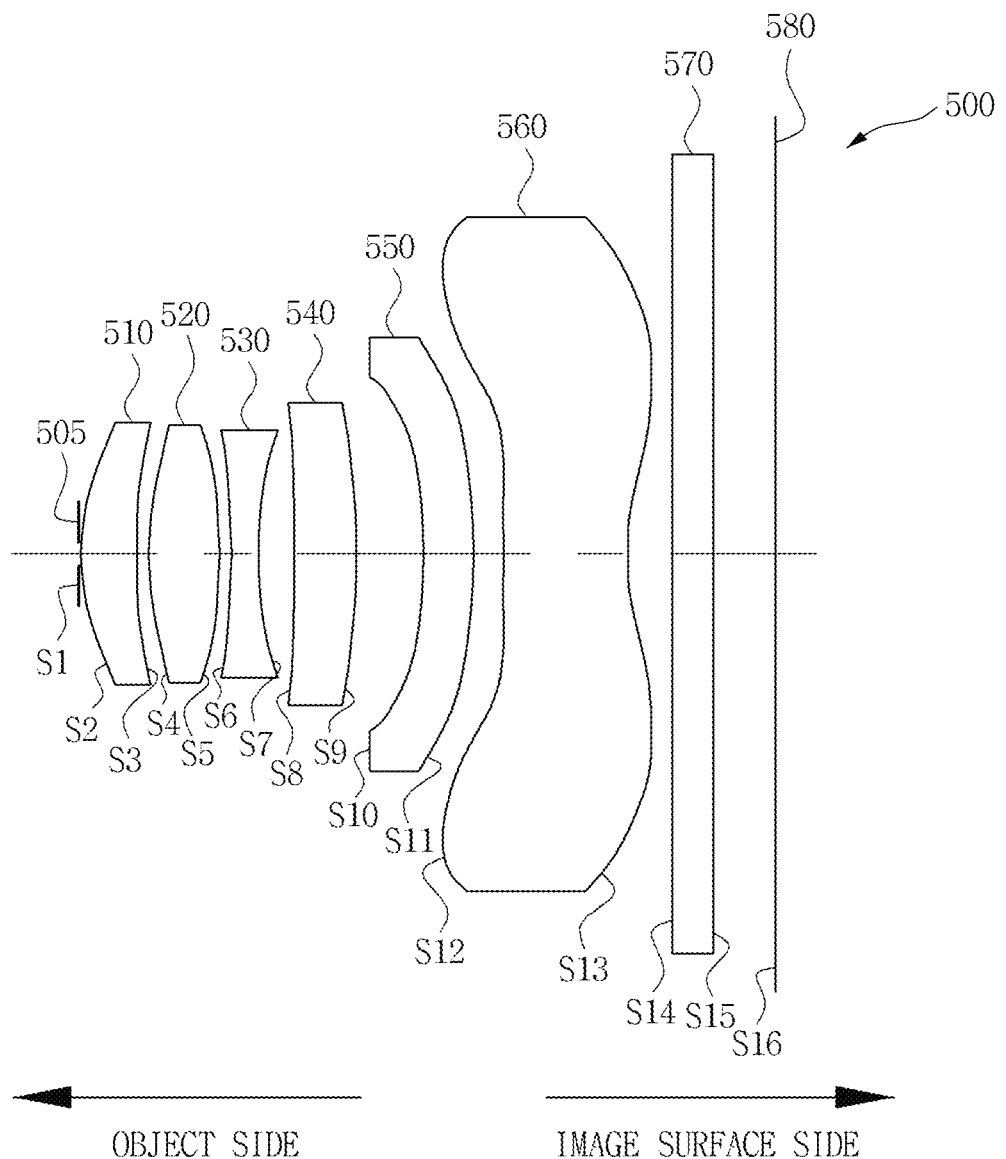
FIG. 13 is a lateral cross-sectional view schematically showing an internal structure of an imaging lens according to a fifth preferred embodiment of the present invention.

FIG. 13 is a lateral cross-sectional view schematically showing an internal structure of an imaging lens according to a fifth preferred embodiment of the present invention.

Referring to FIG. 13, the imaging lens 500 according to the fifth preferred embodiment of the present invention is configured to include a first lens 510, a second lens 520, a third lens 530, a fourth lens 540, a fifth lens 550, and a sixth lens 560 sequentially disposed from an object side. In addition, the imaging lens 500 according to the fifth preferred embodiment of the present invention may further include an aperture stop 505 positioned to be closer to the object side or an image surface side as compared with any one of the first to sixth lenses 510 and 560.

First, in order to obtain an image of the object (subject), light corresponding to image information of the object sequentially passes through the first lens 510, the aperture stop 505, the second lens 520, the third lens 530, the fourth lens 540, the fifth lens 550, the sixth lens 560, and a filter 570, and is then incident to a light receiving element 580.

Here, the first lens 510 is formed to have positive (+) power and have a shape in which it is convex toward the object side.

In addition, the second lens 520 is formed to have positive (+) power.

In addition, the third and fourth lenses 530 and 540 may be formed to positive (+) or negative (−) power.

Here, at least one of the third and fourth lenses 530 and 540 is formed to have the Abbe number (V) smaller than 30, thereby making it possible to significantly decrease chromatic aberration. However, the present invention is not necessary limited thereto. For example, at least one of the third and fourth lenses 530 and 540 is formed to have the Abbe number (V) that is in the range of 20 to 30, thereby making it possible to more significantly decrease chromatic aberration.

In addition, the fifth lens 550 may be formed to have negative (−) power and have a shape in which it is concave toward the object side. In this case, the fifth lens 550 may be formed to have a point of inflection on at least one of a surface thereof toward the object side and a surface thereof toward the image surface side.

Further, the sixth lens 560 is formed to have negative (−) power, be concave toward the image surface side, and have a point of inflection on a surface thereof toward the image surface side.

Here, the first lens 510, the second lens 520, the third lens 530, the fourth lens 540, the fifth lens 550, and the sixth lens 560 may be formed as an aspheric surface. However, the present invention is not limited thereto.

In addition, the aperture stop 505 is disposed to be closer to the object side or the image surface side as compared with any one of the first to fifth lenses 510 and 550 and selectively collects incident light to adjust a focal length. Here, as an example, the aperture stop 505 may be disposed to be closer to the object side or the image surface side as compared with the first lens 510. In addition, as another example, the aperture stop 505 may be disposed between a surface of the first lens 510 toward the object side and a surface of the third lens 530 toward the object side. However, a position of the aperture stop 505 according to the fifth preferred embodiment of the present invention is not limited to the positions according to an example and another example.

In addition, the filter 570 may be an infrared (IR) cut filter. However, a kind of filter 570 according to the fifth preferred embodiment of the present invention is not limited thereto.

Here, the IR cut filter serves to cut radiant heat discharged from external light so as not to be transferred to the light receiving element 580.

That is, the IR cut filter has a structure in which it transmits a visible ray therethrough and reflects an infrared ray to discharge the infrared ray to the outside.

In addition, the light receiving element 580 having a surface on which an image is formed may be configured of an image sensor converting an optical signal corresponding to a subject image into an electrical signal. Here, the image sensor may be a charge coupled device (CCD) or a complementary metal oxide semiconductor (CMOS) sensor. However, the light receiving element according to the preferred embodiment of the present invention is not limited thereto.

The imaging lens 500 according to the fifth preferred embodiment of the present invention has optical characteristics as shown in the following Table 13.

TABLE 13

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 1.648 | 0.377 | 1.5441 | 56.1 | Asphere | L1 |
| S3 | 3.662 | 0.093 | | | Asphere | |
| S4 | 3.309 | 0.458 | 1.5441 | 56.1 | Asphere | L2 |
| S5 | −5.055 | 0.080 | | | Asphere | |
| S6 | −5.260 | 0.205 | 1.6398 | 23.3 | Asphere | L3 |
| S7 | 3.603 | 0.223 | | | Asphere | |
| S8 | 15.574 | 0.429 | 1.6398 | 23.3 | Asphere | L4 |
| S9 | −5.840 | 0.446 | | | Asphere | |
| S10 | −2.448 | 0.346 | 1.6398 | 23.3 | Asphere | L5 |
| S11 | −2.685 | 0.194 | | | Asphere | |
| S12 | 7.975 | 0.840 | 1.5343 | 55.7 | Asphere | L6 |
| S13 | 1.775 | 0.161 | | | Asphere | |
| S14 | infinite | 0.270 | 1.5168 | 64.2 | Flat | Filter |
| S15 | infinite | 0.580 | | | Flat | |
| S16 | infinite | — | — | — | Flat | Image sensor |

As shown in the above Table 13, all surfaces of the first lens 510 (L1), the second lens 520 (L2), the third lens 530 (L3), the fourth lens 540 (L4), the fifth lens 550 (L5), and the sixth lens 560 (L6) of the imaging lens 500 according to the fifth preferred embodiment of the present invention are aspheric surfaces.

In addition, a "−" value stated in the above Table 13 means a value that is not defined.

Further, S1 means a surface determining a light amount of the imaging lens 500 according to the preferred embodiment of the present invention, and Stop stated in the Remark column of S1 means the aperture stop 505 (S1) used to adjust a light amount.

Here, although the aperture stop 505 is disposed on the surface of the first lens 510 toward the object side, a position of the aperture stop 505 according to the fifth preferred embodiment of the present invention is not limited thereto. In addition, the imaging lens 500 according to the fifth preferred embodiment of the present invention is not necessarily limited to including the aperture stop 505.

The following Table 14 shows aspheric constant values of aspheric lenses according to the fifth preferred embodiment of the present invention.

TABLE 14

| Lens surface No. | K | A | B | C | D | E |
|---|---|---|---|---|---|---|
| S2 | −5.46E−01 | −2.29E−02 | −7.67E−04 | −5.68E−02 | 8.04E−02 | −3.66E−02 |
| S3 | 0 | −9.98E−02 | 8.09E−02 | 1.27E−02 | 6.78E−02 | −5.59E−02 |
| S4 | 0 | −7.31E−02 | 8.43E−02 | 1.18E−01 | −9.79E−02 | 1.49E−03 |
| S5 | −1.48E+01 | 3.21E−02 | −1.01E−01 | −3.42E−02 | 1.31E−01 | −6.02E−02 |
| S6 | −3.77E+01 | 8.14E−02 | −1.63E−01 | 4.79E−02 | 1.52E−01 | −6.53E−02 |
| S7 | 1.30E+01 | −1.13E−02 | −8.18E−02 | 1.26E−01 | −3.84E−02 | 4.79E−03 |
| S8 | 0 | −1.05E−01 | 3.59E−02 | −8.59E−02 | 2.76E−01 | −1.94E−01 |
| S9 | 0 | −3.19E−02 | −2.04E−02 | −1.24E−03 | 1.39E−01 | −8.00E−02 |
| S10 | 0 | 2.27E−01 | −4.00E−01 | 2.98E−01 | −1.08E−01 | 1.23E−02 |
| S11 | −4.16E+00 | 2.01E−01 | −3.13E−01 | 2.10E−01 | −7.19E−02 | 9.72E−03 |
| S12 | −2.63E+02 | −1.02E−01 | −3.94E−02 | 4.10E−02 | −9.53E−03 | 7.15E−04 |
| S13 | −9.73E+00 | −5.69E−02 | 1.10E−02 | −2.05E−03 | 2.02E−04 | −6.41E−06 |

As stated in the above Table 13 and Table 14, S1, which is the aperture stop 505 (S1) used to adjust the light amount, is flat, such that it does not have an aspheric constant value.

In addition, S14 and S15, which are the filter 570, and S16, which is the image sensor corresponding to the light receiving element 580, are flat, such that they do not have aspheric constant values.

In addition, when it is assumed that the entire focal length of the imaging lens 500 according to the fifth preferred embodiment of the present invention is F and focal lengths of the first lens 510, the second lens 520, the third lens 530, the fourth lens 540, the fifth lens 550, and the sixth lens 560 are F1, F2, F3, F4, F5, and F6, respectively, the respective values are represented by the following Table 15.

TABLE 15

| Item | |
|---|---|
| Entire focal length (F) of imaging lens | 4.141 |
| Focal length (F1) of first lens | 5.145 |
| Focal length (F2) of second lens | 3.732 |
| Focal length (F3) of third lens | −3.279 |
| Focal length (F4) of fourth lens | 6.626 |
| Focal length (F5) of fifth lens | −100.854 |
| Focal length (F6) of second lens | −4.467 |
| TTL | 4.703 |

In the imaging lens 500 according to the fifth preferred embodiment of the present invention, when it is assumed that a length from an incident surface of the first lens 510 toward the object side to the image surface is TTL and the entire focal length of the imaging lens 500 is F, the following Conditional Equation may be satisfied.

$$0.95 < TTL/F < 1.35 \quad (1)$$

The above Conditional Equation (1) is a relationship equation of TTL and power of the imaging lens 500 according to the fifth preferred embodiment of the present invention. The above Conditional Equation (1) is satisfied, thereby making it possible to form the imaging lens 500 in which a telephoto form is possible.

In addition, according to the fifth preferred embodiment of the present invention, when it is assumed that a length from an incident surface of the first lens 510 toward the object side to the image surface is TTL and the entire focal length of the imaging lens 500 is F, the following Conditional Equation may be satisfied.

$$1.15 < TTL/F < 1.45 \quad (2)$$

The above Condition Equation (2) is satisfied, thereby making it possible to form the imaging lens 500 that has good marketability, is capable of more easily securing optical performance, and is slim.

In addition, according to the fifth preferred embodiment of the present invention, when it is assumed that a synthetic focal length of the first and second lenses 510 and 520 is F12 and the entire focal length of the imaging lens 500 is F, the following Conditional Equation may be satisfied.

$$0.5 < F/F12 < 2.5 \quad (3)$$

The above Conditional Equation (3) is a relationship equation of power of the first and second lenses 510 and 520 according to the fifth preferred embodiment of the present invention. When the imaging lens 500 is designed to have a value smaller or larger than the above Conditional Equation (3), axial performance is deteriorated, such that marketability is deteriorated and it is difficult to secure optical performance.

Therefore, the above Conditional Equation (3) is satisfied, such that the axial performance is improved, thereby making it possible to form the imaging lens 500 having good marketability and capable of easily securing optical performance.

In addition, in the imaging lens 500 according to the fifth preferred embodiment of the present invention, when it is assumed that a synthetic focal length of the third and fourth lenses 530 and 540 is F34 and the entire focal length of the imaging lens 500 is F, the following Conditional Equation may be satisfied.

$$-2.5 < F/F34 < -0.4 \quad (4)$$

The above Conditional Equation (4) is a relationship equation of power of the third and fourth lenses 530 and 540 according to the fourth preferred embodiment of the present invention. When the imaging lens 500 is designed to have a value smaller or larger than the above Conditional Equation (4), chromatic aberration and off-axis aberration are not appropriately corrected, such that marketability is deteriorated and it is difficult to secure optical performance.

Therefore, the above Conditional Equation (4) is satisfied, thereby making it possible to form the imaging lens 500 having good marketability and capable of easily securing optical performance.

In addition, in the imaging lens 500 according to the fifth preferred embodiment of the present invention, when it is assumed that a focal length of the first lens 510 is F1 and the entire focal length of the imaging lens 500 is F, the following Conditional Equation may be satisfied.

$$0 < F/F1 < 1.5 \quad (5)$$

The above Conditional Equation (5) is a relationship equation of power of the first lens 510 according to the fifth preferred embodiment of the present invention. When the imaging lens 500 is designed to have a value smaller or larger than the above Conditional Equation (5), a optical power is decreased, such that sensitivity is decreased.

Therefore, the above Conditional Equation (5) is satisfied to prevent a decrease in the optical power, thereby making it possible to form the imaging lens 500 having good sensitivity.

In addition, in the imaging lens 500 according to the fifth preferred embodiment of the present invention, when it is assumed that a focal length of the third lens 530 is F3 and the entire focal length of the imaging lens 500 is F, the following Conditional Equation may be satisfied.

$$0.2 < |F/F3| < 2.5 \quad (6)$$

The above Conditional Equation (6) is a relationship equation of power of the third lens 530 according to the fifth preferred embodiment of the present invention. When the imaging lens 500 is designed to have a value smaller or larger than the above Conditional Equation (6), a optical power is dispersed, such that sensitivity is decreased.

Therefore, the above Conditional Equation (6) is satisfied to prevent dispersion in the optical power, thereby making it possible to form the imaging lens 500 having good sensitivity.

In addition, in the imaging lens 500 according to the fifth preferred embodiment of the present invention, when it is assumed that a focal length of the fifth lens 550 is F5, a focal length of the sixth lens 560 is F6, and the entire focal length of the imaging lens 500 is F, the following Conditional Equation may be satisfied.

$$0.3 < F/F5 + F/F6 < 6.0 \quad (7)$$

The above Conditional Equation (7) is a relationship equation of power of the fifth and sixth lenses 550 and 560 according to the fifth preferred embodiment of the present invention. The above Conditional Equation (7) is satisfied, thereby making it possible to form the imaging lens 500 in which a telephoto form is possible.

In addition, in the imaging lens 500 according to the fifth preferred embodiment of the present invention, when it is assumed that a length from an incident surface of the first lens 510 toward the object side to the image surface is TTL and an image height is ImgH, the following Conditional Equation may be satisfied.

$$0.35 < TTL/2 ImgH < 0.95 \quad (8)$$

The above Conditional Equation (8) is a relationship equation of TTL and power of the imaging lens 500 according to the fifth preferred embodiment of the present invention. The above Conditional Equation (8) is satisfied, thereby making it possible to form the imaging lens 500 in a slim form.

In addition, according to the fifth preferred embodiment of the present invention, when it is assumed that a field of view of the imaging lens 500 is FOV, the following Conditional Equation may be satisfied.

$$65 < FOV < 88 \quad (9)$$

The above Conditional Equation (9) is a relationship equation for the field of view of the imaging lens 500 according to the fifth preferred embodiment of the present invention. The above Conditional Equation (9) is satisfied, thereby making it possible to form the imaging lens 500 in a slim form and a pseudo-wide angle form.

In addition, in the imaging lens 500 according to the fifth preferred embodiment of the present invention, when it is assumed that an average of the Abbe numbers of the first and second lenses 510 and 520 is v12 and an average of the Abbe numbers of the third and fourth lenses 530 and 540 is v34, the following Conditional Equation may be satisfied.

$$10 < v12 - v34 < 45 \quad (10)$$

The above Conditional Equation (10) is a relationship equation for dispersion of the first and second lenses 510 and 520 and the third and fourth lenses 530 and 540 according to the fifth preferred embodiment of the present invention. The above Conditional Equation (10) is satisfied, thereby making it possible to effectively decrease chromatic aberration.

In addition, in the imaging lens 500 according to the fifth preferred embodiment of the present invention, when it is assumed that a focal length of the third lens 530 is F3, a focal length of the fourth lens 540 is F4, and the entire focal length of the imaging lens 500 is F, the following Conditional Equation may be satisfied.

$$0 < |F/F3| + |F/F4| < 3 \quad (11)$$

The above Conditional Equation (11) is a relationship equation for optical powers of the third and fourth lenses 530 and 540 according to the fifth preferred embodiment of the present invention. The above Conditional Equation (11) is satisfied, thereby making it possible to decrease aberration.

In addition, in the imaging lens 500 according to the fifth preferred embodiment of the present invention, when it is assumed that a radius of curvature of a surface of the first lens 510 toward the image surface side is r12 and the entire focal length of the imaging lens 500 is F, the following Conditional Equation may be satisfied.

$$0.15 < r12/F < 0.9 \quad (12)$$

The above Conditional Equation (12) is a relationship equation of power for the radius of curvature of the surface of the first lens 510 according to the fifth preferred embodiment of the present invention toward the image surface side. The above Conditional Equation (12) is satisfied, thereby making it possible to form the imaging lens 500 having excellent optical characteristics.

In addition, in the imaging lens 500 according to the fifth preferred embodiment of the present invention, when it is assumed that a focal length of the first lens 510 is F1 and a focal length of the third lens 530 is F3, the following Conditional Equation may be satisfied.

$$0 < |F1/F3| < 25 \quad (13)$$

The above Conditional Equation (13) is a relationship equation of power of the first and third lenses 510 and 530 according to the fifth preferred embodiment of the present invention. The above Conditional Equation (13) is satisfied, thereby making it possible to form the imaging lens 500 having excellent optical characteristics.

In addition, in the imaging lens 500 according to the fifth preferred embodiment of the present invention, when it is assumed that a radius of curvature of a surface of the fifth lens 550 toward the object side is r9 and a radius of curvature of a surface of the fifth lens 550 toward the image surface side is r10, the following Conditional Equation may be satisfied.

$$0 < |(r9 - r10)/(r9 + r10)| < 6 \quad (14)$$

The above Conditional Equation (14) is a relationship equation of power of the fifth lens 550 according to the fifth preferred embodiment of the present invention. The above Conditional Equation (14) is satisfied, thereby making it possible to form the fifth lens 550 having the positive (+) power.

In addition, in the imaging lens 500 according to the fifth preferred embodiment of the present invention, when it is assumed that the entire focal length of the imaging lens 500 is F, a focal length of the first lens 510 is F1, and a focal length of the second lens 520 is F2, the following Conditional Equation may be satisfied.

$$0.2 < |F/F1| + |F/F2| < 4 \quad (15)$$

The above Conditional Equation (15) is a relationship equation for determining the entire power of the imaging lens 500 according to the fifth preferred embodiment of the present invention. The above Conditional Equation (15) is satisfied, thereby making it possible to form the imaging lens 500 having excellent optical characteristics.

In addition, in the imaging lens 500 according to the fifth preferred embodiment of the present invention, when it is assumed that a focal length of the first lens 510 is F1, a focal length of the second lens 520 is F2, a focal length of the third lens 530 is F3, and a focal length of the fourth lens 540 is F4, the following Conditional Equation may be satisfied.

$$0<(|F1|+|F2|)/(|F3|+|F4|)<30 \quad (16)$$

The above Conditional Equation (16) is a relationship equation of power of the first lens 510, the second lens 520, the third lens 530, and the fourth lens 540 according to the fifth preferred embodiment of the present invention. The above Conditional Equation (16) is satisfied, thereby making it possible to form the imaging lens 500 having excellent optical characteristics.

In addition, in the imaging lens 500 according to the fifth preferred embodiment of the present invention, when it is assumed that the entire focal length of the imaging lens 500 is F, a focal length of the fourth lens 540 is F4, a focal length of the fifth lens 550 is F5, and a focal length of the sixth lens 560 is F6, the following Conditional Equation may be satisfied.

$$0.20<|F/F4|+|F/F5|+|F/F6|<7.5 \quad (17)$$

The above Conditional Equation (17) is a relationship equation of power of the fourth lens 540, the fifth lens 550, and the sixth lens 560 according to the fifth preferred embodiment of the present invention. The above Conditional Equation (17) is satisfied, thereby making it possible to form the imaging lens 500 having excellent optical characteristics.

In addition, in the imaging lens 500 according to the fifth preferred embodiment of the present invention, when it is assumed that the entire focal length of the imaging lens 500 is F and a length between a surface of the first lens 510 toward the object side and a surface of the sixth surface 560 toward the image surface side on an optical axis is DL, the following Conditional Equation may be satisfied.

$$0.7<DL/F<1.2 \quad (18)$$

The above Conditional Equation (18) is satisfied, thereby making it possible to form the imaging lens 500 that is compact.

In addition, in the imaging lens 500 according to the fifth preferred embodiment of the present invention, when it is assumed that the Abbe number of the fourth lens 540 is v4 and the Abbe number of the fifth lens 550 is v5, the following Conditional Equation may be satisfied.

$$42<v4+v5<115 \quad (19)$$

The above Conditional Equation (19) is a relationship equation for dispersion of the fourth and fifth lenses 540 and 550 according to the fifth preferred embodiment of the present invention. The above Conditional Equation (19) is satisfied, thereby making it possible to form the imaging lens 500 having excellent optical characteristics.

Figure 14:
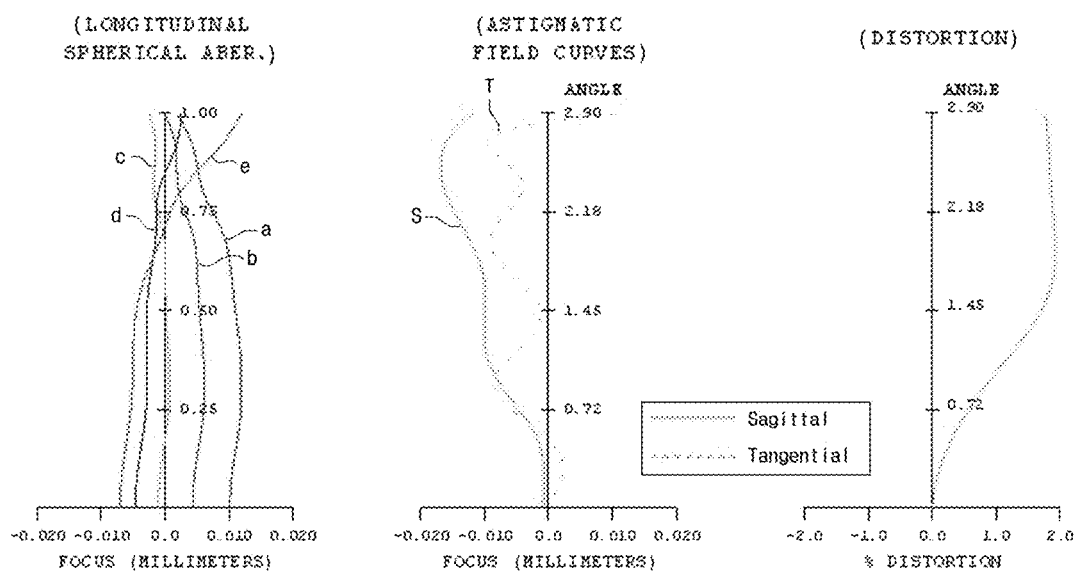
FIGS. 14 and 15 are graphs showing aberration characteristics according to the fifth preferred embodiment of the present invention.
Figure 15:
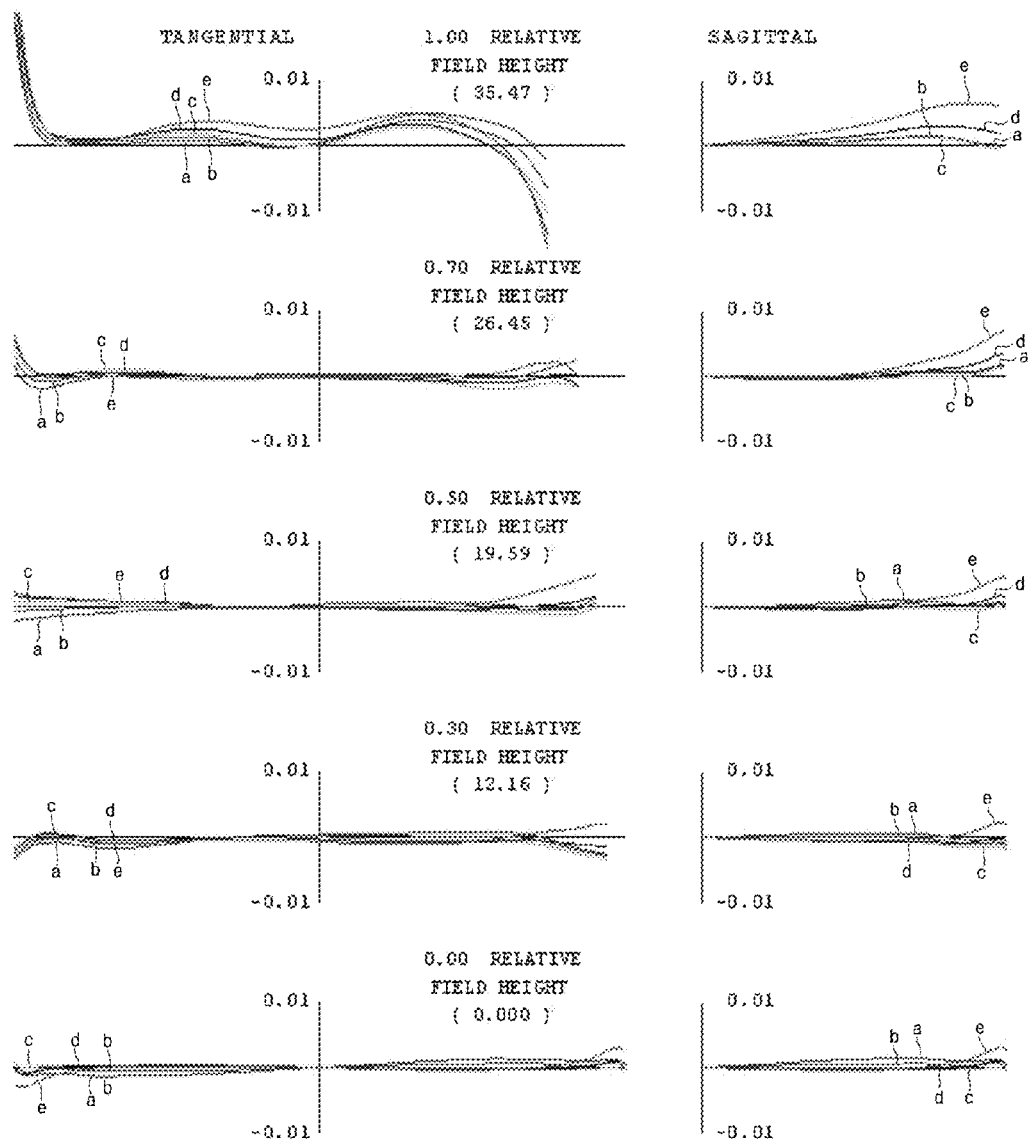
Figure 16:
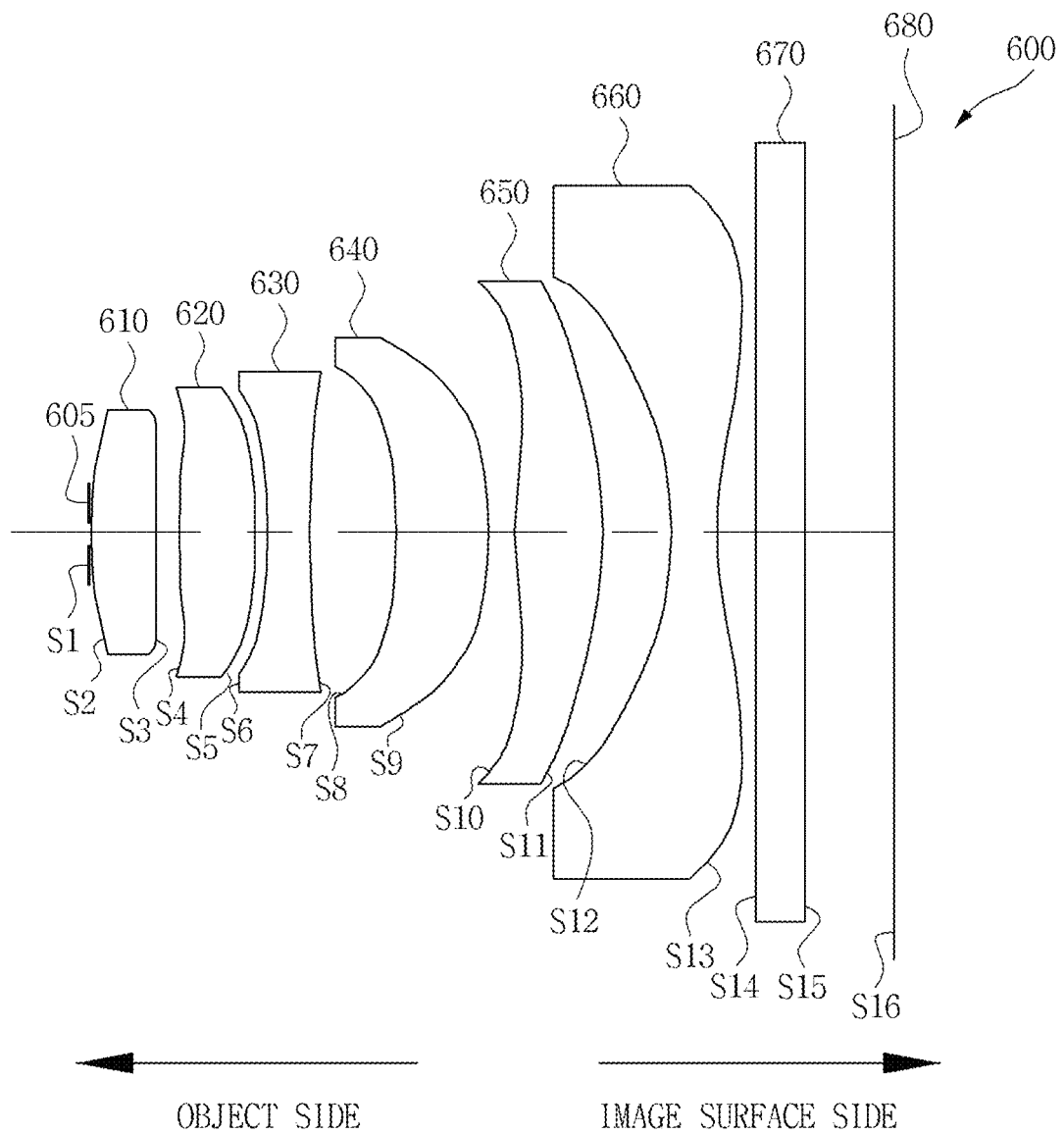
FIG. 16 is a lateral cross-sectional view schematically showing an internal structure of an imaging lens according to a sixth preferred embodiment of the present invention.

FIGS. 14 and 15 are graphs showing aberration characteristics according to the fifth preferred embodiment of the present invention. In FIGS. 14 and 15, the aberration characteristics are shown by representing a plurality of wavelengths by a plurality of colors.

Here, FIG. 14 is a graph obtained by measuring longitudinal spherical aberration, astigmatic field curve, and distortion according to the fifth preferred embodiment of the present invention. Further, FIG. 15 is a graph obtained by measuring coma aberration according to the fifth preferred embodiment of the present invention.

As shown in FIG. 14, the graph obtained by measuring the longitudinal spherical aberration shows longitudinal spherical aberration depending on each wavelength. Here, it may be appreciated that since it is shown that each wavelength is adjacent to a vertical axis, characteristics of the longitudinal spherical aberration are excellent.

In addition, the graph obtained by measuring the astigmatic field curve shows aberration characteristics of a direction component (X) of x axis light and a direction component (Y) of y axis light according to an image surface height (ANGLE) viewed from the object side, which is a vertical axis, and a focus (FOCUS) position, which is a horizontal axis. Here, it may be appreciated that since it is shown that X and Y are adjacent to each other, an image is not blurred and a phenomenon that a resolution is deteriorated does not appear.

In addition, the graph obtained by measuring the distortion shows distortion characteristics, which are a horizontal axis, according to an image surface height (ANGLE) viewed from the object side. Here, it may be appreciated that since a distortion degree is mainly positioned between −1 to +1 of the distortion, which is the horizontal axis, there is no substantially distortion.

As shown in FIG. 15, the graph obtained by measuring the coma aberration shows tangential and sagittal aberration characteristics depending on each wavelength according to an image surface height. Here, it may be appreciated that since it is shown that each wavelength is adjacent to a horizontal axis, small transversal chromatic aberration appears.

<Sixth Preferred Embodiment>

FIG. 6 is a lateral cross-sectional view schematically showing an internal structure of an imaging lens according to a sixth preferred embodiment of the present invention.

Referring to FIG. 6, The imaging lens 600 according to the sixth preferred embodiment of the present invention has optical characteristics as shown in the following Table 16.

TABLE 16

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 2.524 | 0.442 | 1.543 | 56.1 | Asphere | L1 |
| S3 | 5.794 | 0.158 | | | Asphere | |
| S4 | 4.189 | 0.538 | 1.544 | 56.1 | Asphere | L2 |
| S5 | −4.328 | 0.070 | | | Asphere | |
| S6 | −5.028 | 0.300 | 1.616 | 25.2 | Asphere | L3 |
| S7 | 6.085 | 0.586 | | | Asphere | |
| S8 | −4.288 | 0.633 | 1.562 | 43.1 | Asphere | L4 |
| S9 | −4.308 | 0.197 | | | Asphere | |
| S10 | 3.766 | 0.601 | 1.544 | 56.1 | Asphere | L5 |
| S11 | −2.290 | 0.476 | | | Asphere | |
| S12 | −1.933 | 0.300 | 1.541 | 49.4 | Asphere | L6 |
| S13 | 2.776 | 0.300 | | | Asphere | |
| S14 | 0.000 | 0.300 | 1.516 | 64.2 | Flat | Filter |
| S15 | 0.000 | 0.600 | | | Flat | |
| S16 | infinite | — | — | — | Flat | Image sensor |

As shown in the above Table 16, all surfaces of the first lens 610 (L1), the second lens 620 (L2), the third lens 630 (L3), the fourth lens 640 (L4), the fifth lens 650 (L5), and the sixth lens 660 (L6) of the imaging lens 600 according to the sixth preferred embodiment of the present invention are aspheric surfaces.

In addition, a "−" value stated in the above Table 16 means a value that is not defined.

Further, S1 means a surface determining a light amount of the imaging lens 600 according to the preferred embodiment of the present invention, and Stop stated in the Remark column of S1 means the aperture stop 605 (S1) used to adjust a light amount.

Here, although the aperture stop 605 is disposed on the surface of the first lens 610 toward the object side, a position of the aperture stop 605 according to the sixth preferred embodiment of the present invention is not limited thereto. In addition, the imaging lens 600 according to the sixth preferred embodiment of the present invention is not necessarily limited to including the aperture stop 605.

The following Table 17 shows aspheric constant values of aspheric lenses according to the sixth preferred embodiment of the present invention.

TABLE 17

| Lens surface No. | K | A | B | C | D |
|---|---|---|---|---|---|
| S2 | 0 | −3.98E−02 | −1.66E−02 | −1.73E−02 | −1.24E−02 |
| S3 | 0.00E+00 | −1.37E−01 | −1.05E−03 | −4.71E−02 | 3.07E−02 |
| S4 | 0 | −1.15E−01 | −7.97E−03 | −2.85E−02 | 2.25E−02 |
| S5 | 0 | −9.25E−02 | 1.64E−02 | −2.70E−02 | 2.40E−03 |
| S6 | 0 | −9.66E−02 | 3.55E−02 | −1.94E−02 | 1.30E−02 |
| S7 | 0 | −2.54E−02 | −8.60E−03 | 7.55E−03 | 2.52E−03 |
| S8 | 0 | −2.47E−02 | −6.86E−02 | 2.34E−02 | −2.25E−02 |
| S9 | 0 | −1.49E−01 | 2.06E−02 | 3.52E−04 | −5.19E−03 |
| S10 | 0 | −1.29E−01 | 3.74E−02 | −6.41E−03 | 1.76E−04 |
| S11 | 0 | 8.83E−02 | −1.97E−02 | 2.81E−03 | −4.31E−04 |
| S12 | 0 | 8.88E−02 | −4.29E−02 | 1.49E−02 | −1.97E−03 |
| S13 | 0 | −6.37E−02 | 6.97E−03 | −5.35E−04 | −2.43E−05 |

As stated in the above Table 16 and Table 17, S1, which is the aperture stop 605 (S1) used to adjust the light amount, is flat, such that it does not have an aspheric constant value.

In addition, S14 and S15, which are the filter 670, and S16, which is the image sensor corresponding to the light receiving element 680, are flat, such that they do not have aspheric constant values.

Figure 17:
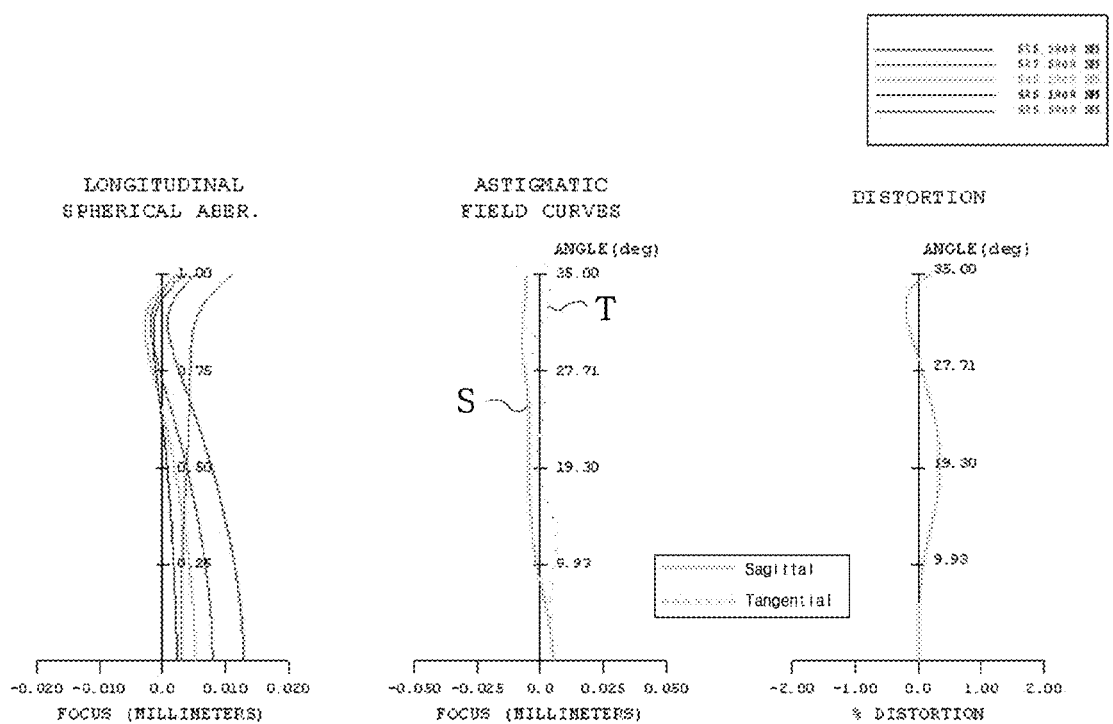
FIG. 17 is graphs showing aberration characteristics according to the sixth preferred embodiment of the present invention.

FIG. 17 is graphs showing aberration characteristics according to the sixth preferred embodiment of the present invention. In FIG. 17, the aberration characteristics are shown by representing a plurality of wavelengths by a plurality of colors.

Here, FIG. 17 is a graph obtained by measuring longitudinal spherical aberration, astigmatic field curve, and distortion according to the sixth preferred embodiment of the present invention.

<Seventh Preferred Embodiment>

Figure 18:
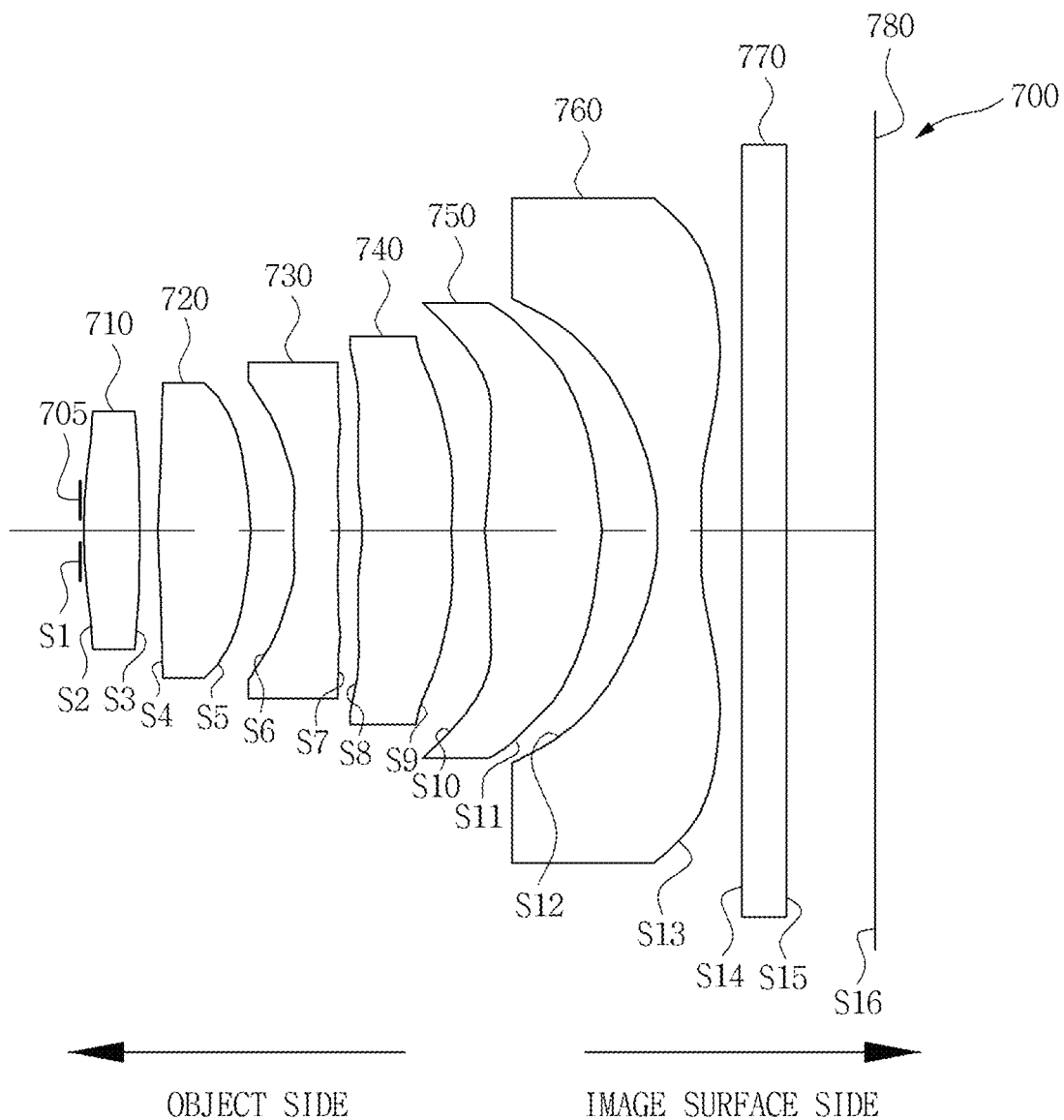
FIG. 18 is a lateral cross-sectional view schematically showing an internal structure of an imaging lens according to a seventh preferred embodiment of the present invention.

FIG. 18 is a lateral cross-sectional view schematically showing an internal structure of an imaging lens according to a seventh preferred embodiment of the present invention.

Referring to FIG. 18, The imaging lens 200 according to the seventh preferred embodiment of the present invention has optical characteristics as shown in the following Table 18.

TABLE 18

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 3.138 | 0.397 | 1.544 | 56.1 | Flat | L1 |
| S3 | 22.353 | 0.142 | | | Asphere | |
| S4 | 6.911 | 0.622 | 1.544 | 56.1 | Asphere | L2 |

TABLE 18-continued

| Lens surface No. | Radius of curvature (mm) | Thickness (mm) | Refractive index | Abbe number | Lens shape | Remark |
|---|---|---|---|---|---|---|
| S5 | −3.570 | 0.322 | | | Asphere | |
| S6 | −3.004 | 0.300 | 1.632 | 23.4 | Asphere | L3 |
| S7 | 7.594 | 0.150 | | | Asphere | |
| S8 | 22.855 | 0.650 | 1.581 | 33.0 | Asphere | L4 |
| S9 | −13.856 | 0.227 | | | Asphere | |
| S10 | 3.219 | 0.804 | 1.553 | 48.6 | Asphere | L5 |
| S11 | −2.050 | 0.386 | | | Asphere | |
| S12 | −1.720 | 0.300 | 1.509 | 59.1 | Asphere | L6 |
| S13 | 2.727 | 0.300 | | | Asphere | |
| S14 | infinite | 0.300 | 1.516 | 64.2 | Asphere | Filter |
| S15 | infinite | 0.600 | | | Flat | |
| S16 | infinite | — | — | — | Flat | Image sensor |

As shown in the above Table 18, all surfaces of the first lens 710 (L1), the second lens 720 (L2), the third lens 730 (L3), the fourth lens 740 (L4), the fifth lens 750 (L5), and the sixth lens 760 (L6) of the imaging lens 700 according to the seventh preferred embodiment of the present invention are aspheric surfaces.

In addition, a "−" value stated in the above Table 18 means a value that is not defined.

Further, S1 means a surface determining a light amount of the imaging lens 700 according to the preferred embodiment of the present invention, and Stop stated in the Remark column of S1 means the aperture stop 705 (S1) used to adjust a light amount.

Here, although the aperture stop 705 is disposed on the surface of the first lens 710 toward the object side, a position of the aperture stop 705 according to the seventh preferred embodiment of the present invention is not limited thereto. In addition, the imaging lens 700 according to the seventh preferred embodiment of the present invention is not necessarily limited to including the aperture stop 705.

The following Table 19 shows aspheric constant values of aspheric lenses according to the seventh preferred embodiment of the present invention.

TABLE 19

| Lens surface No. | K | A | B | C | D |
|---|---|---|---|---|---|
| S2 | 0 | −5.83E−02 | −2.06E−02 | −2.80E−02 | 2.04E−02 |
| S3 | 0.00E+00 | −1.02E−01 | 2.62E−02 | −4.09E−02 | 4.87E−02 |
| S4 | 0 | −6.15E−02 | 1.56E−02 | 6.37E−03 | −1.79E−02 |
| S5 | 0 | −9.14E−02 | −1.10E−02 | −1.14E−02 | −3.57E−03 |
| S6 | 0 | −1.81E−01 | 4.09E−02 | 6.62E−04 | 1.91E−02 |
| S7 | 0 | −4.64E−02 | −1.47E−02 | −4.32E−03 | 8.88E−03 |
| S8 | 0 | 4.98E−02 | −3.74E−02 | −1.56E−02 | 8.96E−03 |
| S9 | 0 | −1.78E−01 | 1.09E−01 | −3.39E−02 | 5.96E−03 |
| S10 | 0 | −1.67E−01 | 1.98E−02 | −8.87E−03 | 2.48E−03 |
| S11 | 0 | 1.35E−01 | −1.28E−01 | 4.47E−02 | −5.92E−03 |
| S12 | 0 | 1.35E−01 | −1.45E−01 | 6.35E−02 | −9.17E−03 |
| S13 | 0 | −8.66E−02 | 1.26E−02 | −1.07E−03 | −2.98E−05 |

As stated in the above Table 18 and Table 19, S1, which is the aperture stop 705 (S1) used to adjust the light amount, is flat, such that it does not have an aspheric constant value.

In addition, S14 and S15, which are the filter 770, and S16, which is the image sensor corresponding to the light receiving element 780, are flat, such that they do not have aspheric constant values.

Figure 19:
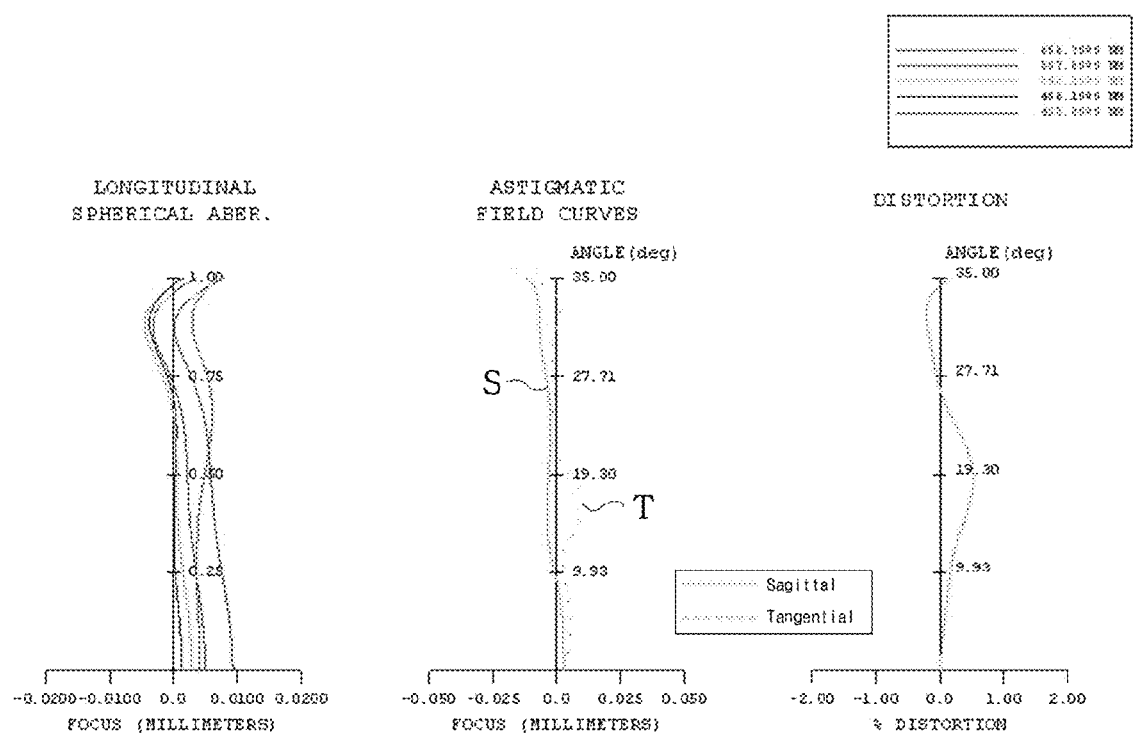
FIG. 19 is graphs showing aberration characteristics according to the seventh preferred embodiment of the present invention.

FIG. 19 is graphs showing aberration characteristics according to the seventh preferred embodiment of the present invention. In FIG. 19, the aberration characteristics are shown by representing a plurality of wavelengths by a plurality of colors.

Here, FIG. 19 is a graph obtained by measuring longitudinal spherical aberration, astigmatic field curve, and distortion according to the seventh preferred embodiment of the present invention.

<Eighth Preferred Embodiment>

Figure 20:
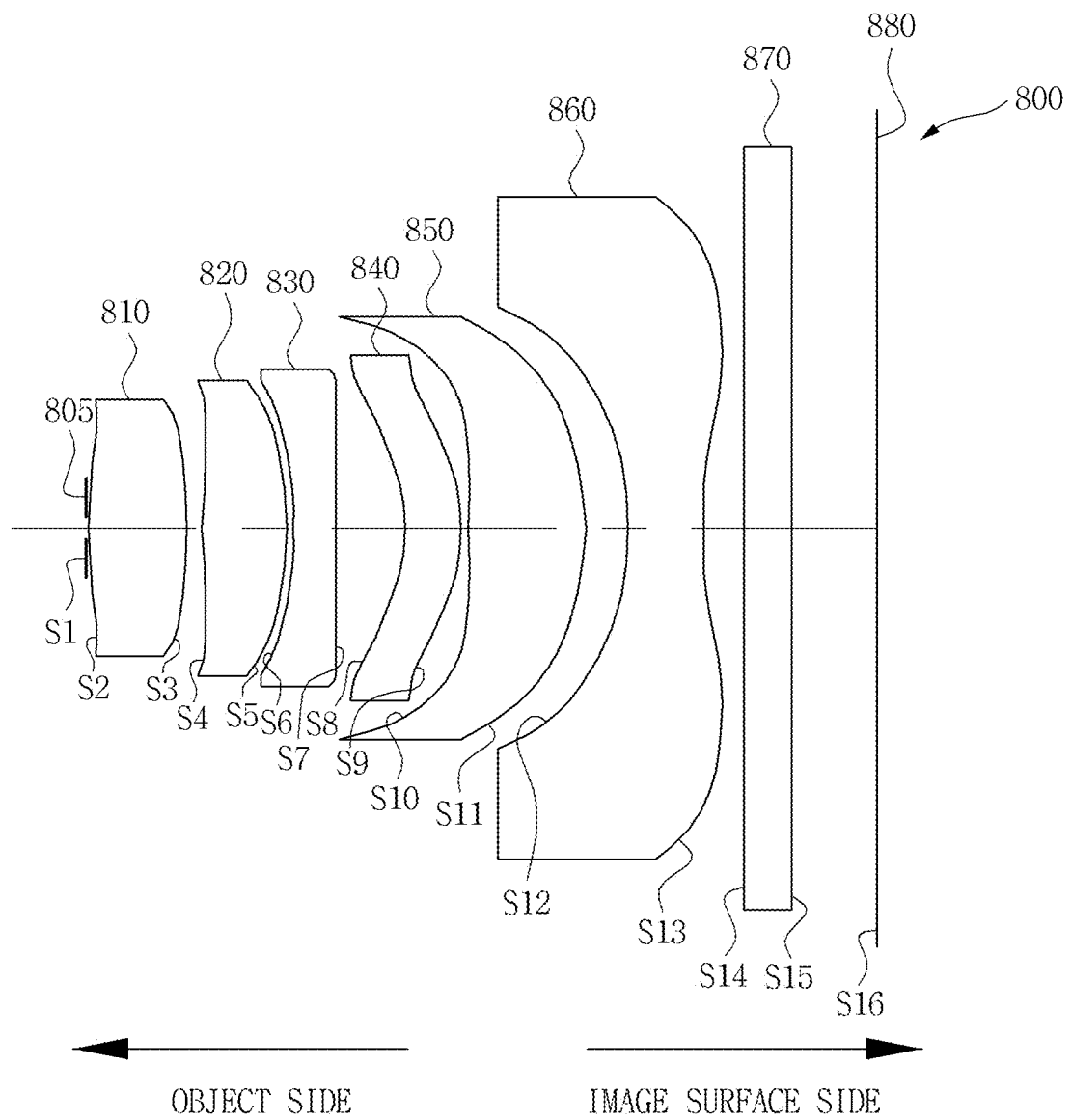
FIG. 20 is a lateral cross-sectional view schematically showing an internal structure of an imaging lens according to a eighth preferred embodiment of the present invention.

FIG. 20 is a lateral cross-sectional view schematically showing an internal structure of an imaging lens according to a eighth preferred embodiment of the present invention.

Referring to FIG. 20, The imaging lens 800 according to the eighth preferred embodiment of the present invention has optical characteristics as shown in the following Table 20.

TABLE 20

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 3.331 | 0.683 | 1.544 | 56.1 | Asphere | L1 |
| S3 | 1062.253 | 0.121 | | | Asphere | |
| S4 | 4.049 | 0.583 | 1.544 | 56.1 | Asphere | L2 |
| S5 | −2.988 | 0.050 | | | Asphere | |
| S6 | −3.646 | 0.300 | 1.623 | 24.4 | Asphere | L3 |
| S7 | 10.421 | 0.503 | | | Asphere | |
| S8 | −1.419 | 0.523 | 1.612 | 25.8 | Asphere | L4 |
| S9 | −1.536 | 0.166 | | | Asphere | |
| S10 | 63.096 | 0.837 | 1.544 | 56.1 | Asphere | L5 |
| S11 | −1.744 | 0.516 | | | Asphere | |
| S12 | −1.903 | 0.300 | 1.549 | 47.2 | Asphere | L6 |
| S13 | 2.802 | 0.300 | | | Asphere | |
| S14 | infinite | 0.300 | 1.516 | 64.2 | Flat | Filter |
| S15 | infinite | 0.600 | | | Flat | |
| S16 | infinite | — | — | — | Flat | Image sensor |

As shown in the above Table 20, all surfaces of the first lens 810 (L1), the second lens 820 (L2), the third lens 830 (L3), the fourth lens 840 (L4), the fifth lens 850 (L5), and the sixth lens 860 (L6) of the imaging lens 800 according to the eighth preferred embodiment of the present invention are aspheric surfaces.

In addition, a "−" value stated in the above Table 20 means a value that is not defined.

Further, S1 means a surface determining a light amount of the imaging lens 800 according to the preferred embodiment of the present invention, and Stop stated in the Remark column of S1 means the aperture stop 805 (S1) used to adjust a light amount.

Here, although the aperture stop 805 is disposed on the surface of the first lens 810 toward the object side, a position of the aperture stop 805 according to the eighth preferred embodiment of the present invention is not limited thereto. In addition, the imaging lens 800 according to the eighth preferred embodiment of the present invention is not necessarily limited to including the aperture stop 805.

The following Table 21 shows aspheric constant values of aspheric lenses according to the eighth preferred embodiment of the present invention.

TABLE 21

| Lens surface No. | K | A | B | C | D |
|---|---|---|---|---|---|
| S2 | 0 | −5.10E−02 | −2.21E−02 | −2.08E−02 | −3.24E−03 |
| S3 | 0 | −2.02E−01 | 2.35E−02 | 1.99E−03 | 6.14E−03 |
| S4 | 0 | −1.47E−01 | −1.04E−02 | 5.56E−03 | 1.17E−02 |
| S5 | 0 | −2.68E−02 | −5.32E−02 | 1.13E−02 | −1.27E−03 |
| S6 | 0 | −7.19E−02 | 7.07E−03 | 3.52E−02 | −1.77E−02 |
| S7 | 0 | −5.04E−02 | −3.03E−04 | −8.97E−03 | 6.62E−03 |
| S8 | 0 | 1.09E−01 | −3.97E−02 | 3.93E−02 | 1.35E−03 |
| S9 | 0 | −2.17E−02 | 5.87E−02 | 2.86E−02 | −6.30E−03 |
| S10 | 0 | −1.35E−01 | 7.57E−04 | 1.98E−02 | −1.33E−02 |
| S11 | 0 | 1.72E−01 | −2.07E−01 | 9.90E−02 | −1.87E−02 |
| S12 | 0 | 1.58E−01 | −2.15E−01 | 1.07E−01 | −1.93E−02 |
| S13 | 0 | −9.03E−02 | 1.55E−02 | −1.77E−03 | 2.88E−05 |

As stated in the above Table 20 and Table 21, S1, which is the aperture stop 805 (S1) used to adjust the light amount, is flat, such that it does not have an aspheric constant value.

In addition, S14 and S15, which are the filter 870, and S16, which is the image sensor corresponding to the light receiving element 880, are flat, such that they do not have aspheric constant values.

Figure 21:
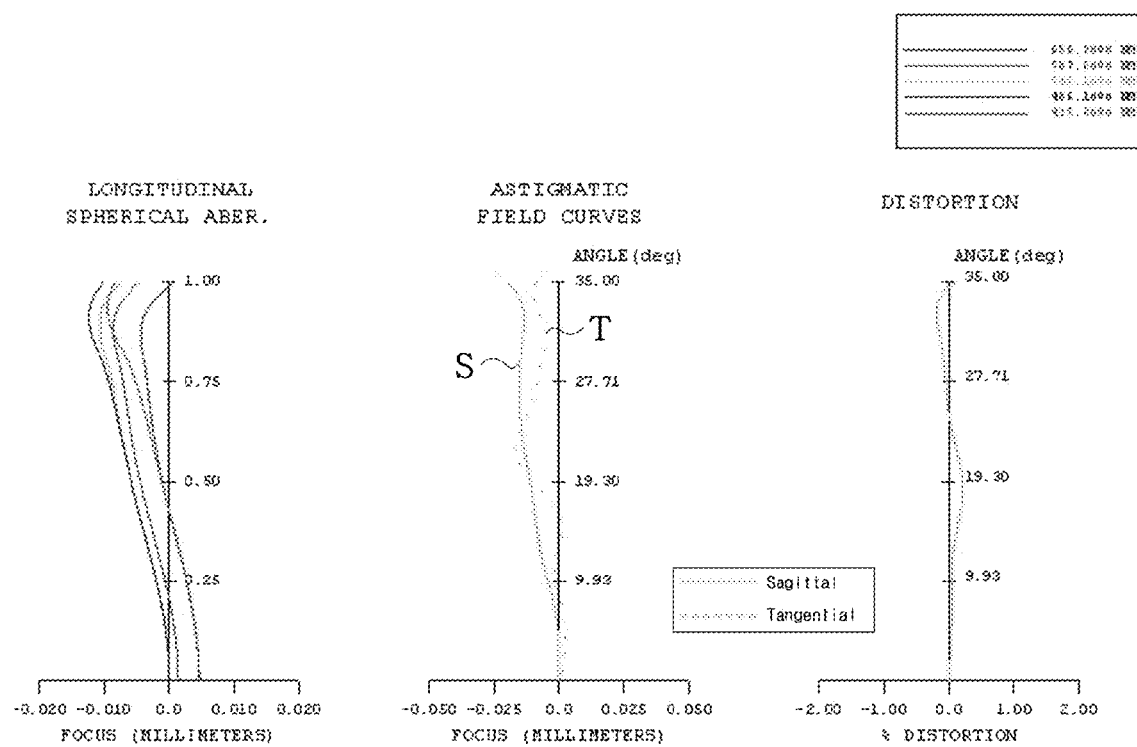
FIG. 21 is graphs showing aberration characteristics according to the eighth preferred embodiment of the present invention.

FIG. 21 is graphs showing aberration characteristics according to the eighth preferred embodiment of the present invention. In FIG. 21, the aberration characteristics are shown by representing a plurality of wavelengths by a plurality of colors.

Here, FIG. 21 is a graph obtained by measuring longitudinal spherical aberration, astigmatic field curve, and distortion according to the eighth preferred embodiment of the present invention.

<Ninth Preferred Embodiment>

Figure 22:
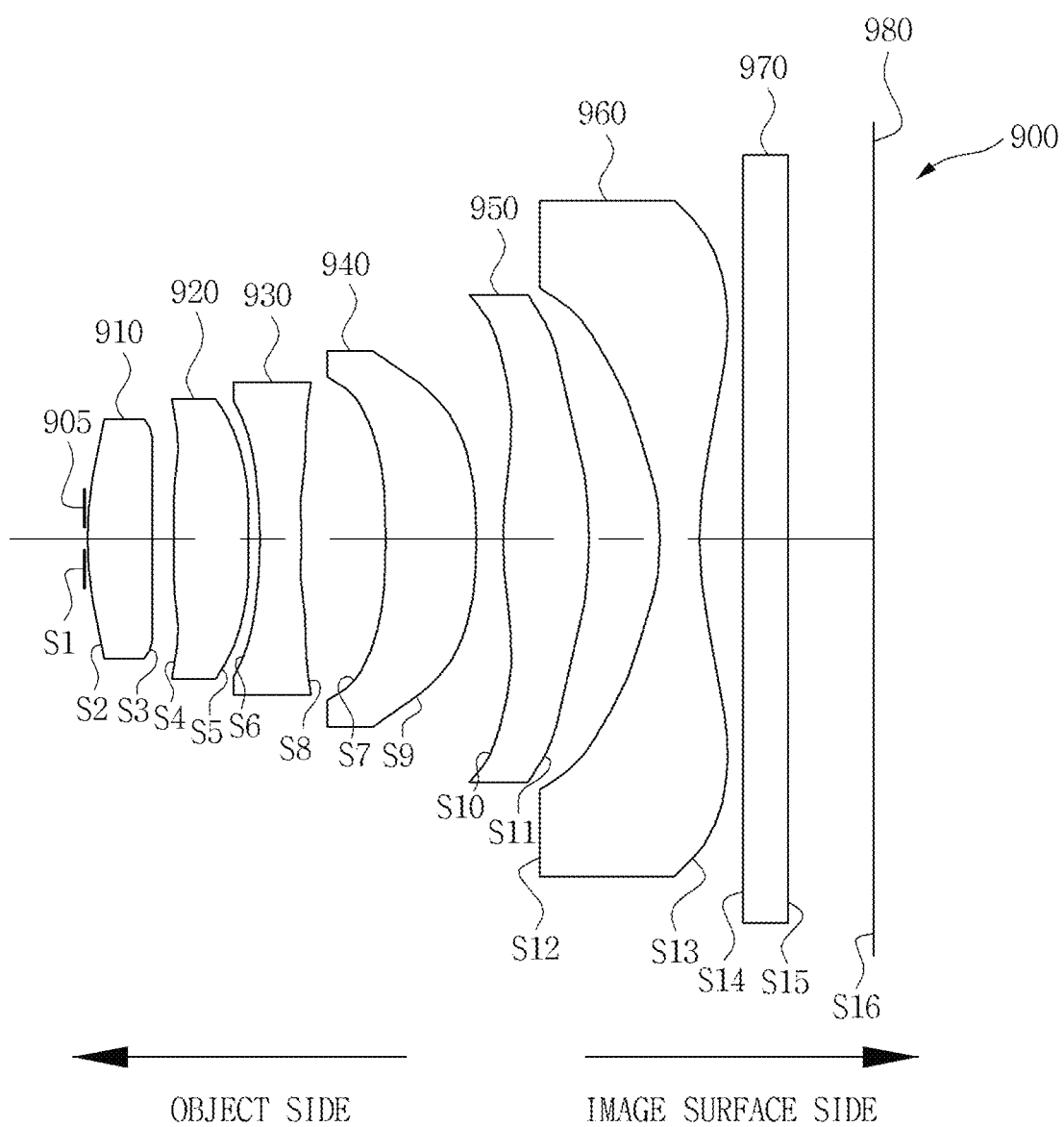
FIG. 22 is a lateral cross-sectional view schematically showing an internal structure of an imaging lens according to a ninth preferred embodiment of the present invention.

FIG. 22 is a lateral cross-sectional view schematically showing an internal structure of an imaging lens according to a ninth preferred embodiment of the present invention.

Referring to FIG. 22, The imaging lens 900 according to the ninth preferred embodiment of the present invention has optical characteristics as shown in the following Table 22.

TABLE 22

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 2.524 | 0.442 | 1.543 | 56.1 | Asphere | L1 |
| S3 | 5.794 | 0.158 | | | Asphere | |
| S4 | 4.189 | 0.538 | 1.544 | 56.1 | Asphere | L2 |
| S5 | −4.328 | 0.070 | | | Asphere | |
| S6 | −5.028 | 0.300 | 1.616 | 25.2 | Asphere | L3 |
| S7 | 6.085 | 0.586 | | | Asphere | |
| S8 | −4.288 | 0.633 | 1.562 | 43.1 | Asphere | L4 |
| S9 | −4.308 | 0.197 | | | Asphere | |
| S10 | 3.766 | 0.601 | 1.544 | 56.1 | Asphere | L5 |
| S11 | −2.290 | 0.476 | | | Asphere | |
| S12 | −1.933 | 0.300 | 1.541 | 49.4 | Asphere | L6 |
| S13 | 2.776 | 0.300 | | | Asphere | |
| S14 | 0.000 | 0.300 | 1.516 | 64.2 | Flat | Filter |
| S15 | 0.000 | 0.600 | | | Flat | |
| S16 | infinite | — | — | — | Flat | Image sensor |

As shown in the above Table 22, all surfaces of the first lens 910 (L1), the second lens 920 (L2), the third lens 930 (L3), the fourth lens 940 (L4), the fifth lens 950 (L5), and the sixth lens 960 (L6) of the imaging lens 900 according to the ninth preferred embodiment of the present invention are aspheric surfaces.

In addition, a "–" value stated in the above Table 22 means a value that is not defined.

Further, S1 means a surface determining a light amount of the imaging lens 900 according to the preferred embodiment of the present invention, and Stop stated in the Remark column of S1 means the aperture stop 905 (S1) used to adjust a light amount.

Here, although the aperture stop 905 is disposed on the surface of the first lens 910 toward the object side, a position of the aperture stop 905 according to the ninth preferred embodiment of the present invention is not limited thereto. In addition, the imaging lens 900 according to the ninth preferred embodiment of the present invention is not necessarily limited to including the aperture stop 905.

The following Table 23 shows aspheric constant values of aspheric lenses according to the ninth preferred embodiment of the present invention.

TABLE 23

| Lens surface No. | K | A | B | C | D |
|---|---|---|---|---|---|
| S2 | 0 | −8.50E−02 | −3.61E−02 | 5.33E−03 | 6.32E−03 |
| S3 | 0 | −3.57E−02 | 8.73E−03 | −2.41E−02 | 2.35E−02 |
| S4 | 0 | 4.42E−02 | 1.27E−02 | −3.10E−02 | −1.44E−02 |
| S5 | 0 | −4.24E−02 | −2.00E−02 | 1.05E−02 | −1.16E−02 |
| S6 | 0 | −1.14E−01 | 2.37E−02 | 1.97E−02 | 4.28E−03 |
| S7 | 0 | −8.93E−02 | 1.04E−02 | −4.13E−03 | −1.42E−03 |
| S8 | 0 | −2.28E−02 | −3.35E−02 | 2.52E−02 | −7.85E−03 |
| S9 | 0 | −1.34E−01 | 8.55E−02 | −7.49E−03 | 2.26E−03 |
| S10 | 0 | −1.38E−01 | 5.11E−02 | −2.06E−02 | 3.73E−03 |
| S11 | 0 | 1.21E−01 | −7.42E−02 | 2.16E−02 | −1.60E−03 |
| S12 | 0 | 9.73E−02 | −1.05E−01 | 4.25E−02 | −5.73E−03 |
| S13 | 0 | −8.13E−02 | 8.91E−03 | −1.78E−04 | −8.58E−05 |

As stated in the above Table 22 and Table 23, S1, which is the aperture stop 905 (S1) used to adjust the light amount, is flat, such that it does not have an aspheric constant value.

In addition, S14 and S15, which are the filter 970, and S16, which is the image sensor corresponding to the light receiving element 980, are flat, such that they do not have aspheric constant values.

Figure 23:
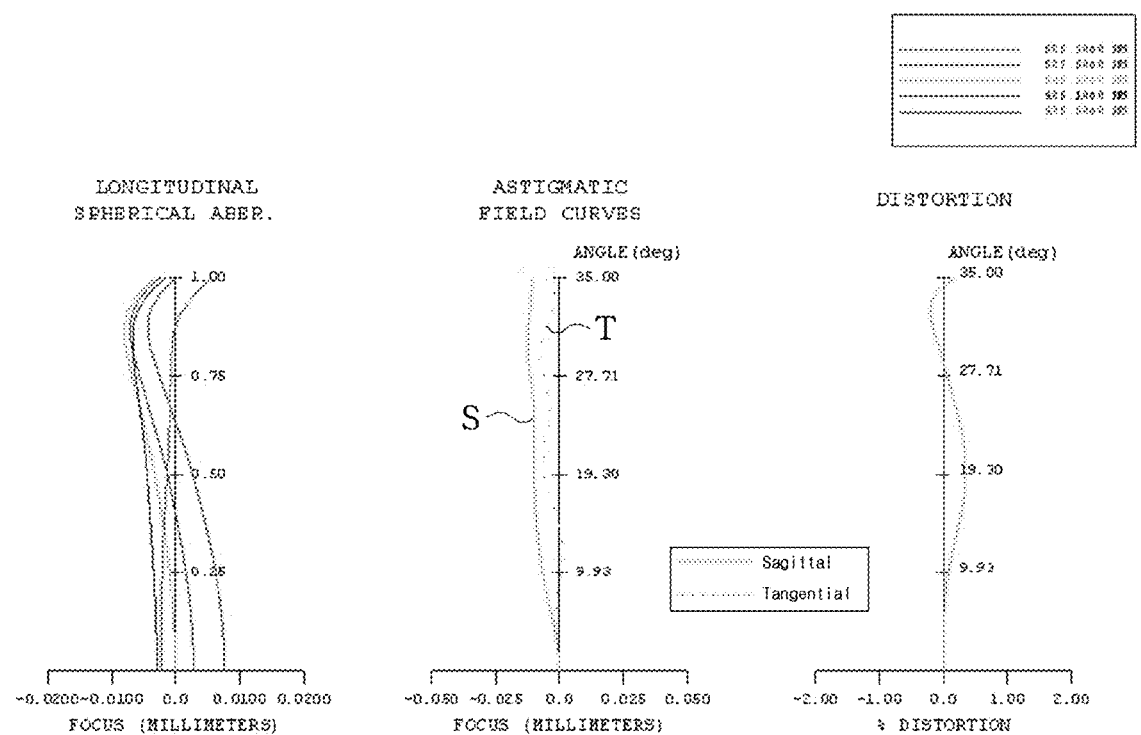
FIG. 23 is graphs showing aberration characteristics according to the ninth preferred embodiment of the present invention.

FIG. 23 is graphs showing aberration characteristics according to the ninth preferred embodiment of the present invention. In FIG. 23, the aberration characteristics are shown by representing a plurality of wavelengths by a plurality of colors.

Here, FIG. 23 is a graph obtained by measuring longitudinal spherical aberration, astigmatic field curve, and distortion according to the ninth preferred embodiment of the present invention.

<Tenth Preferred Embodiment>

Figure 24:
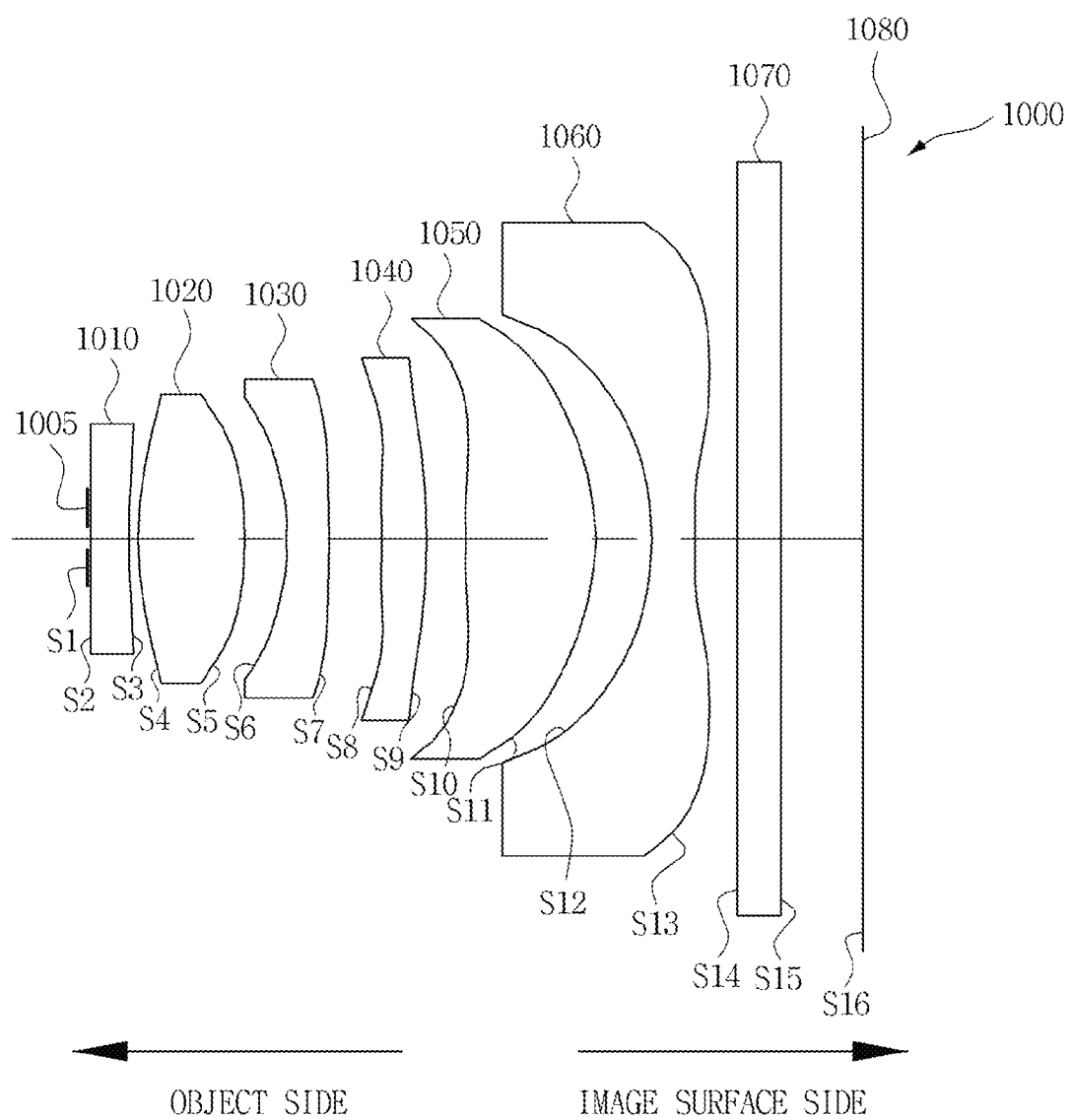
FIG. 24 is a lateral cross-sectional view schematically showing an internal structure of an imaging lens according to a tenth preferred embodiment of the present invention.

FIG. 24 is a lateral cross-sectional view schematically showing an internal structure of an imaging lens according to a tenth preferred embodiment of the present invention.

Referring to FIG. 24, The imaging lens 1000 according to the tenth preferred embodiment of the present invention has optical characteristics as shown in the following Table 24.

TABLE 24

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 7.298 | 0.300 | 1.611 | 27.6 | Asphere | L1 |
| S3 | 8.599 | 0.050 | | | Asphere | |
| S4 | 3.054 | 0.762 | 1.544 | 56.1 | Asphere | L2 |
| S5 | −2.459 | 0.293 | | | Asphere | |
| S6 | −2.119 | 0.300 | 1.630 | 23.5 | Asphere | L3 |
| S7 | −17.090 | 0.381 | | | Asphere | |
| S8 | −17.285 | 0.303 | 1.640 | 23.3 | Asphere | L4 |
| S9 | −17.793 | 0.284 | | | Asphere | |
| S10 | 7.126 | 0.915 | 1.547 | 53.1 | Asphere | L5 |
| S11 | −1.786 | 0.412 | | | Asphere | |
| S12 | −1.780 | 0.300 | 1.512 | 57.9 | Asphere | L6 |
| S13 | 2.904 | 0.300 | | | Asphere | |
| S14 | 0.000 | 0.300 | 1.516 | 64.2 | Flat | Filter |
| S15 | 0.000 | 0.600 | | | Flat | |
| S16 | infinite | — | — | — | Flat | Image sensor |

As shown in the above Table 24, all surfaces of the first lens 1010 (L1), the second lens 1020 (L2), the third lens 1030 (L3), the fourth lens 1040 (L4), the fifth lens 1050 (L5), and the sixth lens 1060 (L6) of the imaging lens 1000 according to the tenth preferred embodiment of the present invention are aspheric surfaces.

In addition, a "–" value stated in the above Table 24 means a value that is not defined.

Further, S1 means a surface determining a light amount of the imaging lens 1000 according to the preferred embodiment of the present invention, and Stop stated in the Remark column of S1 means the aperture stop 1005 (S1) used to adjust a light amount.

Here, although the aperture stop 1005 is disposed on the surface of the first lens 1010 toward the object side, a position of the aperture stop 1005 according to the tenth preferred embodiment of the present invention is not limited thereto. In addition, the imaging lens 1000 according to the tenth preferred embodiment of the present invention is not necessarily limited to including the aperture stop 1005.

The following Table 25 shows aspheric constant values of aspheric lenses according to the tenth preferred embodiment of the present invention.

TABLE 25

| Lens surface No. | K | A | B | C | D |
|---|---|---|---|---|---|
| S2 | 0 | −5.42E−02 | −6.47E−03 | 8.94E−03 | −1.12E−02 |
| S3 | 0 | −3.74E−02 | 2.81E−02 | −1.38E−02 | 7.56E−03 |
| S4 | 0 | −2.35E−03 | 1.23E−02 | −2.44E−02 | −3.17E−03 |
| S5 | 0 | −4.76E−02 | −1.67E−02 | 1.11E−02 | −1.01E−02 |
| S6 | 0 | −5.17E−02 | 1.07E−02 | 4.24E−03 | 1.24E−02 |
| S7 | 0 | −2.77E−02 | −6.49E−03 | −1.15E−02 | 6.18E−03 |
| S8 | 0 | −2.01E−02 | −5.16E−03 | 8.27E−03 | −9.12E−03 |
| S9 | 0 | −7.88E−02 | 4.09E−02 | −4.60E−03 | 9.17E−04 |
| S10 | 0 | −9.75E−02 | 3.07E−02 | −1.93E−02 | 3.23E−03 |
| S11 | 0 | 8.85E−02 | −3.33E−02 | 8.16E−03 | −1.78E−03 |
| S12 | 0 | 5.70E−02 | −6.04E−02 | 3.17E−02 | −6.38E−03 |
| S13 | 0 | −9.34E−02 | 1.78E−02 | −2.38E−03 | 8.48E−05 |

As stated in the above Table 24 and Table 25, S1, which is the aperture stop 1005 (S1) used to adjust the light amount, is flat, such that it does not have an aspheric constant value.

In addition, S14 and S15, which are the filter 1070, and S16, which is the image sensor corresponding to the light receiving element 1080, are flat, such that they do not have aspheric constant values.

Figure 25:
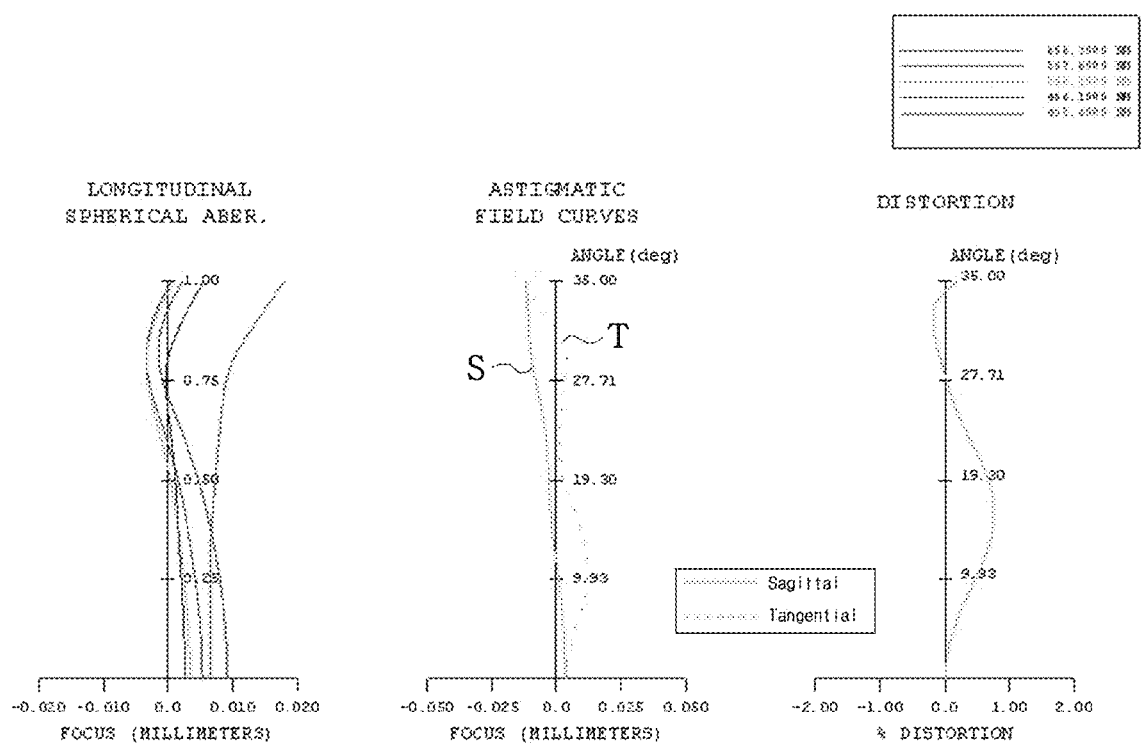
FIG. 25 is graphs showing aberration characteristics according to the tenth preferred embodiment of the present invention.

FIG. 25 is graphs showing aberration characteristics according to the tenth preferred embodiment of the present invention. In FIG. 25, the aberration characteristics are shown by representing a plurality of wavelengths by a plurality of colors.

Here, FIG. 25 is a graph obtained by measuring longitudinal spherical aberration, astigmatic field curve, and distortion according to the tenth preferred embodiment of the present invention.

<Eleventh Preferred Embodiment>

Figure 26:
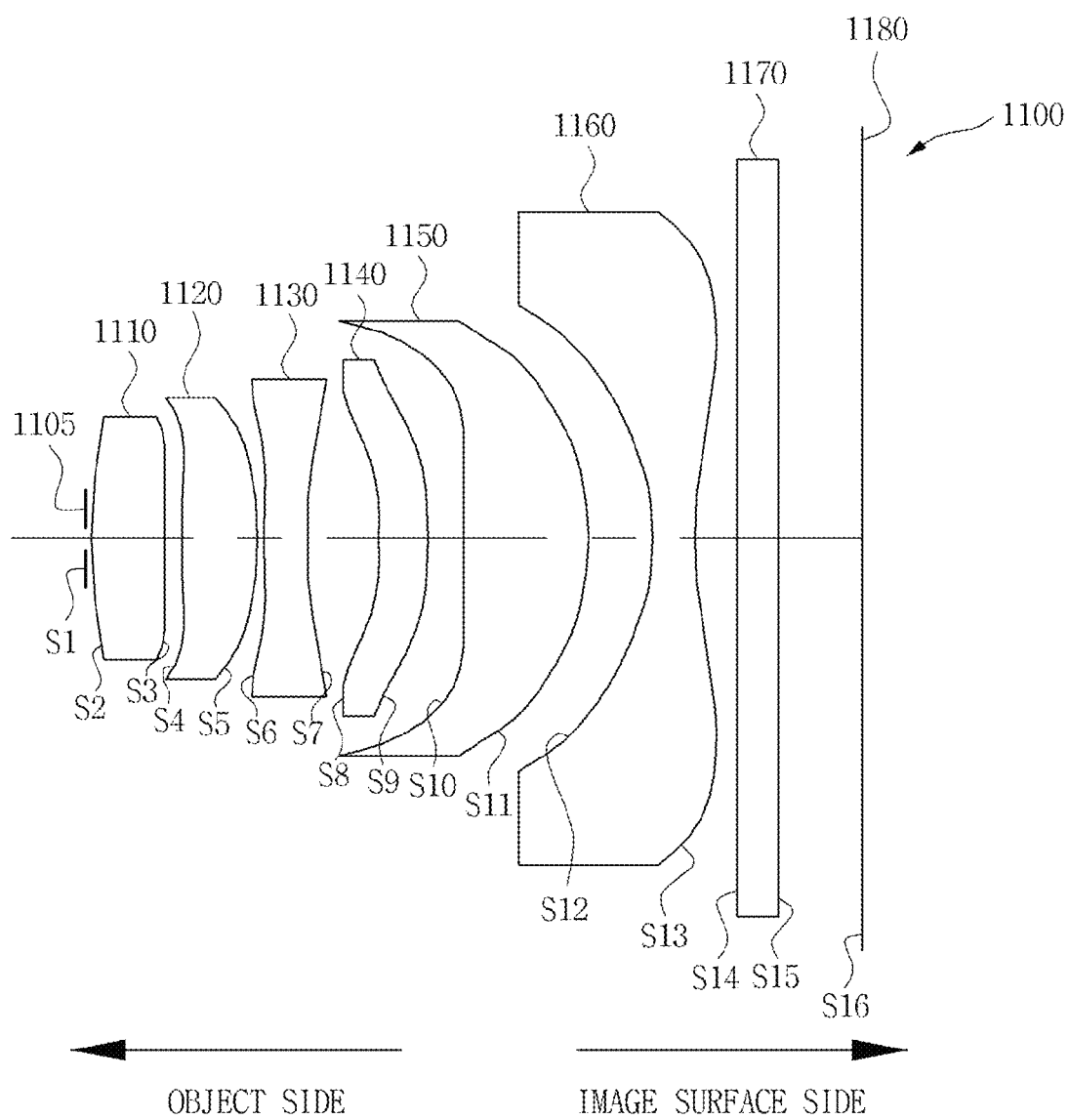
FIG. 26 is a lateral cross-sectional view schematically showing an internal structure of an imaging lens according to a eleventh preferred embodiment of the present invention.

FIG. 26 is a lateral cross-sectional view schematically showing an internal structure of an imaging lens according to a eleventh preferred embodiment of the present invention.

Referring to FIG. 26, The imaging lens 1100 according to the eleventh preferred embodiment of the present invention has optical characteristics as shown in the following Table 26.

TABLE 26

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 2.973 | 0.527 | 1.544 | 56.1 | Asphere | L1 |
| S3 | 9.332 | 0.130 | | | Asphere | |
| S4 | 6.719 | 0.542 | 1.544 | 56.1 | Asphere | L2 |
| S5 | −2.780 | 0.050 | | | Asphere | |
| S6 | −27.423 | 0.300 | 1.632 | 23.4 | Asphere | L3 |
| S7 | 3.557 | 0.511 | | | Asphere | |
| S8 | −2.283 | 0.346 | 1.566 | 35.7 | Asphere | L4 |
| S9 | −3.757 | 0.236 | | | Asphere | |
| S10 | 4.702 | 0.894 | 1.544 | 56.1 | Asphere | L5 |
| S11 | −1.727 | 0.463 | | | Asphere | |
| S12 | −1.783 | 0.300 | 1.514 | 57.1 | Asphere | L6 |
| S13 | 2.788 | 0.300 | | | Asphere | |
| S14 | 0.000 | 0.300 | 1.516 | 64.2 | Flat | Filter |
| S15 | 0.000 | 0.600 | | | Flat | |
| S16 | infinite | — | — | — | Flat | Image sensor |

As shown in the above Table 26, all surfaces of the first lens 1110 (L1), the second lens 1120 (L2), the third lens 1130 (L3), the fourth lens 1140 (L4), the fifth lens 1150 (L5), and the sixth lens 1160 (L6) of the imaging lens 1100 according to the eleventh preferred embodiment of the present invention are aspheric surfaces.

In addition, a "−" value stated in the above Table 26 means a value that is not defined.

Further, S1 means a surface determining a light amount of the imaging lens 1100 according to the preferred embodiment of the present invention, and Stop stated in the Remark column of S1 means the aperture stop 1105 (S1) used to adjust a light amount.

Here, although the aperture stop 1105 is disposed on the surface of the first lens 1110 toward the object side, a position of the aperture stop 1105 according to the eleventh preferred embodiment of the present invention is not limited thereto. In addition, the imaging lens 1100 according to the eleventh preferred embodiment of the present invention is not necessarily limited to including the aperture stop 1105.

The following Table 27 shows aspheric constant values of aspheric lenses according to the eleventh preferred embodiment of the present invention.

TABLE 27

| Lens surface No. | K | A | B | C | D |
|---|---|---|---|---|---|
| S2 | 0 | −4.33E−02 | −1.23E−02 | −1.90E−02 | −1.56E−03 |
| S3 | 0 | −1.52E−01 | 1.33E−02 | −3.43E−02 | 2.34E−02 |

TABLE 27-continued

| Lens surface No. | K | A | B | C | D |
|---|---|---|---|---|---|
| S4 | 0 | −1.46E−01 | −9.41E−03 | −1.04E−02 | −2.19E−03 |
| S5 | 0 | −6.21E−02 | 2.66E−03 | −2.16E−02 | −3.05E−04 |
| S6 | 0 | −7.53E−02 | 2.47E−02 | −2.54E−02 | 1.66E−02 |
| S7 | 0 | −4.17E−02 | 4.04E−03 | 8.16E−03 | 1.45E−03 |
| S8 | 0 | −2.57E−02 | 1.06E−02 | 3.79E−02 | −8.44E−03 |
| S9 | 0 | −1.79E−01 | 8.09E−02 | −1.06E−02 | 4.04E−03 |
| S10 | 0 | −1.55E−01 | 3.10E−02 | −1.51E−02 | −3.37E−04 |
| S11 | 0 | 1.12E−01 | −7.70E−02 | 2.17E−02 | −2.36E−03 |
| S12 | 0 | 1.09E−01 | −9.86E−02 | 4.06E−02 | −5.41E−03 |
| S13 | 0 | −7.97E−02 | 1.19E−02 | −1.06E−03 | −1.66E−05 |

As stated in the above Table 26 and Table 27, S1, which is the aperture stop 1105 (S1) used to adjust the light amount, is flat, such that it does not have an aspheric constant value.

In addition, S14 and S15, which are the filter 1170, and S16, which is the image sensor corresponding to the light receiving element 1180, are flat, such that they do not have aspheric constant values.

Figure 27:
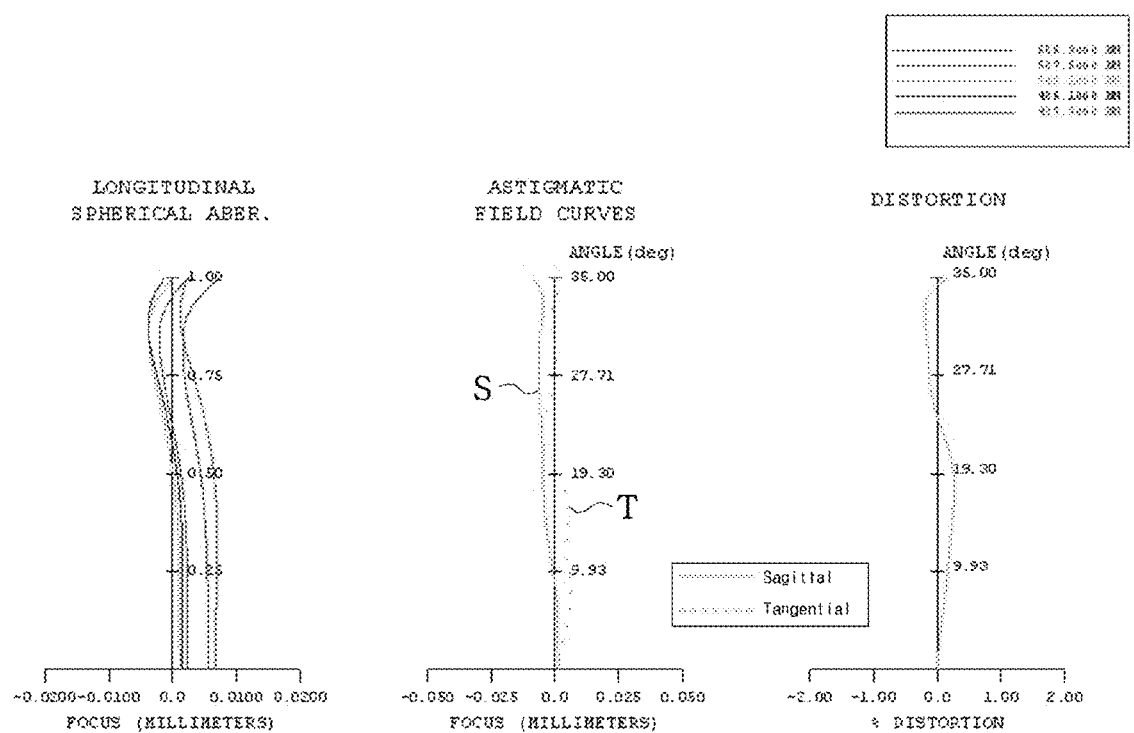
FIG. 27 is graphs showing aberration characteristics according to the eleventh preferred embodiment of the present invention.

FIG. 27 is graphs showing aberration characteristics according to the eleventh preferred embodiment of the present invention. In FIG. 27, the aberration characteristics are shown by representing a plurality of wavelengths by a plurality of colors.

Here, FIG. 27 is a graph obtained by measuring longitudinal spherical aberration, astigmatic field curve, and distortion according to the eleventh preferred embodiment of the present invention.

<Twelfth Preferred Embodiment>

Figure 28:
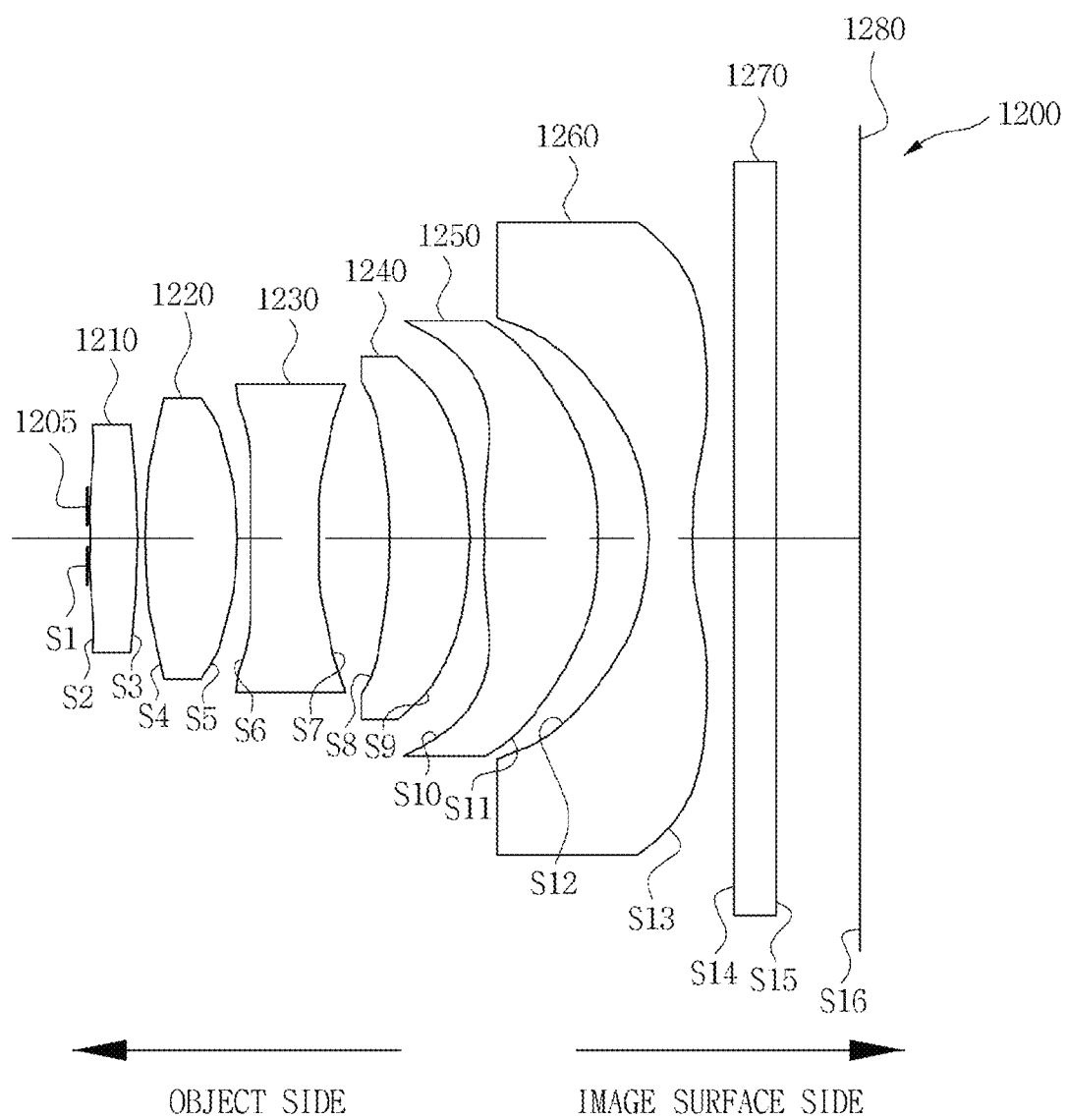
FIG. 28 is a lateral cross-sectional view schematically showing an internal structure of an imaging lens according to a twelfth preferred embodiment of the present invention.

FIG. 28 is a lateral cross-sectional view schematically showing an internal structure of an imaging lens according to a twelfth preferred embodiment of the present invention.

Referring to FIG. 28, The imaging lens 1200 according to the twelfth preferred embodiment of the present invention has optical characteristics as shown in the following Table 28.

TABLE 28

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 5.427 | 0.347 | 1.549 | 51.5 | Asphere | L1 |
| S3 | −68.568 | 0.050 | | | Asphere | |
| S4 | 5.313 | 0.657 | 1.544 | 56.1 | Asphere | L2 |
| S5 | −2.910 | 0.114 | | | Asphere | |
| S6 | −29.572 | 0.475 | 1.622 | 24.6 | Asphere | L3 |
| S7 | 2.811 | 0.504 | | | Asphere | |
| S8 | −4.759 | 0.547 | 1.562 | 43.1 | Asphere | L4 |
| S9 | −6.888 | 0.135 | | | Asphere | |
| S10 | 4.476 | 0.802 | 1.544 | 56.1 | Asphere | L5 |
| S11 | −1.734 | 0.369 | | | Asphere | |
| S12 | −1.678 | 0.300 | 1.516 | 56.5 | Asphere | L6 |
| S13 | 2.752 | 0.300 | | | Asphere | |
| S14 | 0.000 | 0.300 | 1.516 | 64.2 | Flat | Filter |
| S15 | 0.000 | 0.600 | | | Flat | |
| S16 | infinite | — | — | — | Flat | Image sensor |

As shown in the above Table 28, all surfaces of the first lens 1210 (L1), the second lens 1220 (L2), the third lens 1230 (L3), the fourth lens 1240 (L4), the fifth lens 1250 (L5), and the sixth lens 1260 (L6) of the imaging lens 1200 according to the twelfth preferred embodiment of the present invention are aspheric surfaces.

In addition, a "−" value stated in the above Table 28 means a value that is not defined.

Further, S1 means a surface determining a light amount of the imaging lens 1200 according to the preferred embodiment of the present invention, and Stop stated in the Remark column of S1 means the aperture stop 1205 (S1) used to adjust a light amount.

Here, although the aperture stop 1205 is disposed on the surface of the first lens 1210 toward the object side, a position of the aperture stop 1205 according to the twelfth preferred embodiment of the present invention is not limited thereto. In addition, the imaging lens 1200 according to the twelfth preferred embodiment of the present invention is not necessarily limited to including the aperture stop 1205.

The following Table 29 shows aspheric constant values of aspheric lenses according to the twelfth preferred embodiment of the present invention.

TABLE 29

| Lens surface No. | K | A | B | C | D |
|---|---|---|---|---|---|
| S2 | 0 | −8.48E−02 | −1.95E−02 | 1.69E−02 | −3.81E−03 |
| S3 | 0 | −4.49E−02 | 9.46E−03 | −1.23E−03 | 6.68E−03 |
| S4 | 0 | 4.70E−02 | 6.21E−03 | −1.89E−02 | −2.56E−04 |
| S5 | 0 | −3.31E−02 | −1.19E−02 | 6.37E−03 | −5.06E−03 |
| S6 | 0 | −1.08E−01 | 1.22E−02 | 1.30E−02 | 2.36E−03 |
| S7 | 0 | −5.82E−02 | 2.22E−02 | −5.86E−04 | 1.22E−03 |
| S8 | 0 | −1.63E−04 | −1.84E−02 | 1.08E−02 | −8.06E−03 |
| S9 | 0 | −1.69E−01 | 6.33E−02 | −1.42E−02 | −1.77E−03 |
| S10 | 0 | −1.63E−01 | 5.26E−02 | −2.18E−02 | 2.19E−03 |
| S11 | 0 | 1.27E−01 | −7.47E−02 | 2.19E−02 | −2.26E−03 |
| S12 | 0 | 8.82E−02 | −1.00E−01 | 4.70E−02 | −7.01E−03 |
| S13 | 0 | −1.01E−01 | 1.84E−02 | −2.16E−03 | 4.82E−05 |

As stated in the above Table 28 and Table 29, S1, which is the aperture stop 1205 (S1) used to adjust the light amount, is flat, such that it does not have an aspheric constant value.

In addition, S14 and S15, which are the filter 1270, and S16, which is the image sensor corresponding to the light receiving element 1280, are flat, such that they do not have aspheric constant values.

Figure 29:
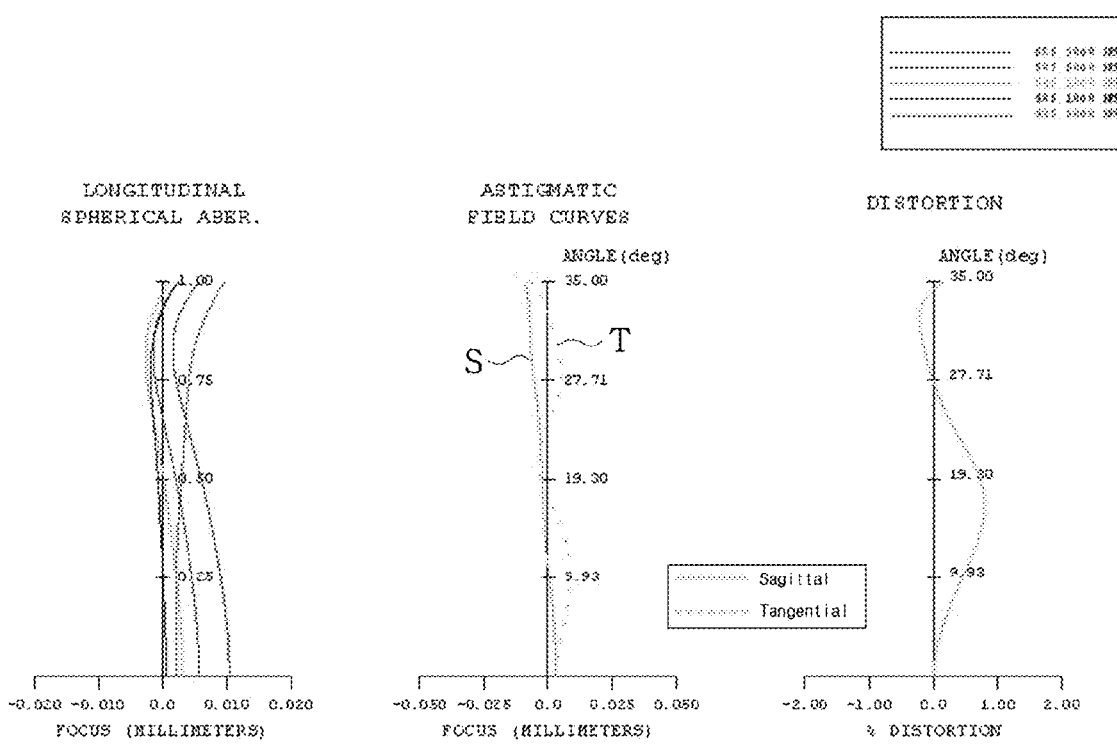
FIG. 29 is graphs showing aberration characteristics according to the twelfth preferred embodiment of the present invention.

FIG. 29 is graphs showing aberration characteristics according to the twelfth preferred embodiment of the present invention. In FIG. 29, the aberration characteristics are shown by representing a plurality of wavelengths by a plurality of colors.

Here, FIG. 29 is a graph obtained by measuring longitudinal spherical aberration, astigmatic field curve, and distortion according to the twelfth preferred embodiment of the present invention.

<Thirteenth Preferred Embodiment>

Figure 30:
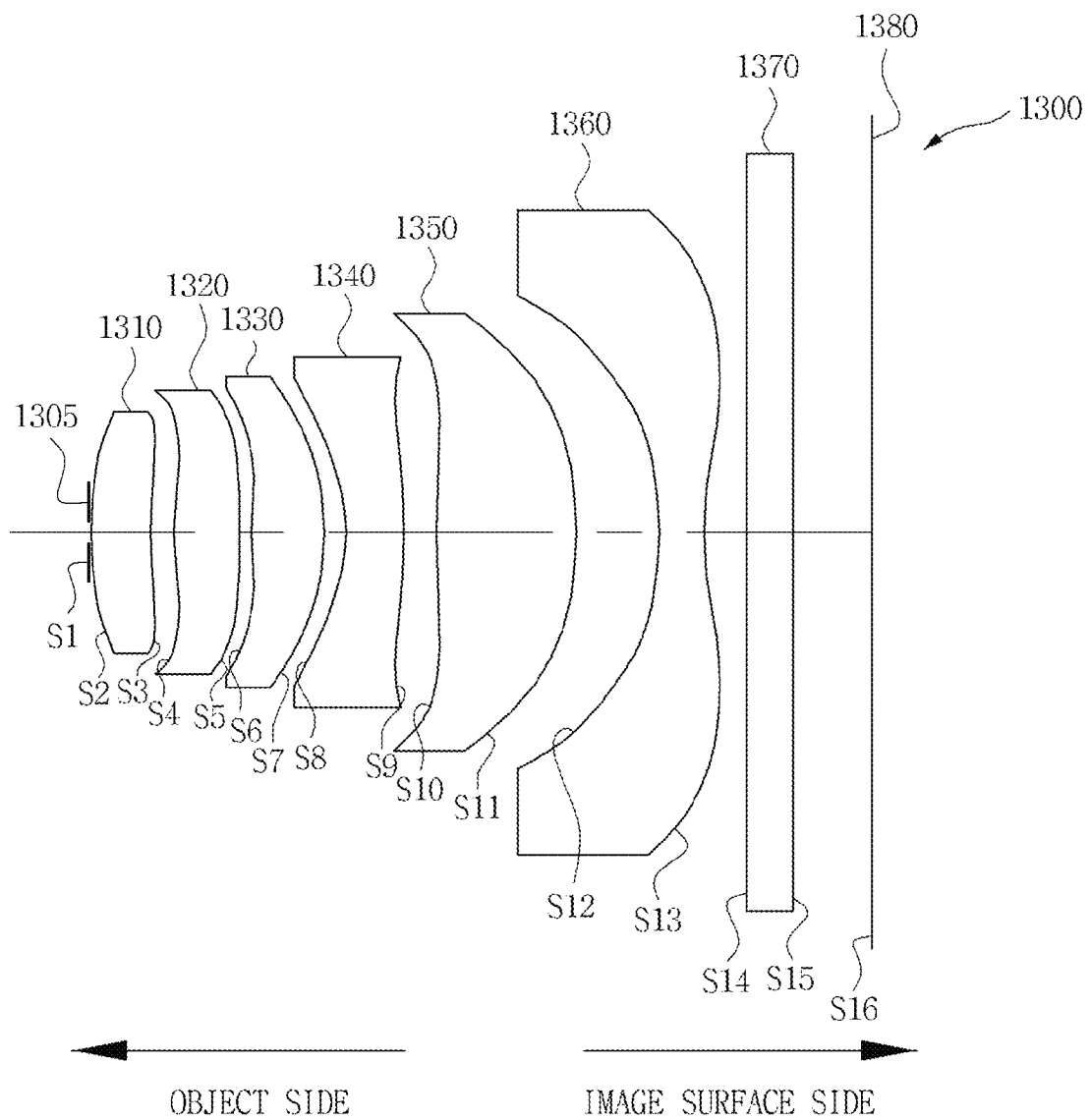
FIG. 30 is a lateral cross-sectional view schematically showing an internal structure of an imaging lens according to a thirteenth preferred embodiment of the present invention.

FIG. 30 is a lateral cross-sectional view schematically showing an internal structure of an imaging lens according to a thirteenth preferred embodiment of the present invention.

Referring to FIG. 30, The imaging lens 1300 according to the thirteenth preferred embodiment of the present invention has optical characteristics as shown in the following Table 30.

TABLE 30

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 2.373 | 0.431 | 1.544 | 56.1 | Flat | L1 |
| S3 | 5.456 | 0.151 | | | Asphere | |
| S4 | 3.291 | 0.435 | 1.544 | 56.1 | Asphere | L2 |
| S5 | 7.298 | 0.130 | | | Asphere | |
| S6 | −11.917 | 0.486 | 1.544 | 56.1 | Asphere | L3 |

TABLE 30-continued

| Lens surface No. | Radius of curvature (mm) | Thickness (mm) | Refractive index | Abbe number | Lens shape | Remark |
|---|---|---|---|---|---|---|
| S7 | −1.881 | 0.153 | | | Asphere | |
| S8 | −1.322 | 0.399 | 1.632 | 23.4 | Asphere | L4 |
| S9 | −8.220 | 0.254 | | | Asphere | |
| S10 | 6.739 | 0.980 | 1.583 | 34.3 | Asphere | L5 |
| S11 | −1.743 | 0.581 | | | Asphere | |
| S12 | −2.388 | 0.300 | 1.555 | 45.7 | Asphere | L6 |
| S13 | 2.818 | 0.300 | | | Asphere | |
| S14 | 0.000 | 0.300 | 1.516 | 64.2 | Asphere | Filter |
| S15 | 0.000 | 0.600 | | | Flat | |
| S16 | infinite | — | — | — | Flat | Image sensor |

As shown in the above Table 30, all surfaces of the first lens 1310 (L1), the second lens 1320 (L2), the third lens 1330 (L3), the fourth lens 1340 (L4), the fifth lens 1350 (L5), and the sixth lens 1360 (L6) of the imaging lens 1300 according to the thirteenth preferred embodiment of the present invention are aspheric surfaces.

In addition, a "−" value stated in the above Table 30 means a value that is not defined.

Further, S1 means a surface determining a light amount of the imaging lens 1300 according to the preferred embodiment of the present invention, and Stop stated in the Remark column of S1 means the aperture stop 1305 (S1) used to adjust a light amount.

Here, although the aperture stop 1305 is disposed on the surface of the first lens 1310 toward the object side, a position of the aperture stop 1305 according to the thirteenth preferred embodiment of the present invention is not limited thereto. In addition, the imaging lens 1300 according to the thirteenth preferred embodiment of the present invention is not necessarily limited to including the aperture stop 1305.

The following Table 31 shows aspheric constant values of aspheric lenses according to the thirteenth preferred embodiment of the present invention.

TABLE 31

| Lens surface No. | K | A | B | C | D |
|---|---|---|---|---|---|
| S2 | 0 | −1.72E−02 | 8.04E−03 | −9.18E−03 | −1.63E−02 |
| S3 | 0 | −1.46E−01 | 1.03E−01 | −1.01E−01 | −1.92E−03 |
| S4 | 0 | −2.31E−01 | 6.13E−02 | −5.76E−02 | −4.18E−02 |
| S5 | 0 | −2.26E−01 | −4.47E−02 | 3.97E−02 | −7.93E−04 |
| S6 | 0 | −1.25E−01 | −6.46E−02 | 3.39E−02 | 2.02E−02 |
| S7 | 0 | 7.66E−03 | −1.40E−02 | −7.64E−03 | 6.38E−03 |
| S8 | 0 | 1.13E−01 | 3.36E−02 | 4.54E−03 | 5.67E−05 |
| S9 | 0 | −3.05E−02 | 5.26E−02 | −1.59E−04 | −3.91E−03 |
| S10 | 0 | −8.25E−02 | 7.05E−03 | −3.65E−03 | 2.73E−04 |
| S11 | 0 | 9.91E−02 | −6.56E−02 | 2.19E−02 | −2.89E−03 |
| S12 | 0 | 3.49E−02 | −9.59E−02 | 4.51E−02 | −7.24E−03 |
| S13 | 0 | −1.02E−01 | 1.68E−02 | −1.61E−03 | 6.67E−06 |

As stated in the above Table 30 and Table 31, S1, which is the aperture stop 1305 (S1) used to adjust the light amount, is flat, such that it does not have an aspheric constant value.

In addition, S14 and S15, which are the filter 1370, and S16, which is the image sensor corresponding to the light receiving element 1380, are flat, such that they do not have aspheric constant values.

Figure 31:
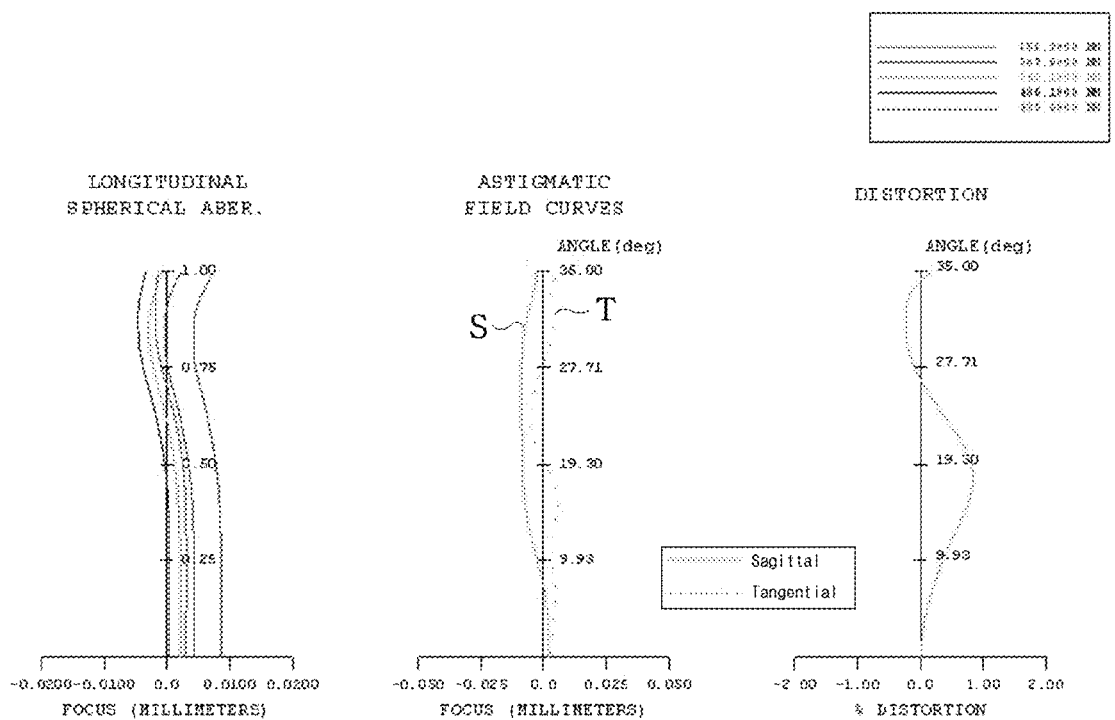
FIG. 31 is graphs showing aberration characteristics according to the thirteenth preferred embodiment of the present invention.

FIG. 31 is graphs showing aberration characteristics according to the thirteenth preferred embodiment of the present invention. In FIG. 31, the aberration characteristics are shown by representing a plurality of wavelengths by a plurality of colors.

Here, FIG. 31 is a graph obtained by measuring longitudinal spherical aberration, astigmatic field curve, and distortion according to the thirteenth preferred embodiment of the present invention.

<Fourteenth Preferred Embodiment>

Figure 32:
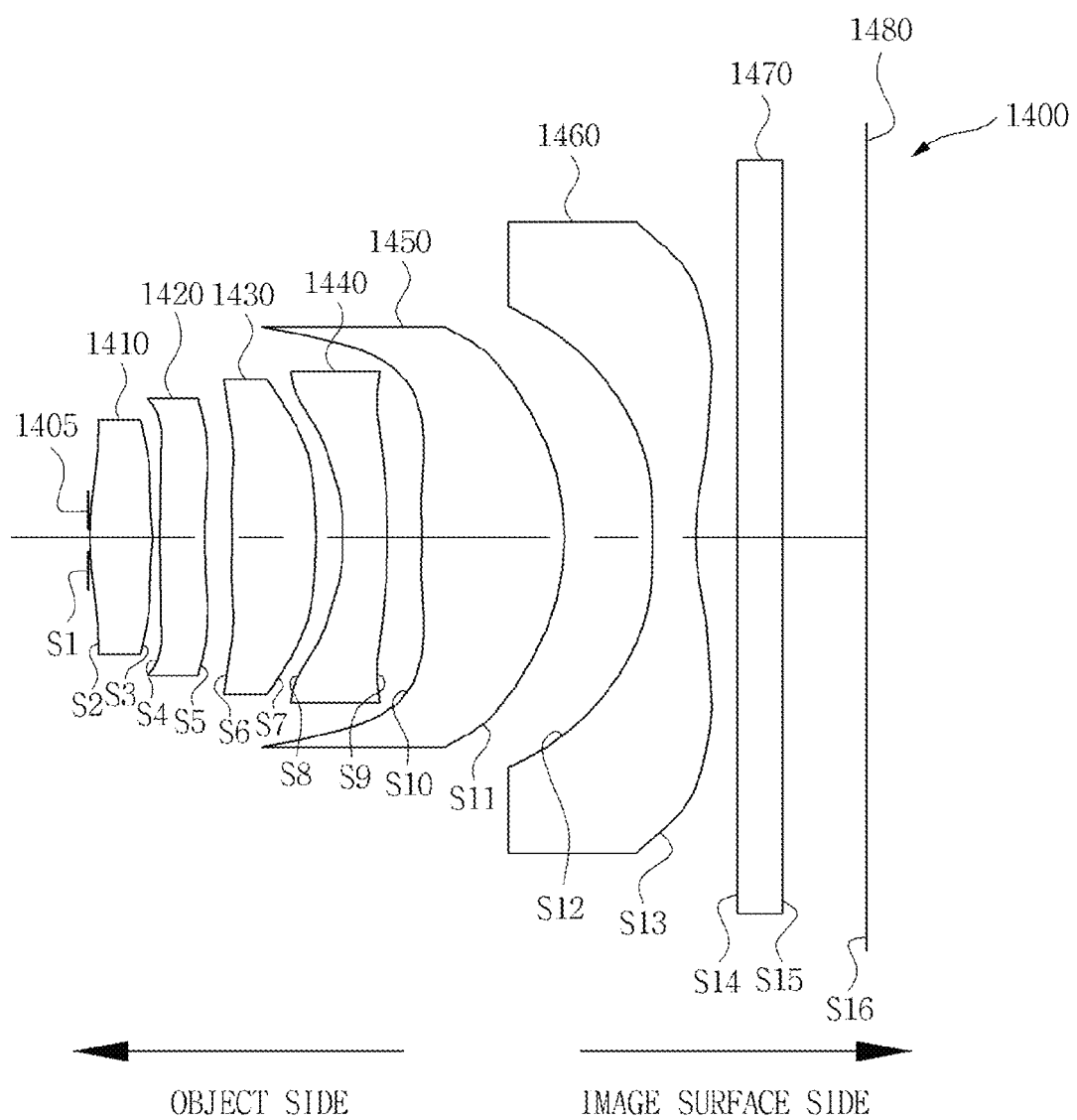
FIG. 32 is a lateral cross-sectional view schematically showing an internal structure of an imaging lens according to a fourteenth preferred embodiment of the present invention.

FIG. 32 is a lateral cross-sectional view schematically showing an internal structure of an imaging lens according to a fourteenth preferred embodiment of the present invention.

Referring to FIG. 32, The imaging lens 1400 according to the fourteenth preferred embodiment of the present invention has optical characteristics as shown in the following Table 32.

TABLE 32

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 3.766 | 0.442 | 1.544 | 56.1 | Asphere | L1 |
| S3 | −8.268 | 0.050 | | | Asphere | |
| S4 | 6.263 | 0.340 | 1.544 | 56.1 | Asphere | L2 |
| S5 | 6.596 | 0.180 | | | Asphere | |
| S6 | 28.489 | 0.593 | 1.544 | 56.1 | Asphere | L3 |
| S7 | −3.734 | 0.180 | | | Asphere | |
| S8 | −1.718 | 0.324 | 1.632 | 23.4 | Asphere | L4 |
| S9 | −10.508 | 0.242 | | | Asphere | |
| S10 | 9.953 | 1.002 | 1.563 | 42.4 | Asphere | L5 |
| S11 | −1.666 | 0.647 | | | Asphere | |
| S12 | −2.366 | 0.300 | 1.501 | 63.0 | Asphere | L6 |
| S13 | 2.706 | 0.300 | | | Asphere | |
| S14 | 0.000 | 0.300 | 1.516 | 64.2 | Flat | Filter |
| S15 | 0.000 | 0.600 | | | Flat | |
| S16 | infinite | — | — | — | Flat | Image sensor |

As shown in the above Table 32, all surfaces of the first lens 1410 (L1), the second lens 1420 (L2), the third lens 1430 (L3), the fourth lens 1440 (L4), the fifth lens 1450 (L5), and the sixth lens 1460 (L6) of the imaging lens 1400 according to the fourteenth preferred embodiment of the present invention are aspheric surfaces.

In addition, a "−" value stated in the above Table 32 means a value that is not defined.

Further, S1 means a surface determining a light amount of the imaging lens 1400 according to the preferred embodiment of the present invention, and Stop stated in the Remark column of S1 means the aperture stop 1405 (S1) used to adjust a light amount.

Here, although the aperture stop 1405 is disposed on the surface of the first lens 1410 toward the object side, a position of the aperture stop 1405 according to the fourteenth preferred embodiment of the present invention is not limited thereto. In addition, the imaging lens 1400 according to the fourteenth preferred embodiment of the present invention is not necessarily limited to including the aperture stop 1405.

The following Table 33 shows aspheric constant values of aspheric lenses according to the fourteenth preferred embodiment of the present invention.

TABLE 33

| Lens surface No. | K | A | B | C | D |
|---|---|---|---|---|---|
| S2 | 0 | −2.60E−02 | −2.17E−02 | 1.73E−02 | −4.18E−02 |
| S3 | 0 | −2.08E−02 | −2.15E−02 | −3.71E−02 | −3.03E−02 |
| S4 | 0 | −5.91E−02 | −6.89E−03 | −5.04E−02 | −3.83E−02 |
| S5 | 0 | −1.45E−01 | 1.97E−02 | −1.32E−02 | 1.03E−02 |
| S6 | 0 | −7.81E−02 | −1.49E−02 | 3.98E−02 | −8.35E−03 |
| S7 | 0 | −7.86E−02 | −5.10E−02 | 1.29E−02 | 9.75E−03 |
| S8 | 0 | −5.08E−02 | 3.96E−02 | 3.87E−02 | −9.19E−03 |
| S9 | 0 | −7.34E−02 | 6.40E−02 | −3.70E−03 | 3.18E−02 |
| S10 | 0 | −6.76E−02 | −3.23E−02 | 1.08E−02 | −1.33E−02 |
| S11 | 0 | 9.95E−02 | −5.77E−02 | 1.65E−02 | −2.90E−03 |
| S12 | 0 | 2.54E−02 | −9.10E−02 | 4.33E−02 | −7.28E−03 |
| S13 | 0 | −1.05E−01 | 1.58E−02 | −1.28E−03 | −3.77E−05 |

As stated in the above Table 32 and Table 33, S1, which is the aperture stop 1405 (S1) used to adjust the light amount, is flat, such that it does not have an aspheric constant value.

In addition, S14 and S15, which are the filter 1470, and S16, which is the image sensor corresponding to the light receiving element 1480, are flat, such that they do not have aspheric constant values.

Figure 33:
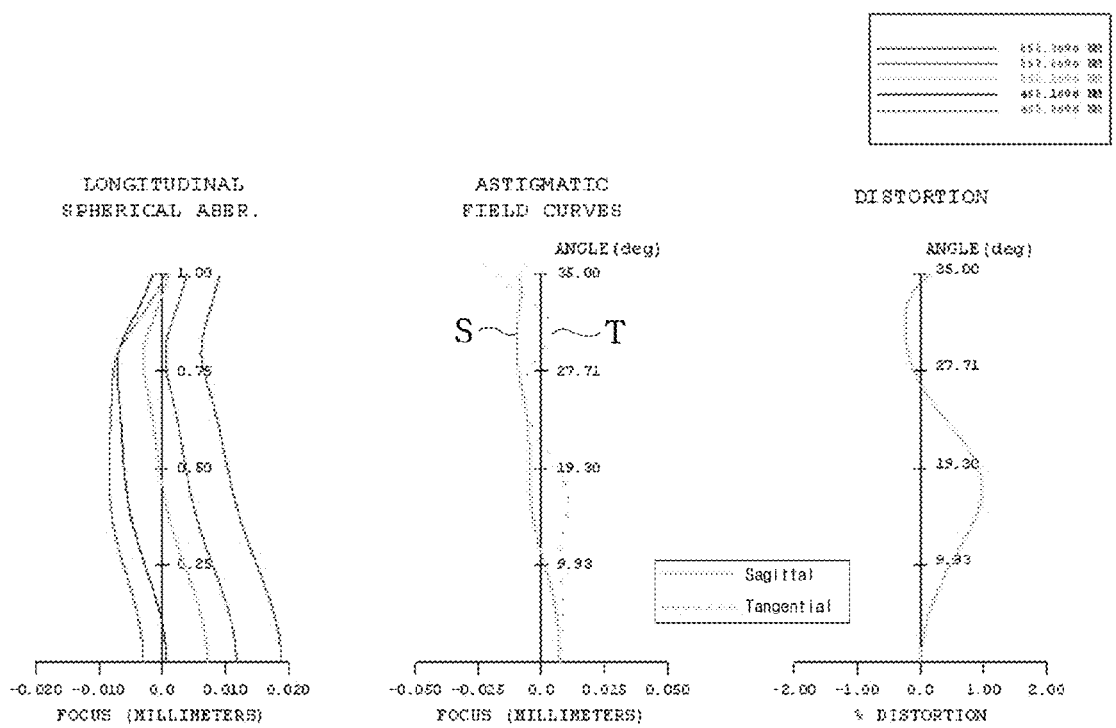
FIG. 33 is graphs showing aberration characteristics according to the fourteenth preferred embodiment of the present invention.

FIG. 33 is graphs showing aberration characteristics according to the fourteenth preferred embodiment of the present invention. In FIG. 33, the aberration characteristics are shown by representing a plurality of wavelengths by a plurality of colors.

Here, FIG. 33 is a graph obtained by measuring longitudinal spherical aberration, astigmatic field curve, and distortion according to the fourteenth preferred embodiment of the present invention.

<Fifteenth Preferred Embodiment>

Figure 34:
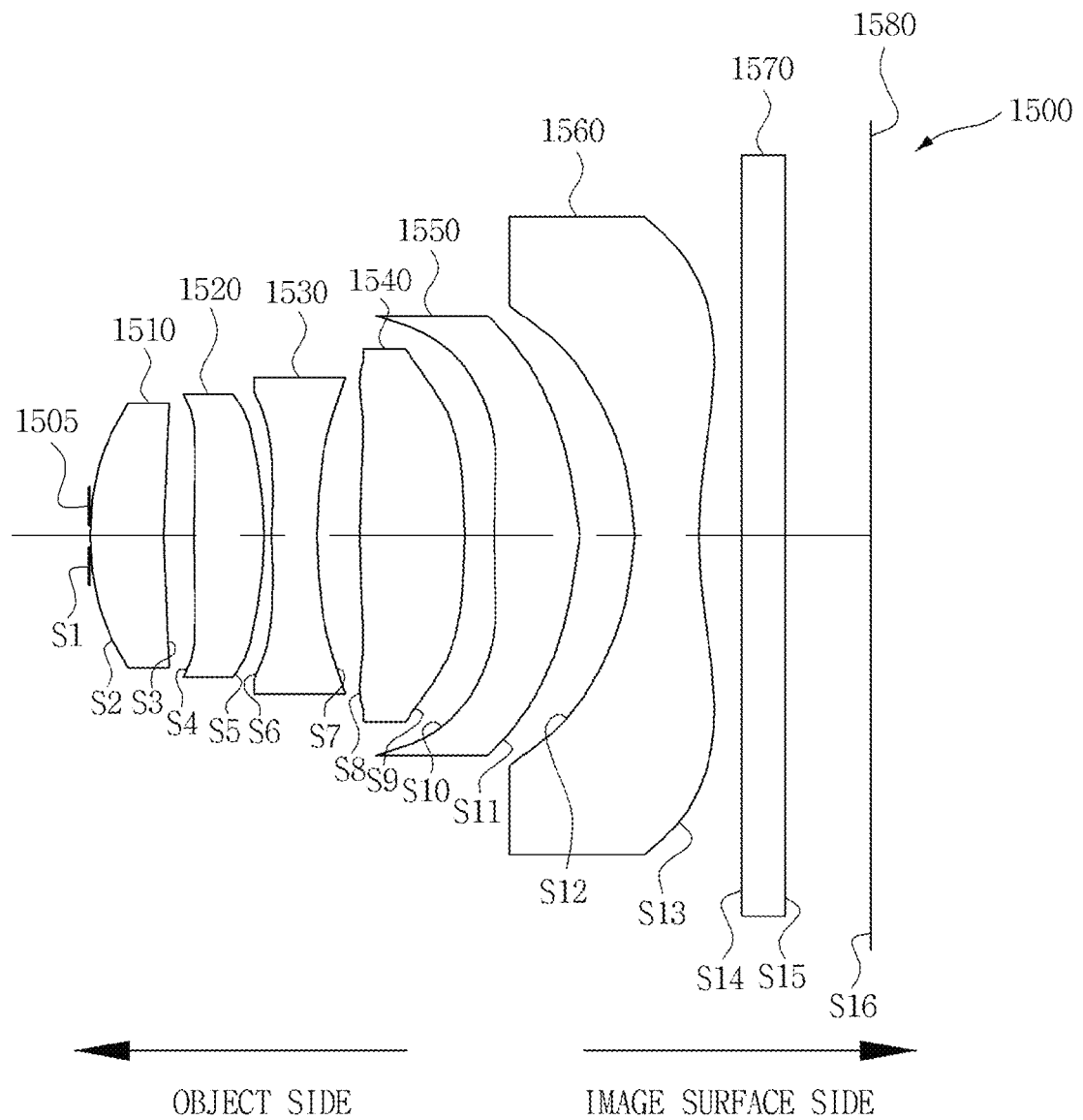
FIG. 34 is a lateral cross-sectional view schematically showing an internal structure of an imaging lens according to a fifteenth preferred embodiment of the present invention.

FIG. 34 is a lateral cross-sectional view schematically showing an internal structure of an imaging lens according to a fifteenth preferred embodiment of the present invention.

Referring to FIG. 34, The imaging lens 1500 according to the fifteenth preferred embodiment of the present invention has optical characteristics as shown in the following Table 34.

TABLE 34

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 1.876 | 0.531 | 1.544 | 56.1 | Asphere | L1 |
| S3 | 4.445 | 0.200 | | | Asphere | |
| S4 | 6.117 | 0.513 | 1.544 | 56.1 | Asphere | L2 |
| S5 | −4.294 | 0.050 | | | Asphere | |
| S6 | −12.193 | 0.300 | 1.633 | 23.4 | Asphere | L3 |
| S7 | 2.871 | 0.336 | | | Asphere | |
| S8 | 393.388 | 0.714 | 1.573 | 33.8 | Asphere | L4 |
| S9 | −12.431 | 0.216 | | | Asphere | |
| S10 | 18.829 | 0.600 | 1.551 | 49.9 | Asphere | L5 |
| S11 | −1.700 | 0.390 | | | Asphere | |
| S12 | −1.961 | 0.450 | 1.531 | 54.5 | Asphere | L6 |
| S13 | 2.739 | 0.300 | | | Asphere | |
| S14 | 0.000 | 0.300 | 1.516 | 64.2 | Flat | Filter |
| S15 | 0.000 | 0.600 | | | Flat | |
| S16 | infinite | — | — | — | Flat | Image sensor |

As shown in the above Table 34, all surfaces of the first lens 1510 (L1), the second lens 1520 (L2), the third lens 1530 (L3), the fourth lens 1540 (L4), the fifth lens 1550 (L5), and the sixth lens 1560 (L6) of the imaging lens 1500 according to the fifteenth preferred embodiment of the present invention are aspheric surfaces.

In addition, a "−" value stated in the above Table 34 means a value that is not defined.

Further, S1 means a surface determining a light amount of the imaging lens 1500 according to the preferred embodiment of the present invention, and Stop stated in the Remark column of S1 means the aperture stop 1505 (S1) used to adjust a light amount.

Here, although the aperture stop 1505 is disposed on the surface of the first lens 1510 toward the object side, a position of the aperture stop 1505 according to the fifteenth preferred embodiment of the present invention is not limited thereto. In addition, the imaging lens 1500 according to the fifteenth preferred embodiment of the present invention is not necessarily limited to including the aperture stop 1505.

The following Table 35 shows aspheric constant values of aspheric lenses according to the fifteenth preferred embodiment of the present invention.

TABLE 35

| Lens surface No. | K | A | B | C | D |
|---|---|---|---|---|---|
| S2 | 1.42E-02 | -5.71E-03 | 5.46E-04 | 4.95E-03 | -4.39E-03 |
| S3 | 0 | -7.00E-02 | 1.73E-02 | 1.26E-03 | -9.24E-03 |
| S4 | 0 | -1.29E-01 | -1.80E-03 | 2.15E-02 | -1.98E-02 |
| S5 | -1.69E-02 | -8.17E-02 | 1.88E-02 | -2.05E-02 | 4.69E-03 |
| S6 | 0 | -5.71E-02 | 1.06E-02 | -3.83E-02 | 1.85E-02 |
| S7 | 5.39E-01 | -3.87E-02 | 2.98E-03 | 1.12E-03 | 4.25E-03 |
| S8 | 0 | -5.01E-02 | 1.88E-02 | 4.36E-03 | 1.49E-04 |
| S9 | 0 | -1.59E-01 | 4.25E-02 | -4.90E-03 | 4.17E-04 |
| S10 | 0 | -1.28E-01 | 2.31E-02 | -8.72E-03 | -4.37E-04 |
| S11 | -2.51E-01 | 1.13E-01 | -3.91E-02 | 2.94E-03 | 1.05E-03 |
| S12 | 1.02E-01 | 6.56E-02 | -6.31E-02 | 2.61E-02 | -3.69E-03 |
| S13 | -1.13E+01 | -4.56E-02 | 4.97E-03 | -1.48E-04 | -5.01E-05 |

As stated in the above Table 34 and Table 35, S1, which is the aperture stop 1505 (S1) used to adjust the light amount, is flat, such that it does not have an aspheric constant value.

In addition, S14 and S15, which are the filter 1570, and S16, which is the image sensor corresponding to the light receiving element 1580, are flat, such that they do not have aspheric constant values.

Figure 35:
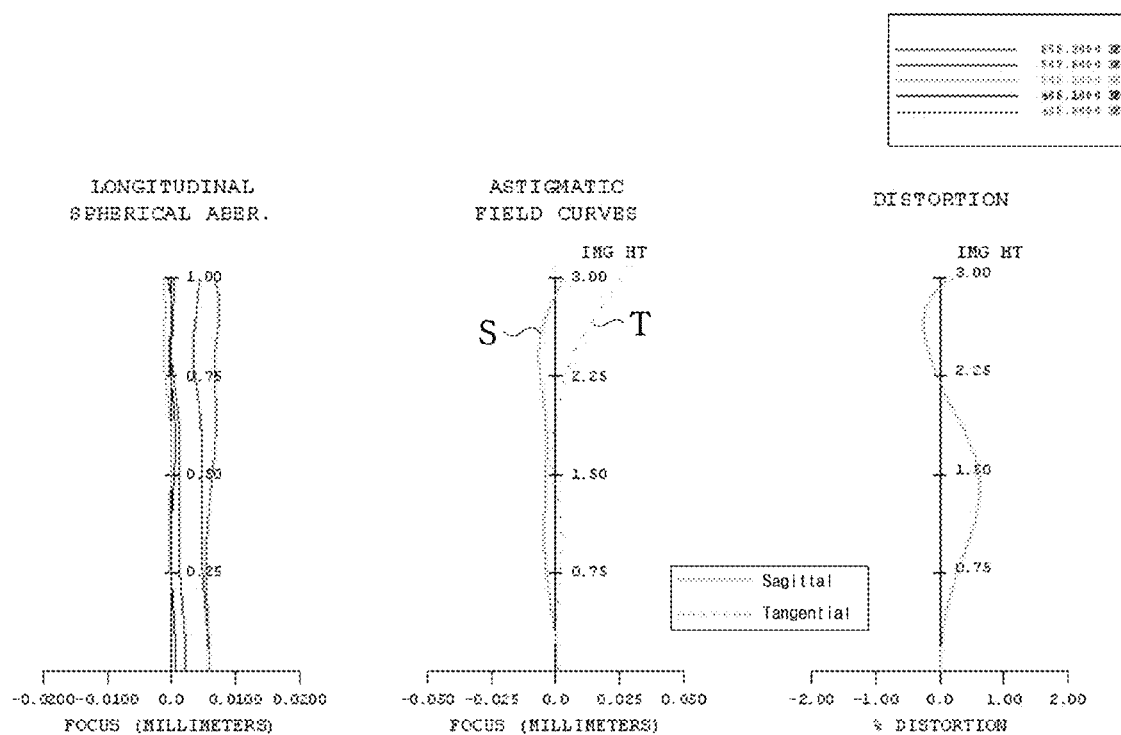
FIG. 35 is graphs showing aberration characteristics according to the fifteenth preferred embodiment of the present invention.

FIG. 35 is graphs showing aberration characteristics according to the fifteenth preferred embodiment of the present invention. In FIG. 35, the aberration characteristics are shown by representing a plurality of wavelengths by a plurality of colors.

Here, FIG. 35 is a graph obtained by measuring longitudinal spherical aberration, astigmatic field curve, and distortion according to the fifteenth preferred embodiment of the present invention.

<Sixteenth Preferred Embodiment>

Figure 36:
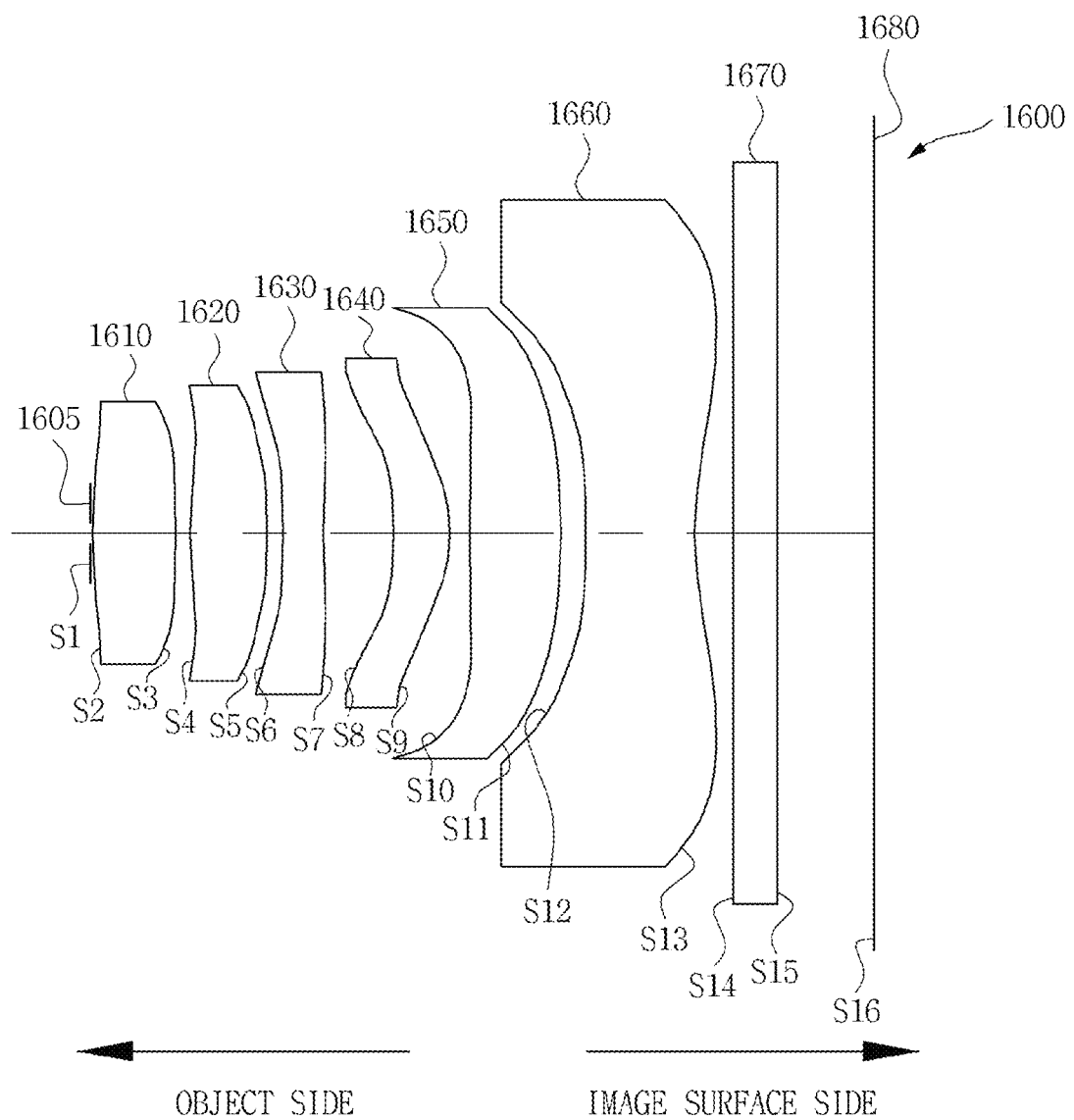
FIG. 36 is a lateral cross-sectional view schematically showing an internal structure of an imaging lens according to a sixteenth preferred embodiment of the present invention.

FIG. 36 is a lateral cross-sectional view schematically showing an internal structure of an imaging lens according to a sixteenth preferred embodiment of the present invention.

Referring to FIG. 36, The imaging lens 1600 according to the sixteenth preferred embodiment of the present invention has optical characteristics as shown in the following Table 36.

TABLE 36

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 3.295 | 0.585 | 1.544 | 56.1 | Asphere | L1 |
| S3 | 18.239 | 0.100 | | | Asphere | |
| S4 | 3.628 | 0.555 | 1.537 | 56.0 | Asphere | L2 |
| S5 | -3.984 | 0.100 | | | Asphere | |
| S6 | -4.571 | 0.300 | 1.640 | 23.3 | Asphere | L3 |
| S7 | 11.772 | 0.497 | | | Asphere | |
| S8 | -1.528 | 0.380 | 1.616 | 25.2 | Asphere | L4 |
| S9 | -1.570 | 0.160 | | | Asphere | |
| S10 | 7.418 | 0.642 | 1.541 | 56.1 | Asphere | L5 |
| S11 | -2.511 | 0.171 | | | Asphere | |
| S12 | -2.609 | 0.750 | 1.546 | 44.6 | Asphere | L6 |
| S13 | 2.494 | 0.300 | | | Asphere | |
| S14 | 0.000 | 0.300 | 1.516 | 64.2 | Flat | Filter |
| S15 | 0.000 | 0.665 | | | Flat | |
| S16 | infinite | — | — | — | Flat | Image sensor |

As shown in the above Table 36, all surfaces of the first lens 1610 (L1), the second lens 1620 (L2), the third lens 1630 (L3), the fourth lens 1640 (L4), the fifth lens 1650 (L5), and the sixth lens 1660 (L6) of the imaging lens 1600 according to the sixteenth preferred embodiment of the present invention are aspheric surfaces.

In addition, a "–" value stated in the above Table 36 means a value that is not defined.

Further, S1 means a surface determining a light amount of the imaging lens 1600 according to the preferred embodiment of the present invention, and Stop stated in the Remark column of S1 means the aperture stop 1605 (S1) used to adjust a light amount.

Here, although the aperture stop 1605 is disposed on the surface of the first lens 1610 toward the object side, a position of the aperture stop 1605 according to the sixteenth preferred embodiment of the present invention is not limited thereto. In addition, the imaging lens 1600 according to the sixteenth preferred embodiment of the present invention is not necessarily limited to including the aperture stop 1605.

The following Table 37 shows aspheric constant values of aspheric lenses according to the sixteenth preferred embodiment of the present invention.

TABLE 37

| Lens surface No. | K | A | B | C | D |
|---|---|---|---|---|---|
| S2 | -9.52E-01 | -5.59E-02 | -2.36E-02 | -2.86E-02 | -8.20E-03 |
| S3 | 0 | -2.18E-01 | 1.34E-02 | 7.30E-03 | 5.61E-03 |
| S4 | 0 | -1.49E-01 | -1.04E-02 | 1.46E-02 | 7.11E-03 |
| S5 | -7.14E-01 | -2.46E-02 | -4.43E-02 | 7.00E-03 | -1.44E-03 |
| S6 | 0 | -7.10E-02 | 3.68E-03 | 4.21E-02 | -1.41E-02 |
| S7 | 1.96E+01 | -4.70E-02 | -2.62E-03 | -2.09E-03 | 6.05E-03 |
| S8 | 0 | 8.49E-02 | -3.50E-02 | 4.32E-02 | -4.41E-03 |
| S9 | 0 | -9.26E-03 | 4.55E-02 | 2.63E-02 | -3.40E-03 |
| S10 | 0 | -9.71E-02 | 9.16E-03 | 6.15E-03 | -4.35E-03 |
| S11 | -2.84E+00 | 1.90E-01 | -2.31E-01 | 1.04E-01 | -1.73E-02 |

TABLE 37-continued

| Lens surface No. | K | A | B | C | D |
|---|---|---|---|---|---|
| S12 | −1.45E−01 | 1.67E−01 | −2.13E−01 | 9.93E−02 | −1.63E−02 |
| S13 | −8.01E−01 | −8.48E−02 | 1.48E−02 | −1.52E−03 | 3.54E−05 |

As stated in the above Table 36 and Table 37, S1, which is the aperture stop 1605 (S1) used to adjust the light amount, is flat, such that it does not have an aspheric constant value.

In addition, S14 and S15, which are the filter 1670, and S16, which is the image sensor corresponding to the light receiving element 1680, are flat, such that they do not have aspheric constant values.

Figure 37:
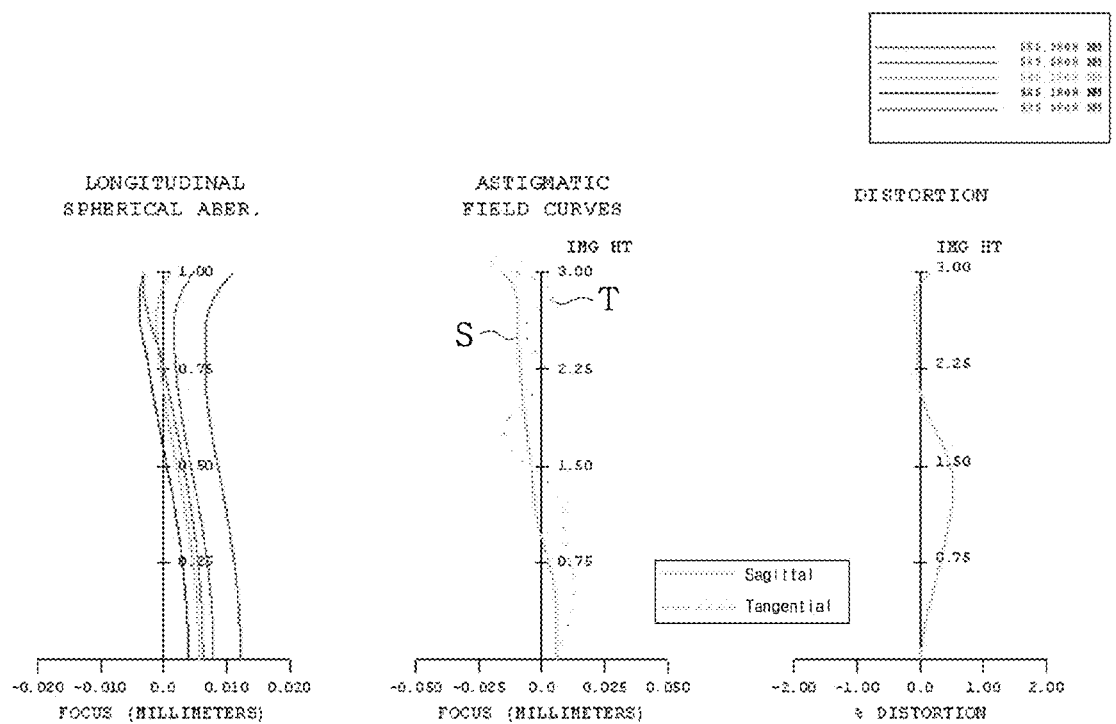
FIG. 37 is graphs showing aberration characteristics according to the sixteenth preferred embodiment of the present invention.

FIG. 37 is graphs showing aberration characteristics according to the sixteenth preferred embodiment of the present invention. In FIG. 37, the aberration characteristics are shown by representing a plurality of wavelengths by a plurality of colors.

Here, FIG. 37 is a graph obtained by measuring longitudinal spherical aberration, astigmatic field curve, and distortion according to the sixteenth preferred embodiment of the present invention.

<Seventeenth Preferred Embodiment>

Figure 38:
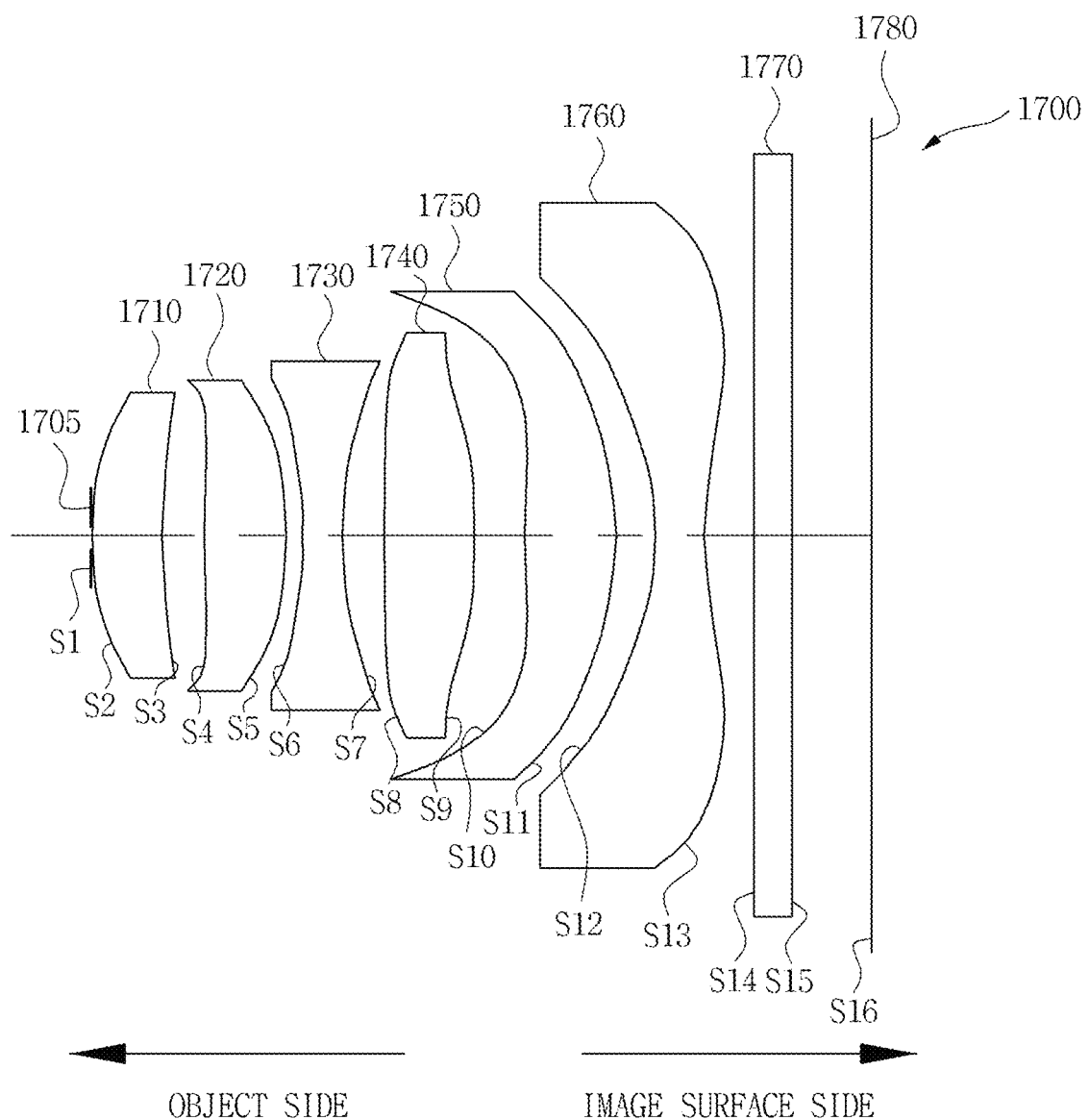
FIG. 38 is a lateral cross-sectional view schematically showing an internal structure of an imaging lens according to a seventeenth preferred embodiment of the present invention.

FIG. 38 is a lateral cross-sectional view schematically showing an internal structure of an imaging lens according to a seventeenth preferred embodiment of the present invention.

Referring to FIG. 38, The imaging lens 1700 according to the seventeenth preferred embodiment of the present invention has optical characteristics as shown in the following Table 38.

TABLE 38

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 1.910 | 0.513 | 1.543 | 56.1 | Asphere | L1 |
| S3 | 4.234 | 0.269 | | | Asphere | |
| S4 | 5.685 | 0.586 | 1.537 | 56.0 | Asphere | L2 |
| S5 | −3.600 | 0.100 | | | Asphere | |
| S6 | −6.723 | 0.300 | 1.632 | 23.4 | Asphere | L3 |
| S7 | 2.779 | 0.285 | | | Asphere | |
| S8 | 27.415 | 0.636 | 1.614 | 25.6 | Asphere | L4 |
| S9 | −7.276 | 0.344 | | | Asphere | |
| S10 | 8.534 | 0.629 | 1.544 | 56.0 | Asphere | L5 |
| S11 | −1.838 | 0.293 | | | Asphere | |
| S12 | −1.829 | 0.350 | 1.544 | 56.0 | Asphere | L6 |
| S13 | 2.664 | 0.300 | | | Asphere | |
| S14 | 0.000 | 0.300 | 1.516 | 64.2 | Flat | Filter |
| S15 | 0.000 | 0.600 | | | Flat | |
| S16 | infinite | — | — | — | Flat | Image sensor |

As shown in the above Table 38, all surfaces of the first lens 1710 (L1), the second lens 1720 (L2), the third lens 1730 (L3), the fourth lens 1740 (L4), the fifth lens 1750 (L5), and the sixth lens 1760 (L6) of the imaging lens 1700 according to the seventeenth preferred embodiment of the present invention are aspheric surfaces.

In addition, a "−" value stated in the above Table 38 means a value that is not defined.

Further, S1 means a surface determining a light amount of the imaging lens 1700 according to the preferred embodiment of the present invention, and Stop stated in the Remark column of S1 means the aperture stop 1705 (S1) used to adjust a light amount.

Here, although the aperture stop 1705 is disposed on the surface of the first lens 1710 toward the object side, a position of the aperture stop 1705 according to the seventeenth preferred embodiment of the present invention is not limited thereto. In addition, the imaging lens 1700 according to the seventeenth preferred embodiment of the present invention is not necessarily limited to including the aperture stop 1705.

The following Table 39 shows aspheric constant values of aspheric lenses according to the seventeenth preferred embodiment of the present invention.

TABLE 39

| Lens surface No. | K | A | B | C | D |
|---|---|---|---|---|---|
| S2 | −2.44E−01 | −1.66E−03 | −1.55E−03 | 4.87E−03 | −6.57E−03 |
| S3 | 0 | −4.88E−02 | 6.74E−03 | −1.05E−02 | −1.14E−03 |
| S4 | 0 | −1.06E−01 | −2.14E−02 | −1.55E−03 | −1.35E−03 |
| S5 | 5.02E+00 | −1.02E−01 | 4.56E−02 | −1.49E−02 | −2.29E−03 |
| S6 | 0 | −9.70E−02 | 4.99E−02 | −2.24E−02 | 5.42E−04 |
| S7 | 3.37E−01 | −2.49E−02 | 2.13E−03 | −4.85E−03 | 2.59E−03 |
| S8 | 0 | −4.16E−03 | 1.94E−02 | −1.81E−03 | −1.92E−05 |
| S9 | 0 | −8.26E−02 | 3.25E−02 | −4.79E−03 | 2.96E−03 |
| S10 | 0 | −8.42E−02 | 1.32E−02 | −1.52E−02 | 2.24E−03 |
| S11 | −7.04E−03 | 1.53E−01 | −5.74E−02 | 5.30E−03 | 1.10E−03 |
| S12 | −6.71E−01 | 9.70E−02 | −6.01E−02 | 1.78E−02 | −2.02E−03 |
| S13 | −1.60E+01 | −2.97E−02 | 1.02E−03 | 3.02E−04 | −6.47E−05 |

As stated in the above Table 38 and Table 39, S1, which is the aperture stop 1705 (S1) used to adjust the light amount, is flat, such that it does not have an aspheric constant value.

In addition, S14 and S15, which are the filter 1770, and S16, which is the image sensor corresponding to the light receiving element 1780, are flat, such that they do not have aspheric constant values.

Figure 39:
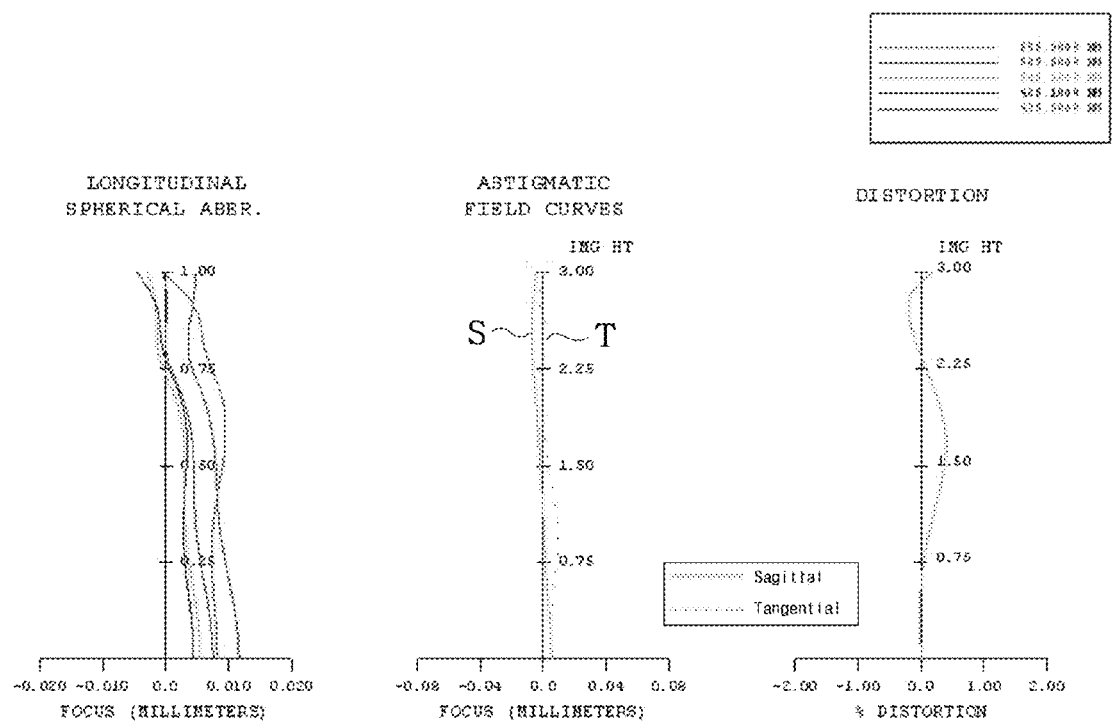
FIG. 39 is graphs showing aberration characteristics according to the seventeenth preferred embodiment of the present invention.

FIG. 39 is graphs showing aberration characteristics according to the seventeenth preferred embodiment of the present invention. In FIG. 39, the aberration characteristics are shown by representing a plurality of wavelengths by a plurality of colors.

Here, FIG. 39 is a graph obtained by measuring longitudinal spherical aberration, astigmatic field curve, and distortion according to the seventeenth preferred embodiment of the present invention.

<Eighteenth Preferred Embodiment>

Figure 40:
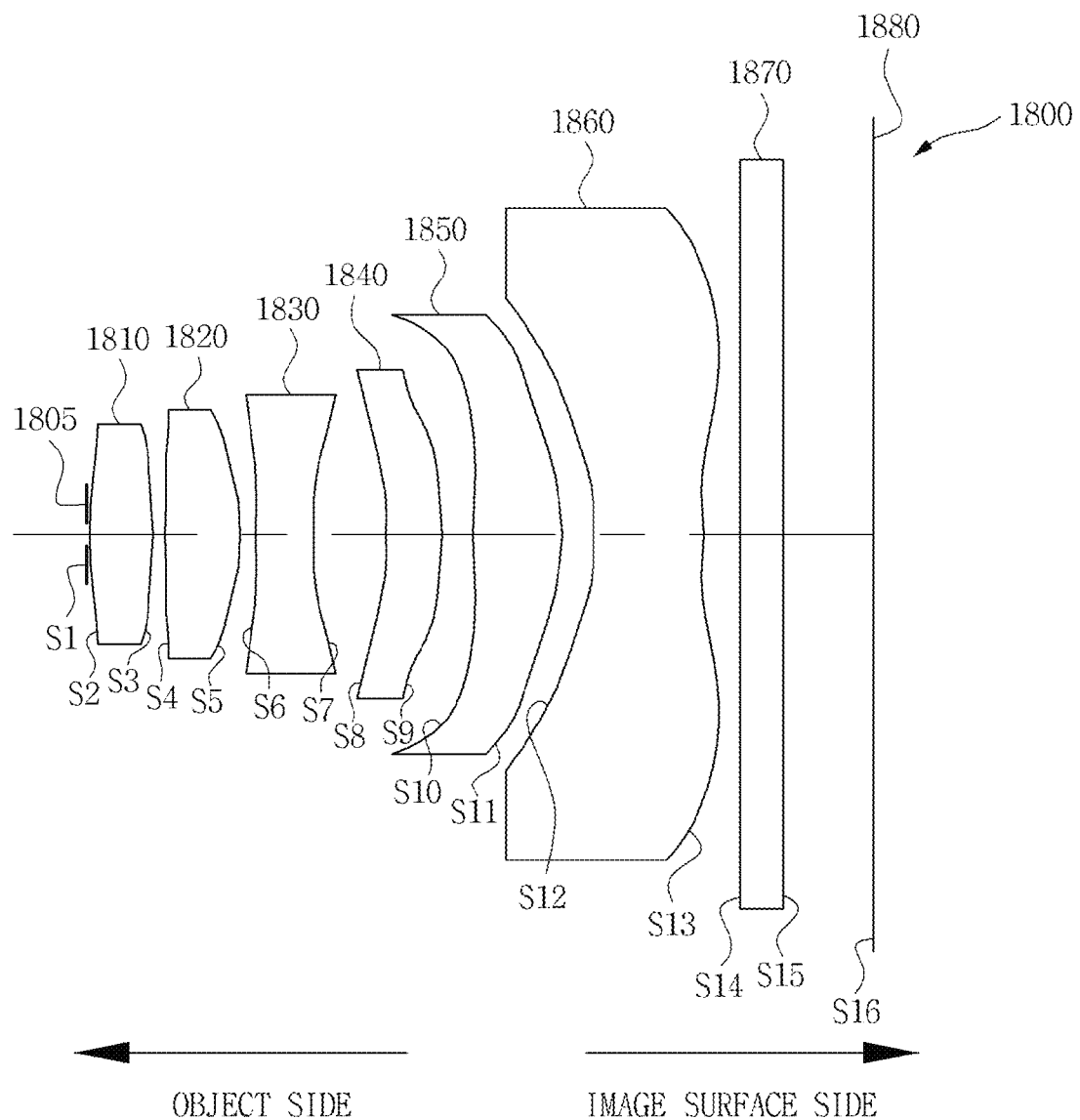
FIG. 40 is a lateral cross-sectional view schematically showing an internal structure of an imaging lens according to a eighteenth preferred embodiment of the present invention.

FIG. 40 is a lateral cross-sectional view schematically showing an internal structure of an imaging lens according to a eighteenth preferred embodiment of the present invention.

Referring to FIG. 40, The imaging lens 1800 according to the eighteenth preferred embodiment of the present invention has optical characteristics as shown in the following Table 40.

TABLE 40

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 3.364 | 0.442 | 1.541 | 56.1 | Asphere | L1 |
| S3 | −7.839 | 0.103 | | | Asphere | |
| S4 | −22.146 | 0.509 | 1.538 | 56.0 | Asphere | L2 |
| S5 | −2.756 | 0.100 | | | Asphere | |
| S6 | 17.811 | 0.421 | 1.635 | 23.9 | Asphere | L3 |
| S7 | 2.399 | 0.509 | | | Asphere | |
| S8 | −3.032 | 0.400 | 1.618 | 26.3 | Asphere | L4 |
| S9 | −3.476 | 0.207 | | | Asphere | |
| S10 | 6.937 | 0.633 | 1.543 | 50.5 | Asphere | L5 |
| S11 | −1.722 | 0.229 | | | Asphere | |
| S12 | −1.759 | 0.738 | 1.556 | 46.3 | Asphere | L6 |
| S13 | 3.379 | 0.300 | | | Asphere | |
| S14 | 0.000 | 0.300 | 1.516 | 64.2 | Flat | Filter |
| S15 | 0.000 | 0.600 | | | Flat | |
| S16 | infinite | — | — | — | Flat | Image sensor |

As shown in the above Table 40, all surfaces of the first lens 1810 (L1), the second lens 1820 (L2), the third lens 1830 (L3), the fourth lens 1840 (L4), the fifth lens 1850 (L5), and the sixth lens 1860 (L6) of the imaging lens 1800 according to the eighteenth preferred embodiment of the present invention are aspheric surfaces.

In addition, a "—" value stated in the above Table 40 means a value that is not defined.

Further, S1 means a surface determining a light amount of the imaging lens 1800 according to the preferred embodiment of the present invention, and Stop stated in the Remark column of S1 means the aperture stop 1805 (S1) used to adjust a light amount.

Here, although the aperture stop 1805 is disposed on the surface of the first lens 1810 toward the object side, a position of the aperture stop 1805 according to the eighteenth preferred embodiment of the present invention is not limited thereto. In addition, the imaging lens 1800 according to the eighteenth preferred embodiment of the present invention is not necessarily limited to including the aperture stop 1805.

The following Table 41 shows aspheric constant values of aspheric lenses according to the eighteenth preferred embodiment of the present invention.

TABLE 41

| Lens surface No. | K | A | B | C | D |
|---|---|---|---|---|---|
| S2 | 9.48E−01 | −7.74E−02 | −3.60E−02 | −5.24E−03 | −6.18E−04 |
| S3 | 0 | −4.77E−02 | 1.60E−02 | −1.72E−02 | −8.97E−03 |
| S4 | 0 | 4.79E−02 | 2.29E−02 | −2.19E−02 | −2.19E−02 |
| S5 | −1.07E+00 | −2.19E−02 | −1.85E−02 | 3.17E−03 | −6.83E−03 |
| S6 | 0 | −1.20E−01 | 2.05E−02 | 2.57E−02 | 7.18E−03 |
| S7 | −9.51E−02 | −8.62E−02 | 3.16E−02 | 8.94E−03 | −2.02E−03 |
| S8 | 0 | −1.25E−03 | −8.27E−03 | 2.93E−02 | −6.41E−03 |
| S9 | 0 | −1.39E−01 | 8.31E−02 | −1.09E−02 | 4.23E−03 |
| S10 | −2.65E+01 | −1.51E−01 | 7.36E−02 | −2.29E−02 | 7.46E−04 |
| S11 | −2.54E−02 | 1.60E−01 | −7.20E−02 | 2.23E−02 | −2.25E−03 |
| S12 | −4.61E−01 | 1.41E−01 | −1.03E−01 | 3.97E−02 | −5.37E−03 |
| S13 | −6.71E−01 | −5.65E−02 | 6.14E−03 | −3.62E−04 | −8.63E−06 |

As stated in the above Table 40 and Table 41, S1, which is the aperture stop 1805 (S1) used to adjust the light amount, is flat, such that it does not have an aspheric constant value.

In addition, S14 and S15, which are the filter 1870, and S16, which is the image sensor corresponding to the light receiving element 1880, are flat, such that they do not have aspheric constant values.

Figure 41:
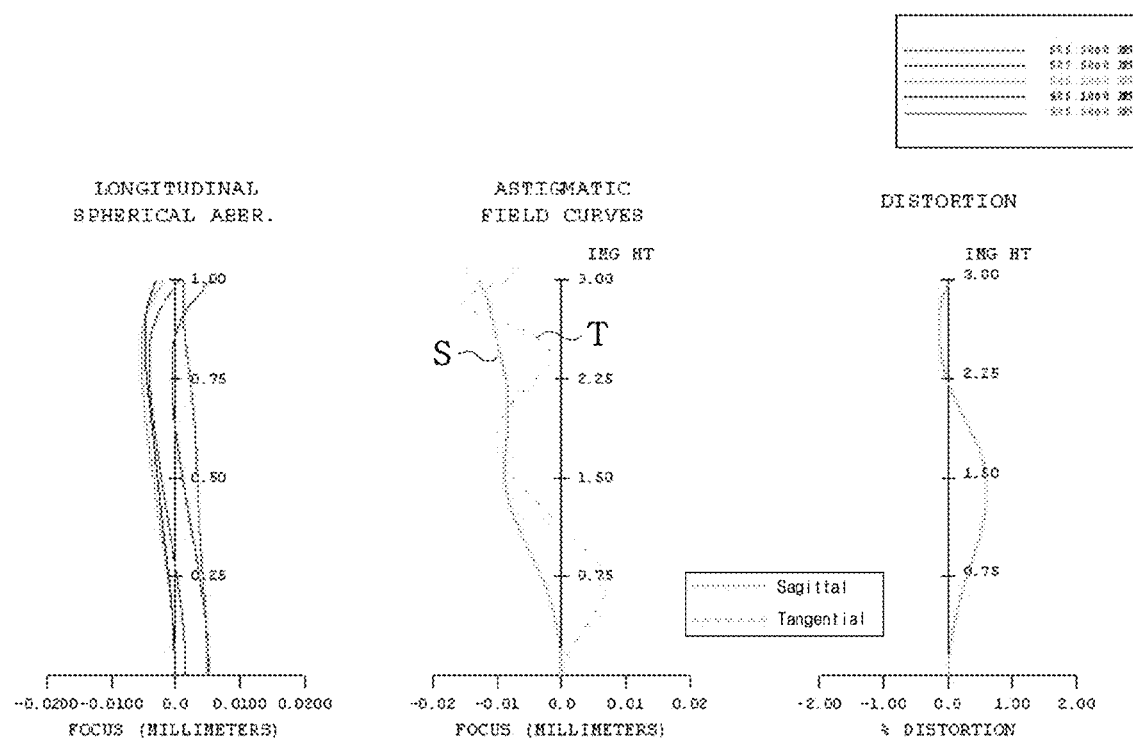
FIG. 41 is graphs showing aberration characteristics according to the eighteenth preferred embodiment of the present invention.

FIG. 41 is graphs showing aberration characteristics according to the eighteenth preferred embodiment of the present invention. In FIG. 41, the aberration characteristics are shown by representing a plurality of wavelengths by a plurality of colors.

Here, FIG. 41 is a graph obtained by measuring longitudinal spherical aberration, astigmatic field curve, and distortion according to the eighteenth preferred embodiment of the present invention.

<Nineteenth Preferred Embodiment>

Figure 42:
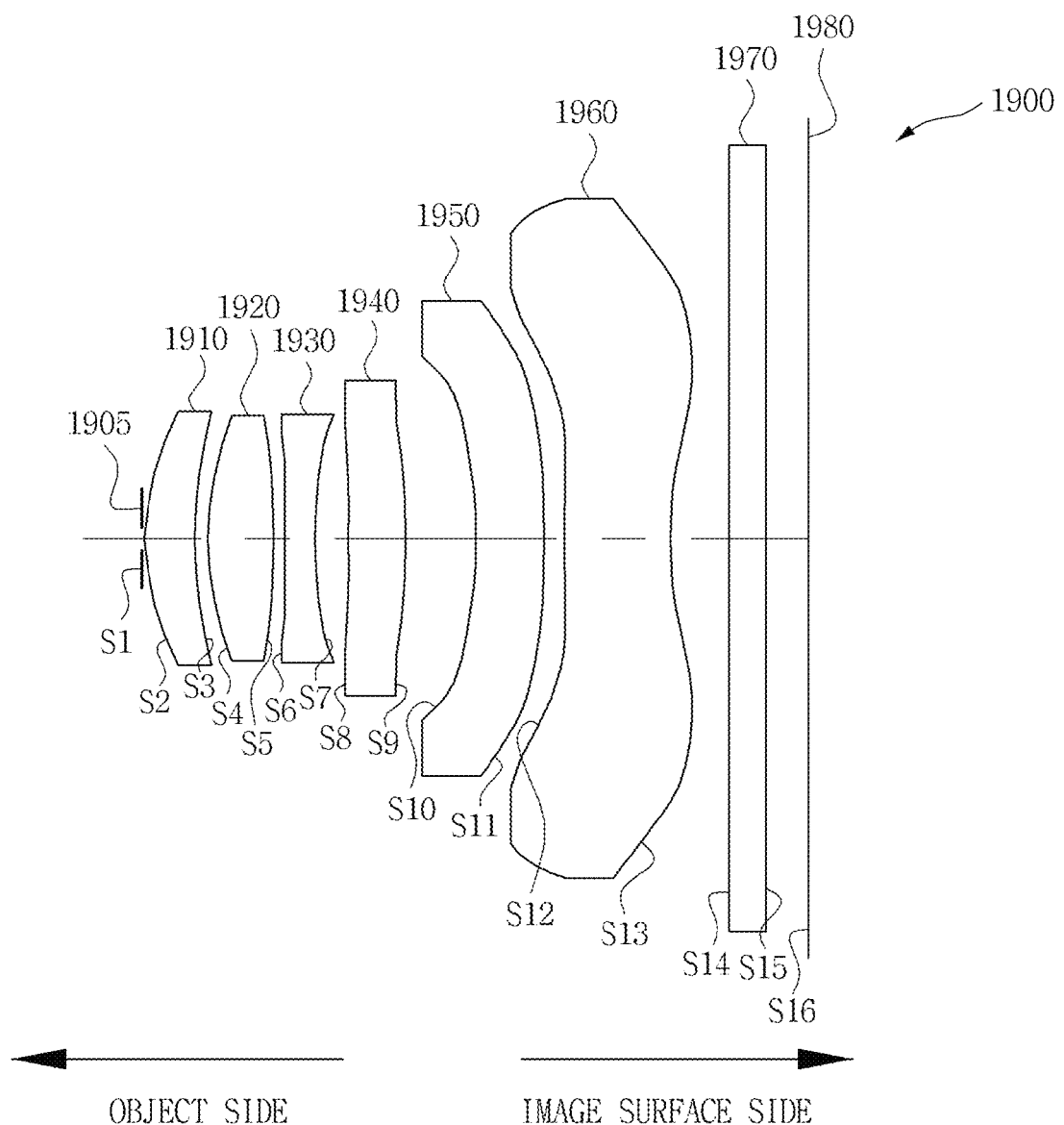
FIG. 42 is a lateral cross-sectional view schematically showing an internal structure of an imaging lens according to a nineteenth preferred embodiment of the present invention.

FIG. 42 is a lateral cross-sectional view schematically showing an internal structure of an imaging lens according to a nineteenth preferred embodiment of the present invention.

Referring to FIG. 42, The imaging lens 1900 according to the nineteenth preferred embodiment of the present invention has optical characteristics as shown in the following Table 42.

TABLE 42

| Lens surface No. | Radius of curvature (mm) | Thickness (mm) | Refractive index | Abbe number | Lens shape | Remark |
|---|---|---|---|---|---|---|
| S1 | infinite | 0 | — | — | Flat | Stop |
| S2 | 1.638 | 0.365 | 1.544 | 56.1 | Asphere | L1 |
| S3 | 3.058 | 0.090 | | | Asphere | |
| S4 | 2.717 | 0.461 | 1.544 | 56.1 | Asphere | L2 |
| S5 | −6.816 | 0.089 | | | Asphere | |
| S6 | −6.985 | 0.205 | 1.639 | 23.3 | Asphere | L3 |
| S7 | 3.564 | 0.234 | | | Asphere | |
| S8 | 23.122 | 0.399 | 1.639 | 23.3 | Asphere | L4 |
| S9 | −7.182 | 0.491 | | | Asphere | |
| S10 | −4.465 | 0.486 | 1.639 | 23.3 | Asphere | L5 |
| S11 | −4.657 | 0.140 | | | Asphere | |
| S12 | 5.645 | 0.732 | 1.534 | 55.7 | Asphere | L6 |
| S13 | 1.700 | 0.161 | | | Asphere | |
| S14 | 0.000 | 0.270 | 1.516 | 64.2 | Flat | Filter |
| S15 | 0.000 | 0.580 | | | Flat | |
| S16 | infinite | — | — | — | Flat | Image sensor |

As shown in the above Table 42, all surfaces of the first lens 1910 (L1), the second lens 1920 (L2), the third lens 1930 (L3), the fourth lens 1940 (L4), the fifth lens 1950 (L5), and the sixth lens 1960 (L6) of the imaging lens 1900 according to the nineteenth preferred embodiment of the present invention are aspheric surfaces.

In addition, a "-" value stated in the above Table 42 means a value that is not defined.

Further, S1 means a surface determining a light amount of the imaging lens 1900 according to the preferred embodiment of the present invention, and Stop stated in the Remark column of S1 means the aperture stop 1905 (S1) used to adjust a light amount.

Here, although the aperture stop 1905 is disposed on the surface of the first lens 1910 toward the object side, a position of the aperture stop 1905 according to the nineteenth preferred embodiment of the present invention is not limited thereto. In addition, the imaging lens 1900 according to the nineteenth preferred embodiment of the present invention is not necessarily limited to including the aperture stop 1905.

The following Table 43 shows aspheric constant values of aspheric lenses according to the nineteenth preferred embodiment of the present invention.

TABLE 43

| Lens surface No. | K | A | B | C | D | E |
|---|---|---|---|---|---|---|
| S2 | −5.55E−01 | −2.15E−02 | −5.21E−05 | −4.99E−02 | 6.47E−02 | −2.90E−02 |
| S3 | 0 | −9.03E−02 | 5.29E−02 | 3.63E−03 | 1.02E−01 | −8.15E−02 |
| S4 | 0 | −5.75E−02 | 6.12E−02 | 3.41E−02 | 8.28E−02 | −1.03E−01 |
| S5 | −1.48E+01 | 3.24E−02 | −1.57E−01 | 1.41E−01 | −3.03E−02 | −2.39E−02 |
| S6 | 0 | 7.95E−02 | −2.20E−01 | 3.53E−01 | −2.81E−01 | 1.28E−01 |
| S7 | 1.29E+01 | −2.14E−02 | −1.10E−01 | 3.09E−01 | −3.20E−01 | 1.42E−01 |
| S8 | 0 | −9.36E−02 | −2.68E−02 | 6.95E−02 | 1.13E−01 | −1.32E−01 |
| S9 | 0 | −4.92E−02 | −7.57E−03 | 1.40E−03 | 1.34E−01 | −8.01E−02 |
| S10 | 0 | 8.68E−02 | −2.15E−01 | 1.30E−01 | −3.43E−02 | 1.41E−03 |
| S11 | −1.89E+00 | 1.24E−01 | −1.81E−01 | 9.97E−02 | −2.77E−02 | 3.10E−03 |
| S12 | −1.48E+02 | −9.45E−02 | −2.53E−02 | 2.77E−02 | −6.11E−03 | 4.37E−04 |
| S13 | −9.57E+00 | −6.18E−02 | 1.28E−02 | −2.32E−03 | 2.26E−04 | −7.54E−06 |

As stated in the above Table 42 and Table 43, S1, which is the aperture stop 1905 (S1) used to adjust the light amount, is flat, such that it does not have an aspheric constant value.

In addition, S14 and S15, which are the filter 1970, and S16, which is the image sensor corresponding to the light receiving element 1980, are flat, such that they do not have aspheric constant values.

Figure 43:
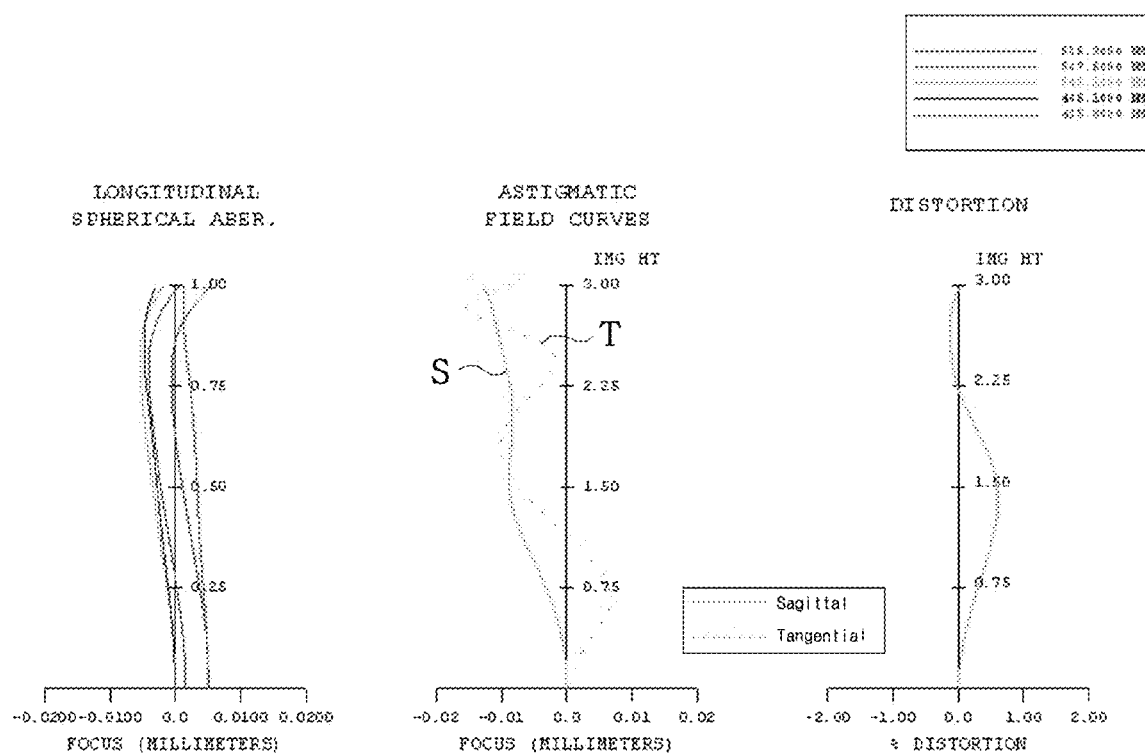
FIG. 43 is graphs showing aberration characteristics according to the nineteenth preferred embodiment of the present invention.

FIG. 43 is graphs showing aberration characteristics according to the nineteenth preferred embodiment of the present invention. In FIG. 43, the aberration characteristics are shown by representing a plurality of wavelengths by a plurality of colors.

Here, FIG. 43 is a graph obtained by measuring longitudinal spherical aberration, astigmatic field curve, and distortion according to the nineteenth preferred embodiment of the present invention.

According to the preferred embodiment of the present invention, the imaging lens is formed to have excellent optical characteristics, such that it may have a high resolution, may be easily slimed, and may have improved chromatic aberration.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An imaging lens comprising:
a first lens having positive (+) power;
a second lens having positive (+) power;
a third lens having positive (+) or negative (−) power;
a fourth lens having positive (+) or negative (−) power;
a fifth lens having positive (+) or negative (−) power; and
a sixth lens having negative (−) power, wherein the first lens, the second lens, the third lens, the fourth lens, the fifth lens, and the sixth lens are sequentially disposed from an object side, and wherein when it is assumed that the entire focal length of the imaging lens is F and a distance between a surface of the first lens toward the object side and a surface of the sixth surface toward an image surface side on an optical axis is DL, a conditional equation of 0.7<DL/F<1.2 is satisfied.

2. The imaging lens as set forth in claim 1, further comprising an aperture stop positioned to be closer to the object side or an image surface side as compared with any one of the first to fifth lenses.

3. The imaging lens as set forth in claim 2, wherein the aperture stop is positioned between a surface of the first lens toward the object side and a surface of the third lens toward the object side.

4. The imaging lens as set forth in claim 1, wherein the first lens is formed to be convex toward the object side.

5. The imaging lens as set forth in claim 1, wherein at least one of the third and fourth lenses is formed to have the Abbe number of 30 or less.

6. The imaging lens as set forth in claim 1, wherein the fifth lens is formed to be convex toward an image surface side.

7. The imaging lens as set forth in claim 1, wherein the fifth lens is formed to have the positive (+) power and be convex toward the object side.

8. The imaging lens as set forth in claim 1, wherein the fifth lens is formed to have the positive (+) power and be concave toward the object side.

9. The imaging lens as set forth in claim 1, wherein the fifth lens is formed to have the negative (−) power and be concave toward the object side.

10. The imaging lens as set forth in claim 1, wherein the fifth lens is formed to have a point of inflection on at least one of a surface thereof toward the object side and a surface thereof toward an image surface side.

11. The imaging lens as set forth in claim 1, wherein the sixth lens is formed to have a point of inflection on a surface thereof toward an image surface side.

12. The imaging lens as set forth in claim 1, wherein the sixth lens is formed to be concave toward an image surface side.

13. The imaging lens as set forth in claim 1, wherein when it is assumed that a length from an incident surface of the first lens toward the object side to an image surface is TTL and the entire focal length of the imaging lens is F, a conditional equation of 0.95<TTL/F<1.45 is satisfied.

14. The imaging lens as set forth in claim 1, wherein when it is assumed that a length from an incident surface of the first lens toward the object side to an image surface is TTL and the entire focal length of the imaging lens is F, a conditional equation of $1.15<TTL/F<1.45$ is satisfied.

15. The imaging lens as set forth in claim 1, wherein when it is assumed that a synthetic focal length of the first and second lenses is F12 and the entire focal length of the imaging lens is F, a conditional equation of $0.5<F/F12<2.5$ is satisfied.

16. The imaging lens as set forth in claim 1, wherein when it is assumed that a synthetic focal length of the third and fourth lenses is F34 and the entire focal length of the imaging lens is F, a conditional equation of $-2.5<F/F34<-0.4$ is satisfied.

17. The imaging lens as set forth in claim 1, wherein the third lens is formed to have the negative (−) power, and the fourth lens is formed to have the positive (+) power.

18. The imaging lens as set forth in claim 1, wherein the third lens is formed to have the negative (−) power, and the fourth lens is formed to have the negative (−) power.

19. The imaging lens as set forth in claim 1, wherein the third lens is formed to have the positive (+) power, and the fourth lens is formed to have the negative (−) power.

20. The imaging lens as set forth in claim 1, wherein the third lens is formed to have the positive (+) power, and the fourth lens is formed to have the positive (+) power.

21. The imaging lens as set forth in claim 1, wherein when it is assumed that a focal length of the first lens is Fl and the entire focal length of the imaging lens is F, a conditional equation of $0<F/F1<1.5$ is satisfied.

22. The imaging lens as set forth in claim 1, wherein when it is assumed that a focal length of the third lens is F3 and the entire focal length of the imaging lens is F, a conditional equation of $0.2<F/F3<2.5$ is satisfied.

23. The imaging lens as set forth in claim 1, wherein when it is assumed that a focal length of the fifth lens is F5, a focal length of the six lens is F6, and the entire focal length of the imaging lens is F, a conditional equation of $0.3<F/F5+F/F6<6.0$ is satisfied.

24. The imaging lens as set forth in claim 1, wherein when it is assumed that a length from an incident surface of the first lens toward the object side to an image surface is TTL and an image height is ImgH, a conditional equation of $0.35<TTL/2ImgH<0.95$ is satisfied.

25. The imaging lens as set forth in claim 1, wherein when it is assumed that a field of view of the imaging lens is FOV, a condition equation of $65<FOV<88$ is satisfied.

26. The imaging lens as set forth in claim 1, wherein when it is assumed that an average of the Abbe numbers of the first and second lenses is v12 and an average of the Abbe numbers of the third and fourth lenses is v34, a Conditional Equation of $10<v12-v34<45$ is satisfied.

27. The imaging lens as set forth in claim 1, wherein when it is assumed that a focal length of the third lens is F3, a focal length of the fourth lens is F4, and the entire focal length of the imaging lens is F, a conditional equation of $0<|F/F3|+|F/F4|<3$ is satisfied.

28. The imaging lens as set forth in claim 1, wherein when it is assumed that a length from an incident surface of the first lens toward the object side to an image surface is TTL and the entire focal length of the imaging lens is F, a conditional equation of $0.95<TTL/F<1.35$ is satisfied.

29. The imaging lens as set forth in claim 1, wherein when it is assumed that a radius of curvature of a surface of the first lens toward an image surface side is r12 and the entire focal length of the imaging lens is F, a conditional equation of $0.15<r12/F<0.9$ is satisfied.

30. The imaging lens as set forth in claim 1, wherein when it is assumed that a focal length of the first lens is F1 and a focal length of the third lens is F3, a conditional equation of $0<|F1/F3|<25$ is satisfied.

31. The imaging lens as set forth in claim 1, wherein when it is assumed that a radius of curvature of a surface of the fifth lens toward the object side is r9 and a radius of curvature of a surface of the fifth lens toward an image surface side is r10, a conditional equation of $0<|(r9-r10)/(r9+r10)|<6$ is satisfied.

32. The imaging lens as set forth in claim 1, wherein when it is assumed that the entire focal length of the imaging lens is F, a focal length of the first lens is F1, and a focal length of the second lens is F2, a conditional equation of $0.2<|F/F1|+|F/F2|<4$ is satisfied.

33. The imaging lens as set forth in claim 1, wherein when it is assumed that a focal length of the first lens is F1, a focal length of the second lens is F2, a focal length of the third lens is F3, and a focal length of the fourth lens is F4, a conditional equation of $0<(|F1|+|F2|)/(|F3|+|F4|)<30$ is satisfied.

34. The imaging lens as set forth in claim 1, wherein when it is assumed that the entire focal length of the imaging lens is F, a focal length of the fourth lens is F4, a focal length of the fifth lens is F5, and a focal length of the sixth lens is F6, a conditional equation of $0.20<|F/F4|+|F/F5|+|F/F6|<7.5$ is satisfied.

35. The imaging lens as set forth in claim 1, wherein when it is assumed that the Abbe number of the fourth lens is v4 and the Abbe number of the fifth lens is v5, a conditional equation of $42<v4+v5<115$ is satisfied.

* * * * *